US012463330B2

(12) United States Patent
Terashita et al.

(10) Patent No.: US 12,463,330 B2
(45) Date of Patent: Nov. 4, 2025

(54) ANTENNA DEVICE FOR A VEHICLE

(71) Applicant: YOKOWO CO., LTD., Tokyo (JP)

(72) Inventors: Noritaka Terashita, Tomioka (JP); Motohisa Ono, Tomioka (JP); Tomohiro Hoshi, Tomioka (JP); Yusuke Yokota, Tomioka (JP); Satoshi Iwasaki, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 240 days.

(21) Appl. No.: 18/038,210

(22) PCT Filed: Nov. 26, 2021

(86) PCT No.: PCT/JP2021/043509
§ 371 (c)(1),
(2) Date: May 23, 2023

(87) PCT Pub. No.: WO2022/114161
PCT Pub. Date: Jun. 2, 2022

(65) Prior Publication Data

US 2024/0097317 A1 Mar. 21, 2024

(30) Foreign Application Priority Data

Nov. 27, 2020 (JP) ................................ 2020-196868

(51) Int. Cl.
*H01Q 1/32* (2006.01)
*H01Q 1/52* (2006.01)
(Continued)

(52) U.S. Cl.
CPC ........... *H01Q 1/3275* (2013.01); *H01Q 1/521* (2013.01); *H01Q 5/40* (2015.01); *H01Q 9/36* (2013.01); *H01Q 21/28* (2013.01)

(58) Field of Classification Search
CPC ........ H01Q 1/3275; H01Q 1/36; H01Q 1/362; H01Q 1/42; H01Q 1/52; H01Q 1/521;
(Continued)

(56) References Cited

U.S. PATENT DOCUMENTS 8,519,898 B2 8/2013 Sampo et al.
11,133,579 B2 9/2021 Sonozaki et al.
(Continued)

FOREIGN PATENT DOCUMENTS

EP 3419109 A1 12/2018
EP 3605735 A1 2/2020
(Continued)

OTHER PUBLICATIONS

Extended European search report issued on Sep. 20, 2024, in corresponding European patent Application No. 21898133.0, 11 pages.

(Continued)

*Primary Examiner* — Robert Karacsony
(74) *Attorney, Agent, or Firm* — XSENSUS LLP

(57) ABSTRACT

In order to ensure isolation between a plurality of antenna elements arranged in a narrow space while reducing a size of an antenna device for a vehicle, an antenna device (100) for a vehicle includes an antenna case (101), a base (102) forming an accommodation space together with the antenna case (101), and a first antenna element (122) and a second antenna element (123) that are accommodated in the accommodation space. The first antenna element (122) and the second antenna element (123) at least transmit or receive radio waves in different frequency bands. The first antenna element (122) at least partially has a meandering shape in a first direction that intersects polarization of radio waves transmitted or received by the second antenna element (123).

18 Claims, 56 Drawing Sheets

(51) Int. Cl.
*H01Q 5/40* (2015.01)
*H01Q 9/36* (2006.01)
*H01Q 21/28* (2006.01)

(58) Field of Classification Search
CPC ........... H01Q 1/525; H01Q 5/40; H01Q 9/36; H01Q 11/08; H01Q 21/24; H01Q 21/28
See application file for complete search history.

(56) References Cited

U.S. PATENT DOCUMENTS

| | | | | |
|---|---|---|---|---|
| 11,456,524 | B2 | 9/2022 | Terashita et al. | |
| 2012/0026050 | A1 | 2/2012 | Sampo et al. | |
| 2016/0064807 | A1 | 3/2016 | Reed et al. | |
| 2019/0027819 | A1 | 1/2019 | Terashita et al. | |
| 2020/0295443 | A1 * | 9/2020 | Sonozaki | C08G 63/065 |
| 2022/0384939 | A1 | 12/2022 | Terashita et al. | |

FOREIGN PATENT DOCUMENTS

| | | | |
|---|---|---|---|
| JP | 2012-034226 | A | 2/2012 |
| JP | 2016-208383 | A | 12/2016 |
| WO | 2017/141635 | A1 | 8/2017 |
| WO | 2019/078303 | A1 | 4/2019 |

OTHER PUBLICATIONS

International Search Report and Written Opinion mailed on Feb. 15, 2022, received for PCT Application PCT/JP2021/043509, filed on Nov. 26, 2021, 9 pages including English Translation.

* cited by examiner (a)

(b)

(a)

(b)

(a)
(b)
(c)

ANTENNA DEVICE FOR A VEHICLE

CROSS-REFERENCE TO RELATED APPLICATIONS

The present application is based on PCT filing PCT/JP2021/043509, filed Nov. 26, 2021, which claims priority to Japanese Patent Application No. 2020-196868, filed Nov. 27, 2020, the entire contents of each are incorporated herein by reference.

TECHNICAL FIELD

The present invention relates to an antenna device for a vehicle.

BACKGROUND ART

A composite antenna device mounted on a vehicle for receiving or transmitting signals of a plurality of media is known (for example, see Patent Documents 1 and 2). The composite antenna device is often provided with a plurality of antenna elements in order to receive or transmit signals in different frequency bands depending on the media.

RELATED DOCUMENT

Patent Document

[Patent Document 1] Japanese Unexamined Patent Publication No. 2016-208383

[Patent Document 2] U.S. Unexamined Patent Publication No. 2016/0064807

SUMMARY OF THE INVENTION

Technical Problem

Although there is a demand for reducing a size of a composite antenna device mounted on a vehicle, when a plurality of antenna elements are arranged close to each other in a narrow space, antenna performance may be degraded due to mutual influences of the antenna elements, circuits connected to the antenna elements, and the like.

An example of an object of the present invention is to ensure isolation between a plurality of antenna elements arranged in a narrow space while reducing a size of an antenna device for a vehicle.

Solution to Problem

One aspect of the present invention is an antenna device for a vehicle including: a case; a base forming an accommodation space together with the case; a first antenna element that is accommodated in the accommodation space and at least transmits or receives radio waves in a first frequency band; and a second antenna element that is accommodated in the accommodation space and at least transmits or receives radio waves in a second frequency band different from that of the first antenna element, in which the first antenna element at least partially has a meandering shape in a first direction that intersects polarization of the second antenna element.

Advantageous Effects of Invention

According to the aspect of the present invention, it is possible to ensure isolation between a plurality of antenna elements arranged in a narrow space while reducing a size of an antenna device for a vehicle.

DESCRIPTION OF EMBODIMENTS

Hereinafter, embodiments of the present invention will be described with reference to the drawings. In addition, in all the drawings, the same constituent elements are denoted by the same reference signs, and the description thereof will not be repeated.

In this specification, unless otherwise specified, ordinal numbers such as “first”, “second”, “third”, and the like are added merely to distinguish similarly termed configurations and do not imply any particular feature (for example, an order or importance) of the configurations.

First Embodiment

An antenna device for a vehicle (hereinafter also simply referred to as "antenna device") 100 according to a first embodiment of the present invention is attached on, for example, a roof of a vehicle.

The antenna device for a vehicle includes a plurality of antenna elements, and the plurality of antenna elements correspond to radio waves in a plurality of different frequency bands. Each antenna element of the plurality of antenna elements transmits and receives radio waves in a relevant frequency band.

"Transmitting and receiving" means at least transmitting or receiving, and specifically includes performing either transmission or reception, and performing both of transmission and reception. In the following, "transmission and reception" are used in the same sense as above.

In the following description, "front" or "front side" refers to a front side of a vehicle to which the antenna device 100 is attached, and "rear" or "rear side" refers to an opposite side thereof, that is, a rear side of the vehicle. "Right" or "right side" is a right side as seen by a driver of the vehicle, and "left" or "left side" is an opposite side thereof. "Lower" or "lower side" is a direction of gravity of the vehicle to which the antenna device 100 is attached, and "upper" or "upper side" is an opposite direction thereof.

Figure 1:
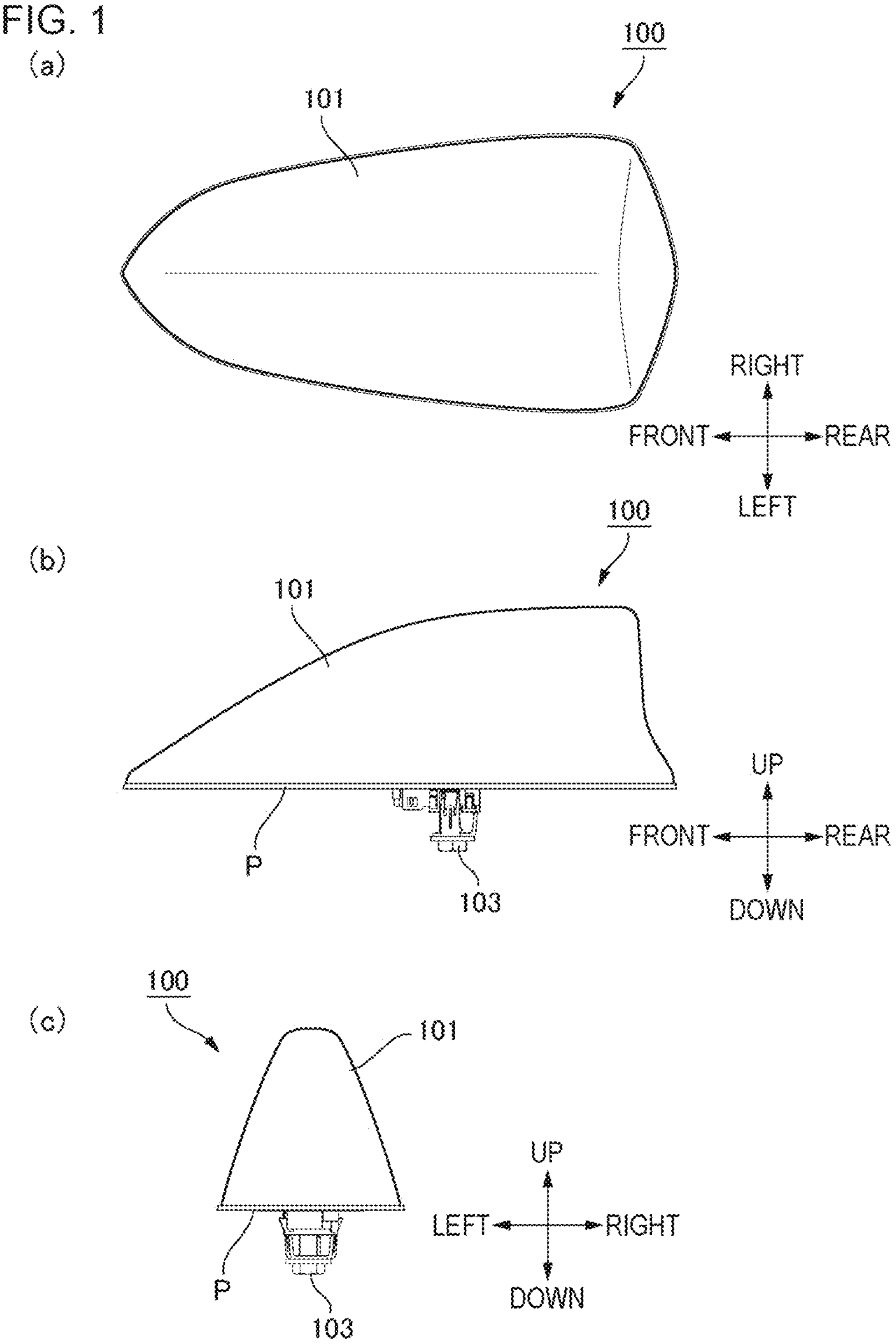
FIG. 1 is views showing an appearance of an antenna device for a vehicle according to a first embodiment of the present invention, in which (a) is a plan view, (b) is a left side view, and (c) is a rear view.

The antenna device 100 generally includes an antenna case 101, an antenna base 102, and a capture unit 103, as shown in FIG. 1.

Here, FIG. 1 is views showing an appearance of an antenna device 100 according to the present embodiment, in which (a) is a plan view, (b) is a left side view, and (c) is a rear view.

(Configuration of Antenna Case 101)

The antenna case 101 is a hollow member made of synthetic resin having radio wave transmittance and is formed in a streamlined shape (generally called a shark fin shape) such that the antenna case becomes thinner and lower toward the front side, and side faces thereof are directed inward (center axis in a front-rear direction) as it goes upward.

A lower end portion of the antenna case 101 includes an opening surface portion forming an opening.

Regarding outer dimensions of the antenna case 101, for example, a length in the front-rear direction is about 190 mm to 200 mm, a length in an up-down direction is about 60 mm to 65 mm, and a length in a left-right direction is about 70 mm to 75 mm.

(Configuration of Antenna Base 102)

The antenna base 102 includes an outer edge or the vicinity of the outer edge that is fitted to the opening surface portion of the antenna case 101 so as to close at least a part of the opening of the antenna case 101. As a result, the antenna case 101 is locked to the antenna base 102, and the antenna base 102 forms an accommodation space together with the antenna case 101. A method of attaching the antenna case 101 to the antenna base 102 is not limited to locking, and screwing, adhesion, welding using laser or ultrasonic waves, or the like may be adopted.

The accommodation space accommodates a plurality of types of antennas (details will be described later) for transmitting and receiving radio waves in a plurality of frequency bands.

Figure 2:
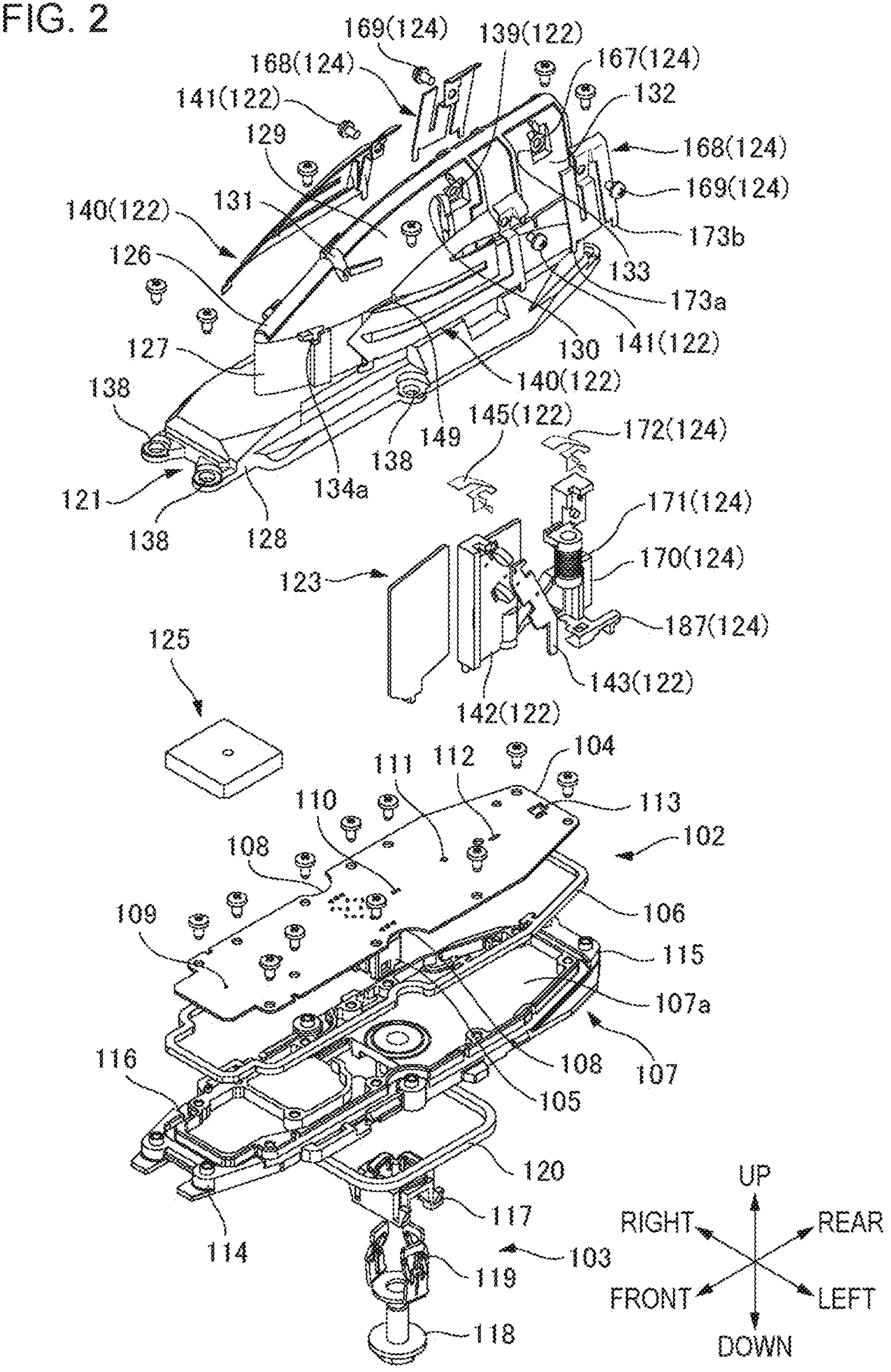
FIG. 2 is an exploded perspective view of the antenna device for a vehicle according to the first embodiment.

Specifically, as shown in FIG. 2, the antenna base 102 includes a first circuit board 104, a connector 105, an O-ring 106, a base 107, and an attachment boss portion (not shown) through which the connector 105 passes.

The base 107 in the present embodiment is composed of a conductive base 107*a* as shown in FIG. 2.

The base 107 may be composed of only the conductive base 107*a* or may be composed of the conductive base 107*a* and an insulating base. Further, the base 107 may be composed of the insulating base and a metal plate or may be composed of the insulating base, the conductive base 107*a*, and the metal plate.

Here, FIG. 2 is an exploded perspective view of the antenna device 100 for a vehicle according to the present embodiment. In FIG. 2, the antenna case 101 and a first helical element 144, which will be described later, are not shown.

The conductive base 107*a* is a conductor that becomes the same potential as a roof of a vehicle after being attached to the roof and is produced in a predetermined shape by, for example, die casting.

The base 107 may be, for example, a metal plate, on which a metal sheet is formed, instead of the conductive base 107*a*. The base 107 may also include a combination of the conductive base 107*a* and the metal plate.

The first circuit board 104 is elongated in the front-rear direction and includes left and right constricted portions 108, first to fifth through-holes 109 to 113, and screw holes into which a plurality of screws are respectively inserted.

The left and right constricted portions 108 are portions in which outer edges are cut inward in an arc shape at approximately the center or slightly in front of the center of the first circuit board 104 in the front-rear direction.

The first to fifth through-holes 109 to 113 are through-holes in the up-down direction arranged in order from the front side of the first circuit board 104 at approximately the center of the first circuit board 104 in the left-right direction.

More specifically, the first through-hole 109 is a hole provided in the vicinity of a front end portion of the first circuit board 104 and has a shape of a circle or a quadrilateral such as a square, a rectangle, or the like when viewed from above.

Here, the vicinity means a position relatively close in distance to a reference position such as the front end portion, and the same also applies hereinafter.

The second through-hole 110 is a hole provided slightly behind the constricted portion 108 in the front-rear direction, and has, for example, a rectangular shape elongated in the front-rear direction when viewed from above. The fifth through-hole 113 is a hole provided in the vicinity of the rear end portion of the first circuit board 104 and has a quadrilateral shape elongated in the front-rear direction when viewed from above.

The third through-hole 111 and the fourth through-hole 112 are provided between the second through-hole 110 and the fifth through-hole 113 at approximately equal intervals. The third through-hole 111 has, for example, a circular shape when viewed from above, and the fourth through-hole 112 has, for example, a quadrilateral shape elongated in the front-rear direction when viewed from above.

The positions and shapes of the first to fifth through-holes 109 to 113 described here are merely examples and may be changed as appropriate.

The connector 105 is fixed to a lower surface of the first circuit board 104 between the left and right constricted portions 108 and protrudes downward.

The O-ring 106 is a soft insulator having an enclosing shape.

The base 107 is formed in such a shape that when the base 107 is fitted so as to close the opening of the opening surface portion of the antenna case 101, the vicinity of an outer periphery of the base 107 is locked to the opening surface portion of the antenna case 101.

In the present embodiment, the base 107 is formed such that the conductive base 107*a* included therein closes the opening of the opening surface portion of the antenna case 101.

However, without being limited to this, the base 107 may be formed such that an insulating base or a metal plate closes the opening of the opening surface portion of the antenna case 101, or any combination of the insulating base, the conductive base 107*a*, and the metal plate closes the opening of the opening surface portion of the antenna case 101.

The base 107 is treated with cationic coating, and a surface thereof is covered with a coating film. This is an example of improving water resistance, rust resistance, and insulation from the vehicle and the first circuit board 104, and the base 107 does not have to be covered with the coating film. The base 107 has a strength for holding parts constituting the antenna device 100 such as the antenna case 101, an inner case 121 to be described later, and an antenna element.

Further, the base 107 includes a through-hole in the up-down direction into which the connector 105 is inserted. Further, an upper surface of the base 107 is provided with a front protrusion portion 114 and a rear protrusion portion 115 protruding upward in the vicinity of a front end portion and the vicinity of a rear end portion, respectively, and a ridge portion 116 protruding upward with an enclosing shape to be fitted into the O-ring 106.

Each of the front protrusion portion 114 and the rear protrusion portion 115 is provided with two female screws arranged in the left-right direction.

An outer surface of the ridge portion 116 is configured to be fitted with the O-ring 106 and to be flush with an outer periphery of the circuit board 104. In addition, the ridge portion 116 includes thick portions formed to be thick, and each of the thick portions is provided with a female screw for screwing a screw passing through the screw hole of the first circuit board 104. Here, "screwing" means to fit together by screw action, and the same also applies hereinafter.

(Configuration of Capture Unit 103)

The capture unit 103 is a portion for grounding and is fixed while being inserted into an attachment hole provided in an attachment surface portion of the roof of the vehicle. The antenna device 100 is attached to the attachment surface portion by fixing the capture unit 103 to the attachment surface portion.

Specifically, as shown in FIG. 2, the capture unit 103 includes the connector 105, a pre-lock holder 117, a bolt 118, a vehicle fixing claw member 119, a sealing member 120, and an attachment boss portion (not shown).

The pre-lock holder 117 includes a locking claw that fits around an attachment hole of the roof of the vehicle when the connector 105 is inserted and fitted into the attachment hole. By fitting the locking claw around the attachment hole, the antenna device 100 can be temporarily fixed to the attachment surface portion before the bolt 118 is fastened. This makes it possible to improve attachability of the antenna device 100 to the roof of the vehicle.

By fastening the bolt 118 after the temporary fixation, a claw of the vehicle fixing claw member 119 is opened. Thereafter, a tip of the vehicle fixing claw member 119 scrapes a coated surface of the roof of the vehicle, so that the roof and the base 107 are electrically connected to have substantially the same potential and are mechanically fixed.

The sealing member 120 is an elastic member fixed to a lower surface of the base 107 with a pressure-sensitive adhesive or the like and has an enclosing shape, for example, a substantially quadrilateral shape. By fastening the bolt 118, the sealing member 120 is compressed between the roof and the base 107 due to elasticity thereof.

By providing such a sealing member 120, it is possible to prevent dust and liquid droplets from entering an inside of the vehicle through the attachment hole of the roof. In addition, it is possible to prevent dust and liquid droplets from entering an inside of the antenna device 100 through the through-hole of the base 107.

(Arrangement Structure of Parts in Accommodation Space)

Figure 3:
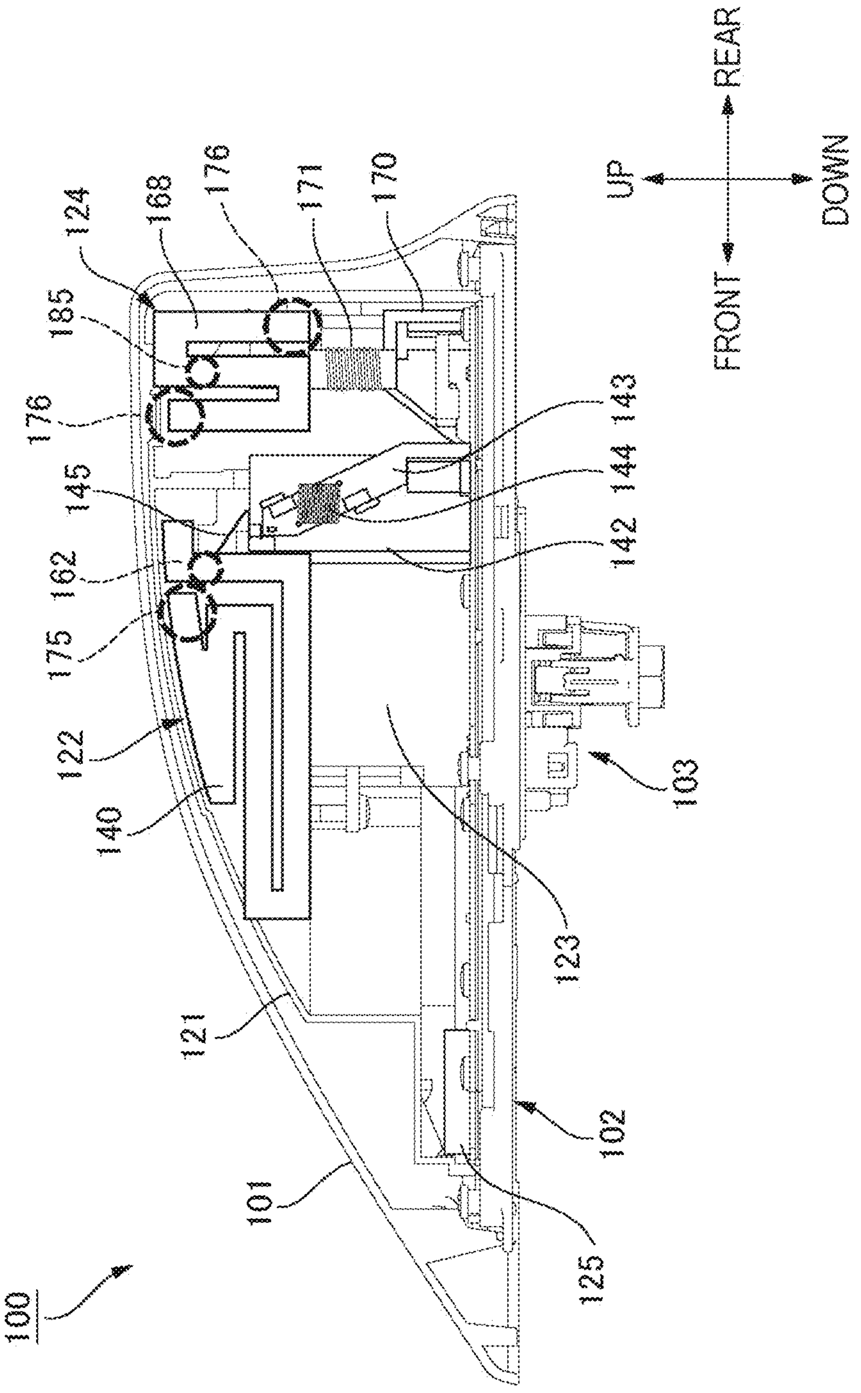
FIG. 3 is a left side view of the antenna device for a vehicle according to the first embodiment, showing an inside of an accommodation space in a state in which an antenna case and an inner case are removed at approximately centers thereof in a left-right direction.

The accommodation space of the antenna device 100 is provided with the inner case 121, a first antenna element 122, a second antenna element 123, a third antenna element 124, and a fourth antenna element 125, as shown in FIG. 2 and FIG. 3 in which a left side view is shown.

Here, FIG. 3 is a left side view of the antenna device 100, showing an inside of the accommodation space in a state in which the antenna case 101 and the inner case 121 are removed at approximately the center in the left-right direction.

(Configuration of Inner Case 121)

The inner case 121 is a member made of synthetic resin having radio wave transmittance and is configured by combining parts that are divided at approximately the center in the left-right direction. Hereinafter, a configuration of the inner case 121 will be described in a state in which left and right parts are combined. In addition, the inner case 121 may be integrally molded.

The inner case 121 is hollow, and an outer surface thereof has a shape corresponding to a shape of an inner surface of the antenna case 101. A lower end portion of the inner case 121 forms an opening and is arranged to be in contact with the O-ring 106 attached to the base 107. In the present embodiment, the conductive base 107*a* of the base 107 and the lower end portion of the inner case 121 are engaged with each other via the O-ring 106.

Specifically, the inner case 121 includes a streamline-shaped portion 126, a connection wall portion 127, and a base attachment portion 128.

The streamline-shaped portion 126 is a portion generally formed in a streamlined shape such that it becomes thinner and lower toward the front side, and side faces thereof are directed inward as it goes upward. The streamline-shaped portion 126 includes left and right first element attachment portions 129, a first conductor insertion hole 130 penetrating in the left-right direction, a locking groove portion 131, left and right second element attachment portions 132, and a second conductor insertion hole 133 penetrating in the left-right direction.

The left and right first element attachment portions 129 are formed symmetrically, and a first capacitance loading element 140, which will be described later, is arranged in each of them. When viewed from the side, an outer edge of each of the first element attachment portions 129 has a substantially right-angled triangular shape that narrows in width in the up-down direction toward the front, and an oblique side forms a curved line that bulges slightly upward.

Figure 4:
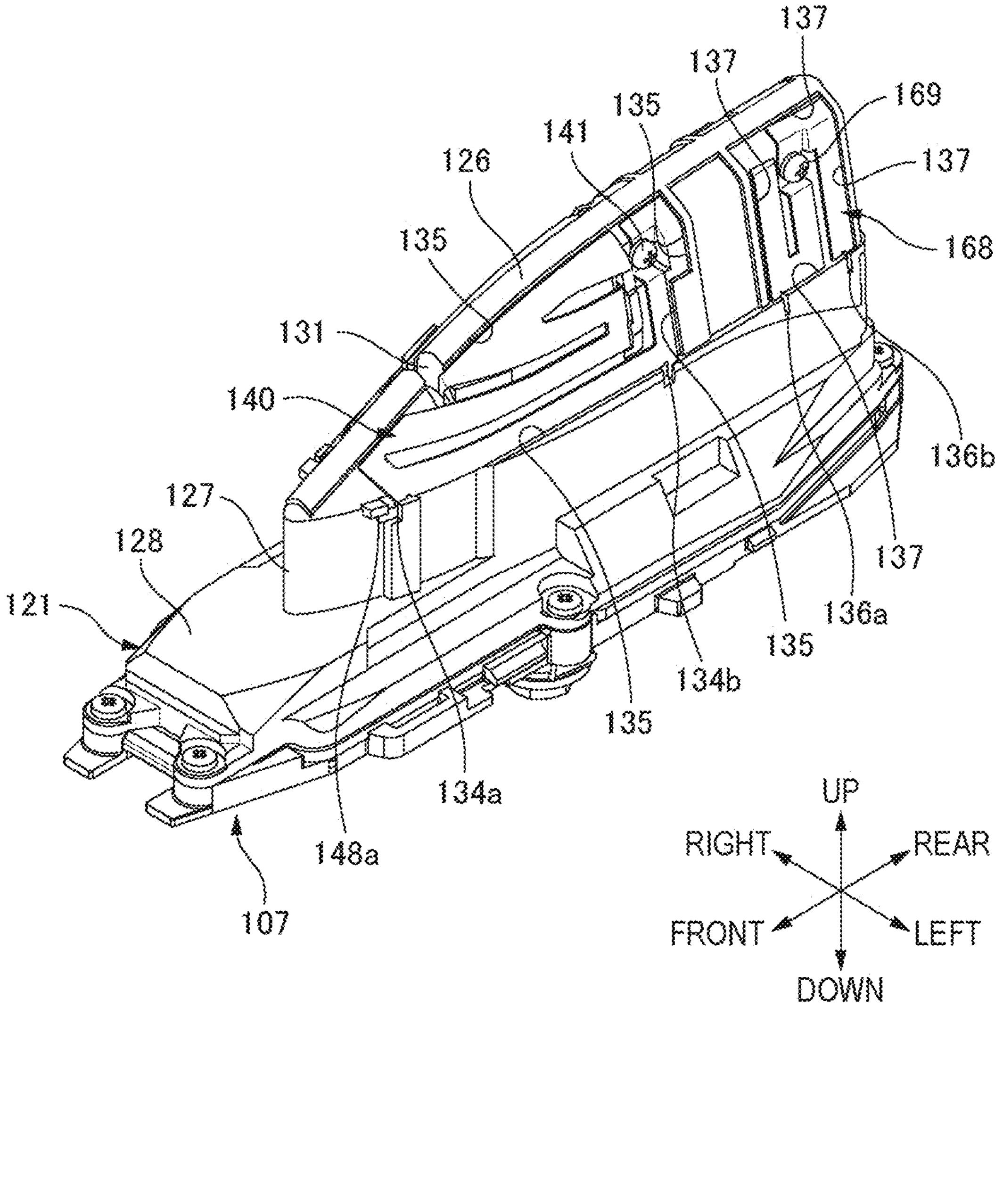
FIG. 4 is a perspective view of the antenna device for a vehicle according to the first embodiment in a state in which the antenna case is not attached.

As shown in the perspective view of FIG. 4, each of the first element attachment portions 129 includes first engagement piece fitting portions 134*a* and 134*b* provided on the front and rear sides, and first stepped portions 135 formed at an upper end portion, a rear end portion, and a lower end portion by ribs protruding outward.

The first engagement piece fitting portion 134*a* on the front side is provided at a lower front end portion of the first element attachment portion 129 and is surrounded by wall surface portions on the front, rear, left, and right sides to form a substantially rectangular parallelepiped space extending in the front-rear direction. Approximately front half of the first engagement piece fitting portion 134*a* is covered with a wall portion, and approximately rear half of the first engagement piece fitting portion 134*a* is provided with an opening that is open upward.

The first engagement piece fitting portion 134*b* on the rear side is provided at a lower rear end portion and is surrounded by wall surface portions on the front, rear, left, and right sides to form a substantially rectangular parallelepiped space extending in the front-rear direction. Approximately rear half of the first engagement piece fitting portion 134*b* is covered with a wall portion, and approximately front half of the first engagement piece fitting portion 134*b* is provided with an opening that is open laterally.

The first conductor insertion hole 130 is a cylindrical hole penetrating in the left-right direction in the vicinity of an upper end portion of the first element attachment portion 129 and in front of the first stepped portion 135 on the rear side.

The locking groove portion 131 is a portion that forms a groove penetrating in the left-right direction and is provided in a portion that slopes gently downward at the front of a portion that forms a ridgeline of the streamline-shaped portion 126. The locking groove portion 131 according to the present embodiment is provided slightly forward from the center of the first element attachment portion 129 in the front-rear direction.

The left and right second element attachment portions 132 are formed in left-right symmetry, and a second capacitance loading element 168, which will be described later, is arranged in each of them. A shape of an outer edge of each of the second element attachment portions 132 is substantially rectangular when viewed from the side.

Each of the second element attachment portions 132 includes second engagement piece fitting portions 136*a* and 136*b* provided on the front and rear sides of a lower end portion and second stepped portions 137 formed at an upper end portion, the lower end portion, a front end portion and a rear end portion by ribs protruding outward. Each of the second engagement piece fitting portions 136*a* and 136*b* forms a substantially rectangular parallelepiped space that is open upward by being surrounded by wall surface portions on the front, rear, left, and right sides. The front end portion of each of the second engagement piece fitting portions 136*a* and 136*b* is provided with a slit for lateral opening.

The second conductor insertion hole 133 is a cylindrical hole penetrating in the left-right direction in the vicinity of the upper end portions of the left and right second element attachment portions 132 and at approximately the center of the front and rear second stepped portions 137.

The connection wall portion 127 is a portion extending downward from a lower end portion of the streamline-shaped portion 126 and connected to the base attachment portion 128.

The base attachment portion 128 is connected to a lower end portion of the connection wall portion 127 and is attached to the base 107. An outer edge of the base attachment portion 128 when viewed from above has substantially the same shape as the outer edge of the base 107. The base attachment portion 128 includes a base attachment screw hole 138 through which a screw for attaching the inner case 121 to the base is inserted and arranged in the up-down direction.

In the present embodiment, two base attachment screw holes 138 are provided in each of the vicinity of the front end portion and the vicinity of the rear end portion, and one base attachment screw hole 138 is provided substantially at each of left and right centers.

As shown in the perspective view of FIG. 4, the inner case 121 is attached to the base 107 by screwing the screw passing through the base attachment screw hole 138 into each of the female screws of the front protrusion portion 114 and the rear protrusion portion 115. Here, FIG. 4 is a perspective view of the antenna device 100, showing a state in which the antenna case 101 is not attached.

At this time, the O-ring 106 is compressed between the lower end portion of the inner case 121 and the base 107 due to elasticity thereof. As a result, a gap between the lower end portion of the inner case 121 and the base 107 is closed, and it is possible to prevent dust and liquid droplets from entering an internal space formed by the inner case 121 and the base 102 through the gap.

Here, the internal space is a closed space formed by the inner case 121 and the base 107 and forms a part of the accommodation space formed by the antenna case 101 and the base 107.

(Configuration of First Antenna Element 122)

The first antenna element 122 transmits and receives radio waves in a first frequency band.

The first antenna element 122 according to the present embodiment receives AM broadcast radio waves (522 kHz to 1710 kHz) and FM broadcast radio waves (76 MHz to 108 MHz).

The first antenna element 122 includes a first connection conductor 139, left and right first capacitance loading elements 140, and a first fastener 141 that are attached to the inner case 121. Further, the first antenna element 122 includes a first holder 142 that is provided on the first circuit board 104, and a second circuit board 143, a first helical element 144, and a first spring contact metal member 145 that are attached to the first holder 142.

Figure 5:
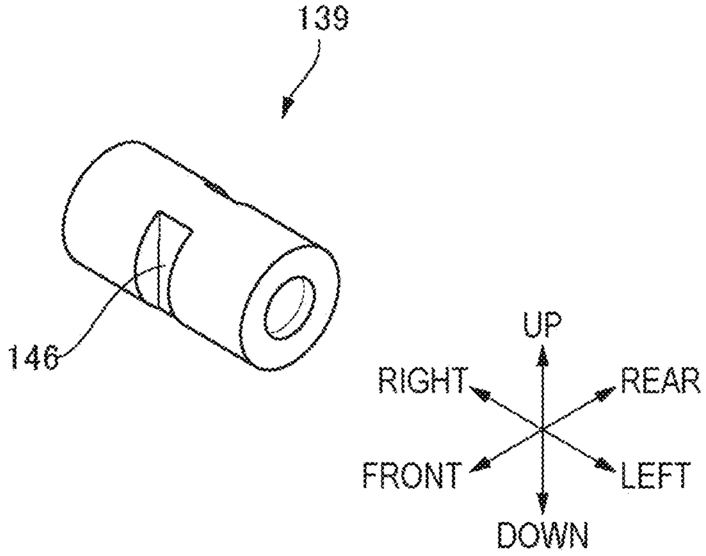
FIG. 5 is a perspective view of a first connection conductor according to the first embodiment.

The first connection conductor 139 is a cylindrical conductor and is arranged in the first conductor insertion hole 130, as shown in FIG. 5. A pair of groove portions 146 are provided on an outer surface of the first connection conductor 139 at approximately the center along an axial direction and at approximately opposing positions within a plane perpendicular to the axial direction. Since the first connection conductor 139 has a simple configuration, manufacturing costs can be suppressed.

Each of the first capacitance loading elements 140 is a conductor arranged on the first element attachment portion 129 and is shaped to match a shape of the first element attachment portion 129.

Figure 6:
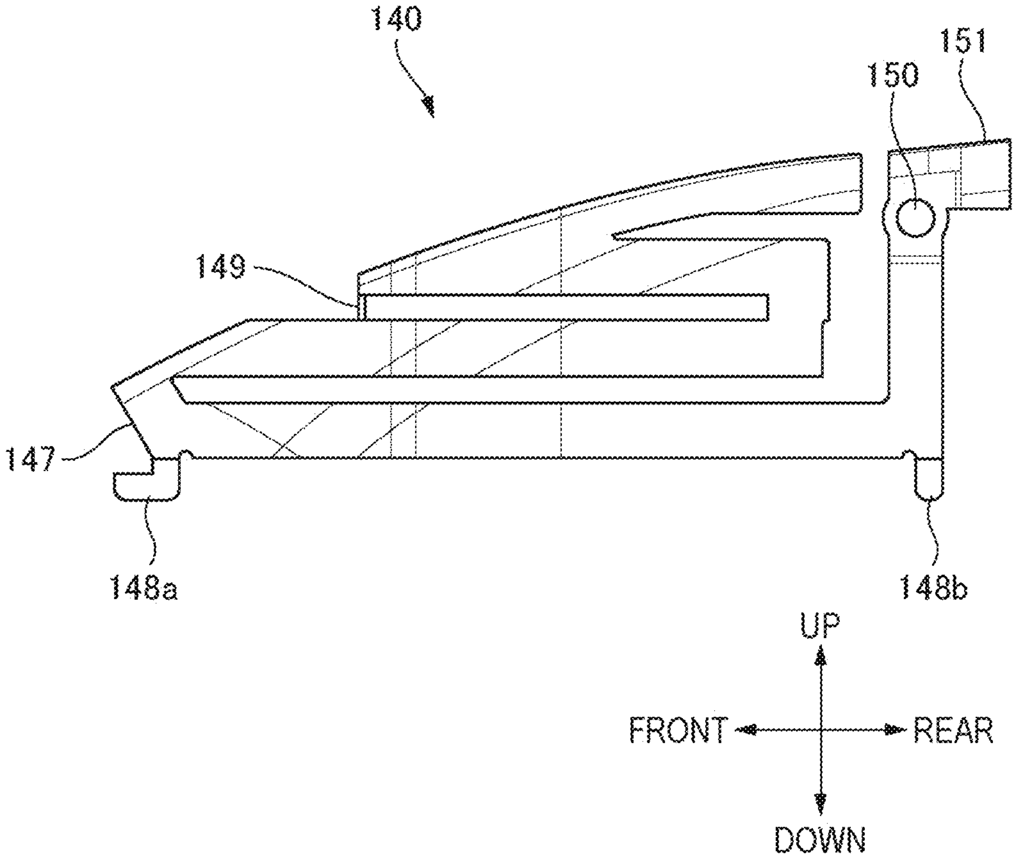
FIG. 6 is a left side view of a first capacitance loading element according to the first embodiment.

That is, each of the first capacitance loading elements 140 is a conductor that is curved to match the shape of the first element attachment portion 129. When viewed from the side, a shape formed by an outer edge of each of the first capacitance loading elements 140 is a substantially right-angled triangular shape that narrows in width in the up-down direction toward the front, and the hypotenuse forms a curved line that bulges slightly upward, as shown in FIG. 6.

The first capacitance loading element 140 itself does not resonate in the FM band, but functions as a capacitance loading element that adds (loads) a ground capacitance to the first helical element 144, which will be described later. This makes it possible to improve an antenna gain of the first antenna element 122.

In the present embodiment, two first capacitance loading elements 140 are provided. This makes it possible to improve the antenna gain of the first antenna element 122 compared to a case where the first capacitance loading element 140 is one.

Since the first capacitance loading element 140 is arranged in the first element attachment portion 129, the first capacitance loading element 140 is provided outside the inner case 121. Thus, the first capacitance loading element 140 is positioned higher in the up-down direction compared to a case where the first capacitance loading element 140 is provided inside the inner case 121, so that the antenna gain of the first antenna element 122 can be improved.

It is desirable that a thickness of each of the first capacitance loading elements 140 is thinner than a step of the first stepped portion 135. Thus, in an assembling process, it is possible to prevent work gloves or clothes of a worker from being caught on the first capacitance loading element 140 and prevent deformation of the first capacitance loading element 140 caused by the work gloves or clothes of the worker being caught. Therefore, it is possible to improve work efficiency and prevent damage to parts.

Each of the first capacitance loading elements 140 is made by, for example, punching, and stainless steel is suitable for a material thereof. By adopting stainless steel, it is possible to achieve rust resistance, rigidity, and electrical conductivity.

Specifically, each of the first capacitance loading elements 140 has a meandering shape in the first direction at least in part and includes an inclined portion 147 at a front end portion, first engagement pieces **148*a* and 148*b*, and a locking protrusion portion 149, a first fastening hole 150, and an extension portion 151**.

The meandering shape is a shape that includes at least one folded portion, that is, at least one serpentine shape. In a state in which the capacitance loading element having the meandering shape is attached to the antenna device 100 for a vehicle, an extending direction and a length of each of sections constituting the meandering shape are represented by, for example, a magnitude of each component in first and second directions that intersect each other, and a third direction perpendicular to them.

By adjusting the number of sections along a main direction included in the meandering shape and lengths of the sections, an electrical length of a conductor formed in the meandering shape can be adjusted.

The first direction is a direction along a main surface of the base 107 and corresponds to the front-rear direction in the present embodiment.

More specifically, as can be seen, for example, with reference to FIG. 2, the meandering shape of the first capacitance loading element 140 is generally formed in a serpentine shape including conductors in the up-down direction and conductors in the front-rear direction, which extends forward while slightly inclining downward from the upper side, and thereafter extends rearward, extends short downward, extends long forward, extends short downward, extends rearward, and then extends upward in order.

In such a meandering shape of the first capacitance loading element 140, in a case of comparing a conductor region of a portion in the front-rear direction with a conductor region of a portion in the up-down direction, the conductor region of the portion in the front-rear direction is larger than the conductor region of the portion in the up-down direction. Therefore, the meandering shape included in the first capacitance loading element 140 is a meandering shape mainly composed of the conductors extending in the front-rear direction.

That is, in the present embodiment, the first direction is the front-rear direction, and it can be said that the first capacitance loading element 140 shown in FIG. 3 has a configuration in which the conductors forming the first capacitance loading element 140 extend in the front-rear direction and folded portions in the up-down direction are provided. Such a configuration is used for the first capacitance loading element 140 having a meandering shape in the first direction.

The inclined portion 147 is inclined rearward from the upper side toward the lower side when viewed from the side. As a result, a distance to the fourth antenna element 125 provided on the front side can be made greater compared to a case where the inclined portion 147 is not provided. Therefore, it becomes possible to ensure isolation of the fourth antenna element 125 and improve an antenna gain in a fourth frequency band by the fourth antenna element 125.

The first engagement piece **148*a* is a portion extending forward from a front lower end portion of the inclined portion 147 and is inserted into the first engagement piece fitting portion 134*a* through the opening of the first engagement piece fitting portion 134*a* to be locked to the first engagement piece fitting portion 134*a*. The first engagement piece 148*b* is a portion extending downward from a lower rear end portion of the inclined portion 147 and is inserted into the first engagement piece fitting portion 134*b* through the opening of the first engagement piece fitting portion 134*b* to be locked to the first engagement piece fitting portion 134*b***.

The locking protrusion portion 149 is a portion protruding downward from a front end portion of a conductor that is inclined forward and downward at the upper side and is locked by being fitted into the locking groove portion 131.

The first fastening hole 150 is a hole penetrating in the left-right direction and is positioned to the side of the first connection conductor 139 when the first engagement pieces **148*a* and 148*b* and the locking protrusion portion 149 are respectively fitted into the first engagement piece fitting portions 134*a* and 134*b* and the locking groove portion 131**.

The extension portion 151 is a portion extending rearward from an upper end portion of a portion extending in the up-down direction at the rearmost side of the meandering shape. By providing the extension portion 151, a size of the first capacitance loading element 140 can be increased within a range that does not interfere with other antenna elements, so that the antenna gain in the first frequency band can be improved.

In this way, the first capacitance loading element 140 has a relatively complicated shape including a meandering shape. By adopting such a complicated shape, a natural frequency as a structure of the first capacitance loading element 140 is increased. As a result, for example, a frequency of vibration noise (so-called chattering noise) generated from the first capacitance loading element 140 due to running vibration of the vehicle to which the antenna device 100 is attached can be outside a human audible range. Therefore, discomfort during use can be reduced without providing a reinforcing member or the like for preventing chattering noise.

The first fastener 141 is a bolt, screw, or the like made of a conductor such as metal. The first fastener 141 is screwed into the first connection conductor 139 by passing through the first fastening hole 150 to be screwed with the first connection conductor 139.

Thus, the left and right first capacitance loading elements 140 are fixed to the left and right first element attachment portions 129, respectively, by the first fasteners 141 screwed into the first connection conductor 139 from the left and right. At this time, the left and right first capacitance loading elements 140 are electrically connected via the first fasteners 141 and the first connection conductor 139.

Here, since the first engagement piece 148 and the locking protrusion portion 149 are locked to the first engagement piece fitting portion 134 and the locking groove portion 131, respectively, the first antenna element 122 may have only one first fastener 141 for fixing the first capacitance loading element 140 to inner case 121. Since there is no need to provide a plurality of fasteners and the like, the number of parts in the entire antenna device 100 can be reduced. Therefore, it is possible to facilitate the assembly of the antenna device 100 and reduce manufacturing costs.

Figure 7:
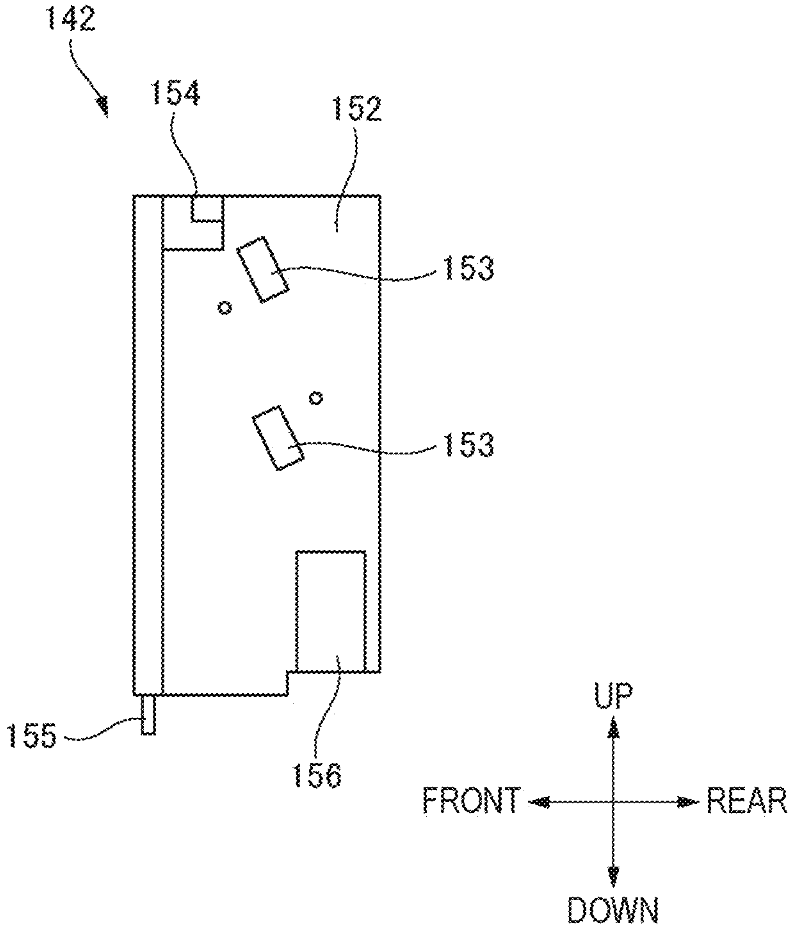
FIG. 7 is a left side view of a first holder according to the first embodiment.

The first holder 142 is a member made of synthetic resin having radio wave transmittance. As shown in the left side view of FIG. 7, the first holder 142 includes a flat plate portion 152, projection pair portions 153, a first metal member attachment portion 154, a first protrusion portion 155, and a co-fastening boss portion 156.

The flat plate portion 152 is a portion having a flat plate shape extending in the front-rear direction and the up-down direction.

The projection pair portions 153 are portions that protrude leftward and are provided in pair in the up-down direction. Each of the projection pair portions 153 is inclined downward and rearward when viewed from the side.

The first metal member attachment portion 154 is provided on a front end upper portion of the flat plate portion 152 and forms a cutout groove that is open leftward.

The first protrusion portion 155 is a portion protruding downward from a front end lower portion of the flat plate portion 152 and is fitted into the third through-hole 111.

The co-fastening boss portion 156 is a portion in which a hole extending upward from a lower end surface is provided and in the present embodiment, is provided at a rear end lower portion with a substantially cylindrical shape.

The second circuit board 143 is a board on which a circuit is provided, and as shown in FIG. 3, is attached to the first holder 142 by fitting the projection pair portions 153 into a pair of cutouts. Thus, relative positions of the second circuit board 143 and the first holder 142 in the up-down direction and the front-rear direction are defined. At this time, the second circuit board 143 is inclined so as to be positioned forward as it goes upward. As a result, the second circuit board 143 can be made smaller with respect to mounting components compared to, for example, a case where the second circuit board 143 is rectangular, so that manufacturing costs of the antenna device 100 can be reduced.

Figure 8:
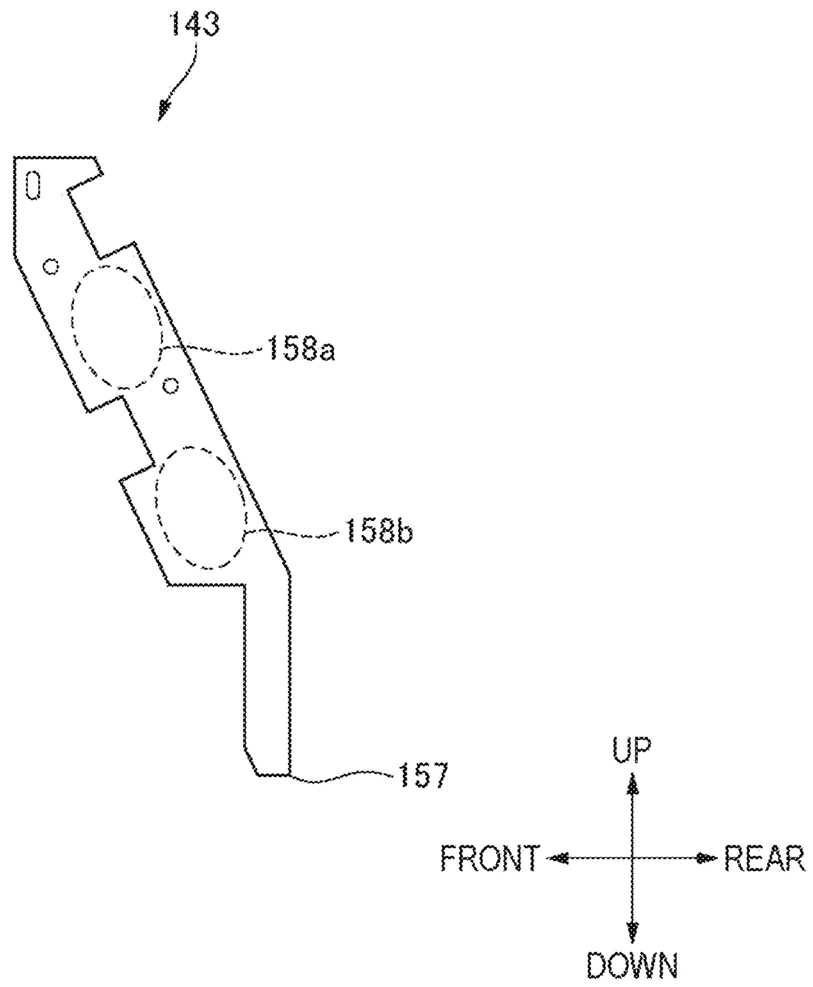
FIG. 8 is a left side view of a second circuit board according to the first embodiment.

In addition, the lower end portion of the second circuit board 143 includes a board protrusion portion 157 that protrudes downward, as shown in the left side view of FIG. 8. The board protrusion portion 157 is fitted into the fourth through-hole 112 and soldered to the first circuit board 104, for example. Thus, the second circuit board 143 is fixed and electrically connected to the first circuit board 104.

The second circuit board 143 is provided with at least one filter circuit in an upper region 158*a* and a lower region 158*b*. In the present embodiment, the region 158*a* is generally a region above a lower end portion of the lower projection pair portion 153. The region 158*b* is generally a region below the lower end portion of the lower projection pair portion 153.

Examples of the filter circuit include the following first to fourth circuits.

The first circuit suppresses the flow of harmonics generated by the first antenna element 122 into the second antenna element 123 and is provided, for example, in the region 158*a*. That is, the first circuit corresponds to a first filter circuit that reduces the influence of harmonics in the first frequency band on the second frequency band.

Specifically, the first circuit cuts off harmonics in the second frequency band generated by the first antenna element 122 to improve isolation, thereby suppressing interference with the second antenna element 123. This makes it possible to prevent deterioration of the antenna gain of the second antenna element 123 due to harmonics, and the first antenna element 122 and the second antenna element 123 can be arranged close to each other.

The second circuit is a circuit that blocks passage of signals in the second frequency band and is provided, for example, in the region 158*a* or the region 158*b*. That is, the second circuit functions as the first filter circuit or a second filter circuit. The second filter circuit is a circuit exhibiting a function of shifting a frequency band of the harmonics in the first frequency band to a frequency band different from the second frequency band or a function of reducing signals of the harmonics in the first frequency band.

The second frequency band is a frequency band different from the first frequency band and is radio waves transmitted and received by the second antenna element 123. The signals whose passage is blocked by the second circuit may be either signals generated by radio waves radiated from the second antenna element 123 or signals generated by radio waves transmitted from a base station.

By providing such a second circuit in the region 158*a* or the region 158*b*, isolation in the second frequency band between the first antenna element 122 and the second antenna element 123 can be improved. As a result, even though the first antenna element 122 and the second antenna element 123 are arranged close to each other, it is possible to prevent deterioration of the antenna gain of the second antenna element 123.

The third circuit is a circuit for shifting the frequency band of the harmonics generated by the first antenna element 122. Specifically, the third circuit can shift the harmonics in the second frequency band generated by the first antenna element 122 to the frequency band different from the second frequency band by adding a filter circuit.

The third circuit is provided in the region 158*a* or the region 158*b*. That is, the third circuit functions as the first filter circuit or the second filter circuit. Thus, the interference with the second antenna element is suppressed, and it is possible to prevent deterioration of the antenna gain of the second antenna element.

By providing the first to third circuits, capacitive coupling between the second antenna element 123 and the first antenna element 122 can prevent the signals in the second frequency band from entering the circuit of the first frequency band. In other words, the first to third circuits can also be called reflection-type filters and since they reflect signals entering the circuit of the first frequency band from the second frequency band, good antenna gain can be maintained by preventing signals in the second frequency band from entering the circuit of the first frequency band.

Figure 9:
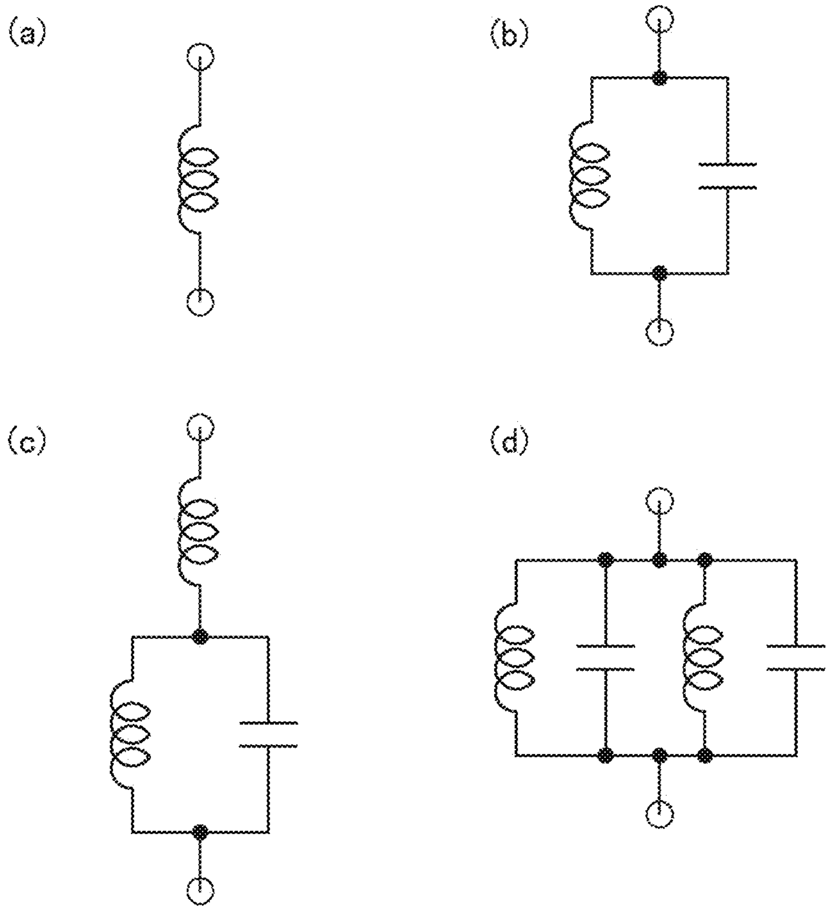
FIGS. 9(*a*) to 9(*d*) are views showing examples of circuit configurations employed in first to fourth circuits according to the first embodiment.

The first to third circuits described so far are implemented, for example, by filters having circuit configurations shown in FIGS. 9(*a*) to 9(*d*). FIG. 9(*a*) is a view showing an example of a circuit configuration of an inductor self-resonant-type filter. FIG. 9(*b*) is a view showing an example of a circuit configuration of a parallel resonant-type filter. FIG. 9(*c*) is a view showing an example of a circuit configuration of a filter combining a self-resonant type and a parallel resonant type. FIG. 9(*d*) is a view showing an example of a circuit configuration of a filter in which two or more parallel resonant-type filters are connected in parallel in order to widen a band of the parallel resonant-type filter.

Figure 10:
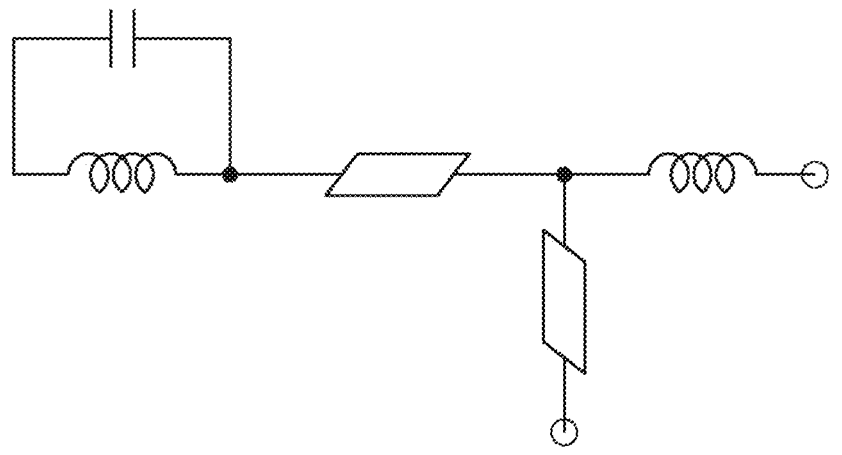
FIG. 10(*a*) is a view showing another example of the circuit configuration of the fourth circuit, and (b) is a view showing still another example of the circuit configuration of the fourth circuit.
Figure 10:
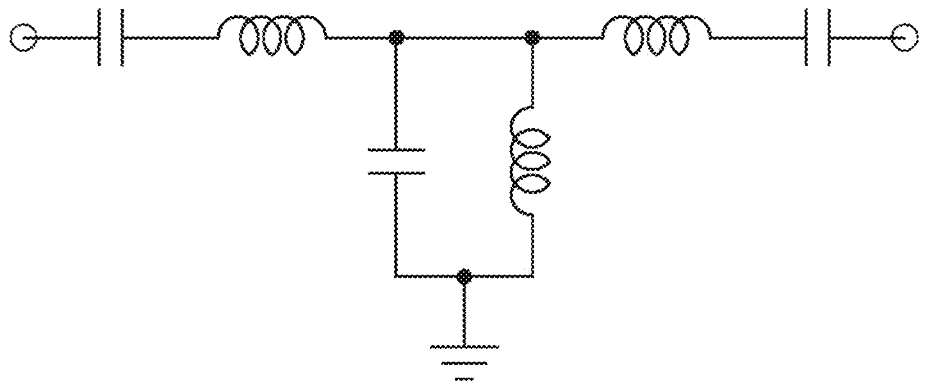

FIGS. 10(*a*) and 10(*b*) are views showing an example of a circuit configuration of the fourth circuit.

The fourth circuit is a filter circuit for attenuating the signal in the second frequency band radiated from the second antenna element 123 or received from the base station and prevents noise from entering the circuit of the first frequency band and malfunction of the circuit of the first frequency band by not inputting the signal in the second frequency band to the circuit of the first frequency band.

The fourth circuit is provided in the vicinity of the second through-hole 110 of the first circuit board 104.

Since the fourth circuit may lower an impedance of a second element or attenuate the second frequency band, it is desirable to combine the fourth circuit with the first to third circuits, and a configuration in which the first to third circuits are connected in series to the fourth circuit is more desirable.

As shown in FIG. 3, the first helical element 144 is composed of a conducting wire spirally wound around a winding axis and at least a part thereof is positioned between the first capacitance loading element 140 and the third antenna element 124. A direction of the winding axis of the first helical element 144 according to the present embodiment is the up-down direction.

Specifically, the first helical element 144 is generally positioned between the upper and lower projection pair portions 153. An upper end portion of the first helical element 144 is connected to any circuit of the first circuit, the second circuit, and the third circuit provided in the region 158*a* of the second circuit board 143.

A lower end portion of the first helical element 144 is connected to either the second circuit or the third circuit provided in the region 158*b* of the second circuit board 143. Thus, one or both of the second circuit and the third circuit provided in the region 158*b* are connected in series between the first helical element 144 and the circuit provided on the first circuit board 104.

Figure 11:
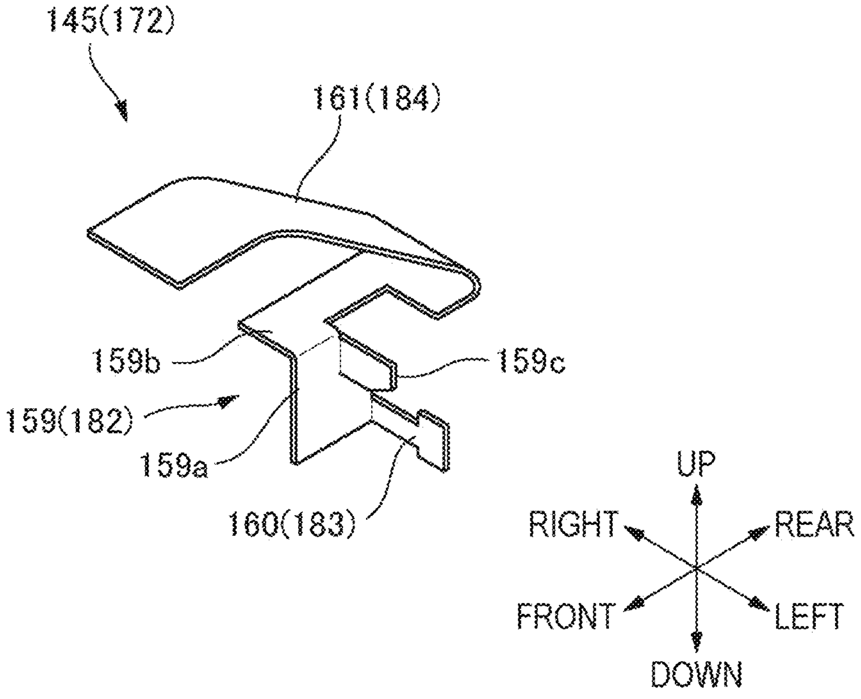
FIG. 11 is a perspective view of a first spring contact metal member according to the first embodiment.

The first spring contact metal member 145 is a member integrally made of metal and as shown in the perspective view of FIG. 11, includes a first held portion 159, a first connection portion 160, and a first contact portion 161.

The first held portion 159 is fixed to the first holder 142 by being press-fitted into the first metal member attachment portion 154.

Specifically, the first held portion 159 includes first to third flat plate portions 159*a* to 159*c* facing three different directions.

The first flat plate portion 159*a* is a portion having a flat plate shape extending in the up-down direction and the front-rear direction. The first flat plate portion 159*a* defines a position of the first spring contact metal member 145 with respect to the first holder 142 in the front-rear direction and the left-right direction by a front end portion and side surfaces thereof contacting the first metal member attachment portion 154.

The second flat plate portion 159*b* is a portion having a flat plate shape extending in the front-rear direction and the left-right direction. The second flat plate portion 159*b* defines a position of the first spring contact metal member 145 with respect to the first holder 142 in the up-down direction by a lower surface thereof contacting the first metal member attachment portion 154.

The third flat plate portion 159*c* is a portion having a flat plate shape extending in the front-rear direction and the left-right direction. The third flat plate portion 159*c* defines a position of the first spring contact metal member 145 with respect to the first holder 142 in the front-rear direction by a rear surface thereof contacting the first metal member attachment portion 154.

In this way, the first held portion 159 defines the positions of the first spring contact metal member 145 with respect to the first holder 142 in all directions.

The first connection portion 160 is a portion protruding leftward. Since the first connection portion 160 passes through a cutout or a through-hole provided in the vicinity of an upper end portion and a front end portion of the second circuit board 143, the first connection portion 160 can be easily fixed to the second circuit board 143 by soldering.

The first contact portion 161 is a portion extending obliquely upward and forward. A base end portion of the first contact portion 161 is curved and connected to the first held portion 159 (a rear end portion of the second flat plate portion 159*b*), so that the first contact portion 161 has elasticity.

When the first antenna element 122 is arranged on the inner case 121 and the base 107 and the inner case 121 is screwed to the base 107, the first contact portion 161 comes into contact with the first connection conductor 139 and is pressed from above. Since the first contact portion 161 repels due to elastic force when being pressed from above, the first contact portion 161 and the first connection conductor 139 are reliably brought into contact with each other and electrically connected at a first contact point 162 shown in FIG. 3.

As a result, the first capacitance loading element 140 is electrically connected to the second circuit board 143 through the first fastener 141, the first connection conductor 139, and the first spring contact metal member 145. As a result, the first circuit provided in the region 158*a* is connected in series between the first capacitance loading element 140 and the first helical element 144.

By arranging the first spring contact metal member 145 in the vicinity of the first helical element 144, an electrical connection can be made reliably with a simple configuration while reducing an electrical length. Therefore, it is possible to reduce manufacturing costs while improving the antenna gain.

Further, according to the first spring contact metal member 145, by adjusting a length of the first contact portion 161, a resonance frequency of a circuit including the first contact portion 161 can be easily adjusted. This makes it possible to reduce mutual interference between the first antenna element 122 and the second antenna element 123 and improve the antenna gains of them.

In addition, a structure in which a tip portion of the first contact portion 161 is folded back may be included. Thus, a distance between the first contact portion 161 and the second antenna element 123 can be increased, and the resonance frequency can be adjusted. Therefore, it is possible to reduce mutual interference between the first antenna element 122 and the second antenna element 123 and improve the antenna gains of them.

(Configuration of Second Antenna Element 123)

At least a part of the second antenna element 123 is positioned between the first capacitance loading element 140 and the base 107, and transmits and receives radio waves in the second frequency band different from the first frequency band. The second frequency band is, for example, a frequency band higher than the first frequency band.

Further, the polarization of the radio waves received by the second antenna element 123 is the second direction intersecting the first direction which is a direction of the meandering shape included in the first antenna element 122.

The second antenna element 123 according to the present embodiment transmits and receives telephone radio waves (700 MHz to 2.7 GHz). Since the telephone radio wave is vertically polarized, the polarization of the telephone radio wave intersects the first direction (front-rear direction) according to the present embodiment.

Specifically, the second antenna element 123 is a conductor made by, for example, punching, and is made of, for example, galvanized steel (SECC). By using the galvanized steel, it is possible to ensure rust resistance, rigidity, electrical conductivity, and solder wettability.

In addition, the second antenna element 123 is not limited to a conductor formed by punching the galvanized steel and may be a member such as a board on which a conductor pattern is formed or a resin on which a conductor is formed using a molded interconnect device (MID).

Figure 12:
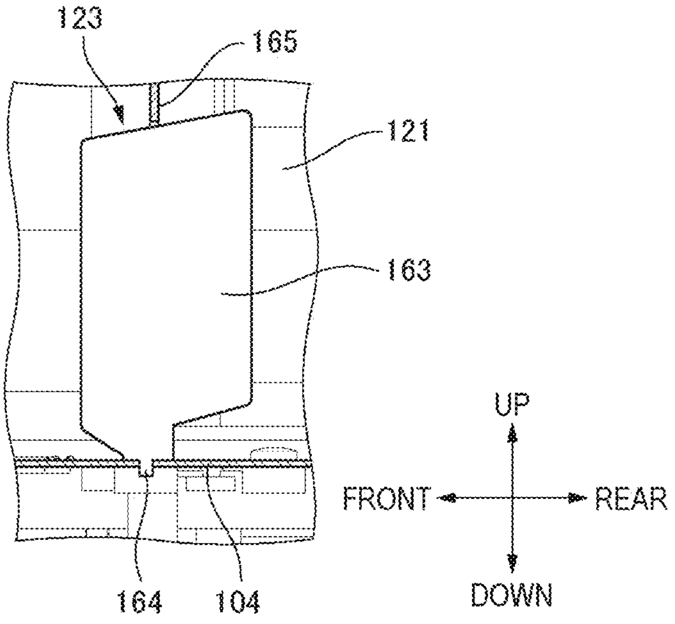
FIG. 12 is an enlarged view showing an example of an aspect in which a second antenna element is attached in the accommodation space according to the first embodiment, (a) being a view from a left side and (b) being a view from a rear side.
Figure 12:
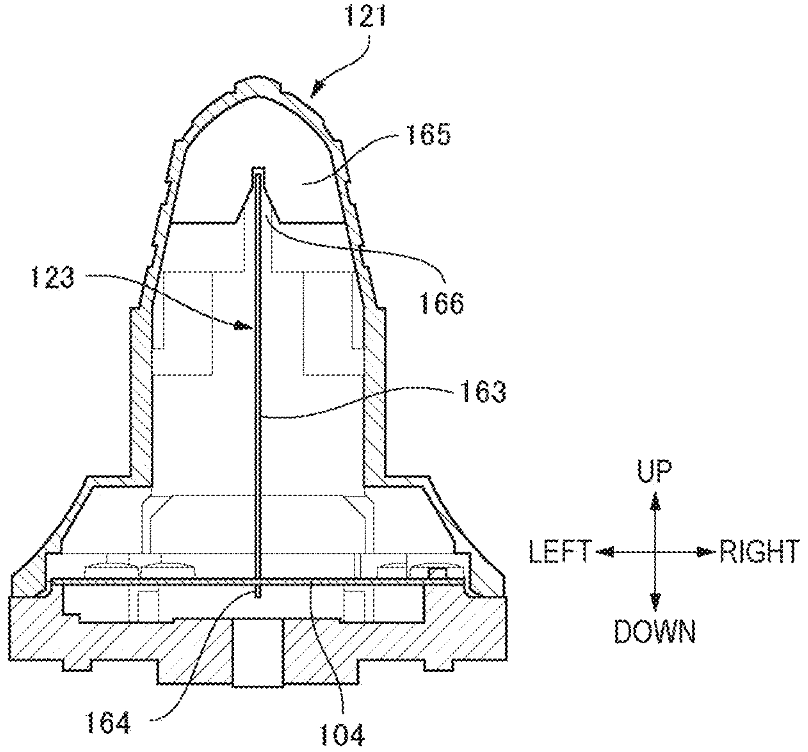

As shown in the front enlarged view of FIG. 12(*a*) and the enlarged view seen from the left side of FIG. 12(*b*), the second antenna element 123 includes a flat plate portion 163 having a generally rectangular flat plate shape and an attachment projection portion 164 projecting downward from a lower end portion of the flat plate portion 163.

Here, as shown in FIGS. 12(*a*) and 12(*b*), the inner case 121 includes a rib 165 on an upper portion of an inner wall corresponding to a position where the second antenna element 123 is arranged.

The rib 165 is a relatively thin plate-like portion extending in the left-right direction and is provided with a tapered slit 166 open downward at approximately the center in the left-right direction. The tapered slit 166 is inclined upward such that a gap in the left-right direction narrows, and an upper end thereof has a narrow gap into which an upper end portion of the second antenna element 123 is loosely fitted.

By having the tapered slit 166, when attaching the second antenna element 123, the second antenna element 123 can be easily guided to a region of the narrow gap of the upper end portion. Therefore, even though there is a manufacturing error or the like, a position of the second antenna element 123 in the left-right direction with respect to the inner case 121 can be easily positioned at a predetermined position.

As described above, since the tapered slit 166 is provided in the rib 165 so that the front, rear, left, and right positions of the second antenna element 123 with respect to the inner case 121 can be easily positioned at predetermined positions, workability can be improved.

Further, when the second antenna element 123 is arranged at a predetermined position of the inner case 121, an upper end portion of the tapered slit 166 presses an upper edge portion of the flat plate portion 163 from above. Thus, a position of the second antenna element 123 in the front-rear direction with respect to the inner case 121 can be easily positioned at a predetermined position. Thus, since there is no need to additionally provide a special case or the like for positioning the second antenna element 123 at a predetermined position, manufacturing costs can be reduced.

Furthermore, the rib 165 provided with the tapered slit 166 is a relatively thin resin wall and therefore has a less electrical influence on the second antenna element 123. This makes it possible to reinforce a strength of the inner case 121 while preventing a decrease in gain.

The upper end portion (a portion within a predetermined range from the upper end) of the tapered slit 166 may be provided with a gap into which the upper end portion of the second antenna element 123 is press-fitted. Thus, the second antenna element 123 can be sandwiched and held by the upper end portion of the tapered slit 166 from the left-right direction. Therefore, for example, it is possible to reduce the vibration noise generated by the vibration of the antenna element 123 when the vehicle on which the antenna device 100 is mounted is running.

The attachment projection portion 164 is fitted into the second through-hole 110 and fixed to the first circuit board 104. For example, soldering may be employed for fixing. Therefore, galvanized steel (SECC), which has good compatibility with solder and is relatively inexpensive, is suitable as a material for the second antenna element 123. By making the second antenna element 123 using galvanized steel, soldering is facilitated so that workability can be improved and the manufacturing costs can be reduced.

At least a part of the second antenna element 123 according to the present embodiment is positioned between the first capacitance loading element 140 and the base 107 as described above. That is, the second antenna element 123 and the first capacitance loading element 140 are positioned such that at least parts thereof overlap each other in the front-rear direction. Thus, the second antenna element 123 and the first capacitance loading element 140 can be arranged close to each other while suppressing mutual interference. Therefore, it is possible to reduce the size of the antenna device 100 while ensuring isolation between the first antenna element 122 and the second antenna element 123.

In addition, the first capacitance loading element 140 has a shape matching a shape of the first element attachment portion 129 and is curved so as to bulge outward as can be seen with reference to FIG. 2. That is, the left first capacitance loading element 140 is curved so as to bulge upward to the left, and the left first capacitance loading element 140 is curved so as to bulge upward to the right.

Since each of the first capacitance loading elements 140 bulges in this way, a distance to the second antenna elements 123 arranged inside the left and right first capacitance loading elements 140 can be more distant compared to a case where each of the first capacitance loading elements 140 has a flat plate shape. Thus, interference between each of the first capacitance loading elements 140 and the second antenna element 123 can be reduced.

Note that the first capacitance loading element 140 may have a shape in which a sheet metal is bent so as to be convex upward.

(Configuration of Third Antenna Element 124)

The third antenna element 124 is positioned behind the first antenna element 122 and transmits and receives radio waves in a third frequency band different from both the first and second frequency bands. The third frequency band is, for example, a frequency band higher than the first frequency band. Further, the second frequency band is a frequency band including frequencies higher than the third frequency band.

The third antenna element 124 according to the present embodiment receives radio waves in at least one of a BAND III frequency band (174 to 240 MHz) and an L-Band frequency band (1452 to 1492 MHz) of DAB (Digital Audio Broadcast).

The third antenna element 124 includes a second connection conductor 167, left and right second capacitance loading elements 168, and a second fastener 169 that are attached to the inner case 121. Further, the third antenna element 124 includes a second holder 170 that is attached to the first circuit board 104, and a second helical element 171, a second spring contact metal member 172, and a lower terminal 187 that are attached to the second holder 170.

The second connection conductor 167 has the same configuration as the first connection conductor 139 (see FIG. 5) and is arranged in the second conductor insertion hole 133. Since the second connection conductor 167 has a simple configuration, manufacturing costs can be suppressed.

Each of the second capacitance loading elements 168 is a conductor arranged on the second element attachment portion 132 and has a shape matching a shape of the second element attachment portion 132.

Figure 13:
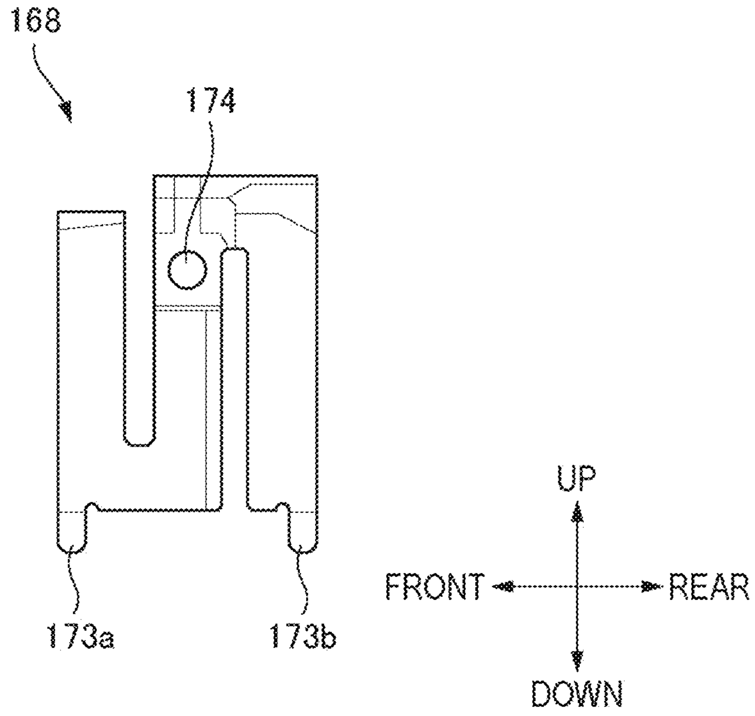
FIG. 13 is a left side view of a second capacitance loading element according to the first embodiment.

That is, each of the second capacitance loading elements 168 is a conductor that is curved to match the shape of the second element attachment portion 132. A shape formed by an outer edge of each of the second capacitance loading elements 168 is substantially rectangular when viewed from the side, as shown in the left side view of FIG. 13.

The second capacitance loading element 168 itself does not resonate in the third frequency band, but functions as a capacitance loading element that adds (loads) a ground capacitance to the second helical element 171, which will be described later. This makes it possible to improve an antenna gain of the third antenna element 124.

Specifically, in the present embodiment, two second capacitance loading elements 168 are provided. This makes it possible to improve the antenna gain of the third antenna element 124 compared to a case where the second capacitance loading element 168 is one.

Since the second capacitance loading element 168 is arranged in the second element attachment portion 132, the second capacitance loading element 168 is provided outside the inner case 121. Thus, the second capacitance loading element 168 is positioned higher in the up-down direction compared to a case where the second capacitance loading element 168 is provided inside the inner case 121, so that the antenna gain of the third antenna element 124 can be improved.

Here, it is desirable that the second capacitance loading element 168 is arranged as far back as possible and separated from each of the other antenna elements 122, 123, and 125 by a predetermined distance or more. Thus, interference between the third antenna element 124 and each of the other antenna elements 122, 123, and 125 can be suppressed. As a result, isolation between the third antenna element 124 and each of the other antenna elements 122, 123, and 125 can be ensured. Also, compatibility with media received by each of the antenna elements 122 to 125 can be ensured.

It is desirable that a thickness of each of the second capacitance loading elements 168 is thinner than a step of the second stepped portion 137. In an assembling process, it is possible to prevent work gloves or clothes of a worker from being caught on the second capacitance loading element 168 and prevent deformation of the second capacitance loading element 168 caused by the work gloves or clothes of the worker being caught. Therefore, it is possible to improve work efficiency and prevent damage to parts.

Each of the second capacitance loading elements 168 is made by, for example, punching, and stainless steel is suitable for a material thereof. By adopting stainless steel, it is possible to achieve rust resistance, rigidity, and electrical conductivity.

Specifically, each of the second capacitance loading elements 168 has a meandering shape in the second direction at least in part and includes front and rear second engagement pieces 173*a* and 173*b* and a second fastening hole 174.

The second direction is a direction different from the first direction and corresponds to the up-down direction in the present embodiment.

More specifically, as can be seen with reference to FIG. 2 for example, the meandering shape of the second capacitance loading element 168 is generally formed in a serpentine shape including conductors in the up-down direction and conductors in the front-rear direction, which extends long downward from the front upper side, and thereafter extends short rearward, extends long upward, extends short rearward, and extends long downward in order.

In such a meandering shape of the second capacitance loading element 168, in a case of comparing the conductor region of a portion in the front-rear direction with a conductor region of a portion in the up-down direction, the conductor region of the portion in the up-down direction is larger than the conductor region of the portion in the front-rear direction. Therefore, the meandering shape included in the second capacitance loading element 168 is a meandering shape mainly composed of the conductors extending in the up-down direction.

That is, in the present embodiment, the first direction is the front-rear direction and the second direction is the up-down direction, and it can be said that the second capacitance loading element 168 shown in FIG. 3 has a configuration in which the conductors forming the second capacitance loading element 168 extend in the up-down direction and folded portions in the front-rear direction are provided. Such a configuration is used for the second capacitance loading element 168 having a meandering shape in the second direction.

In this way, the first capacitance loading element 140 and the second capacitance loading element 168 include meandering shapes in different directions. Thus, the isolation between the first capacitance loading element 140 and the second capacitance loading element 168 can be improved. Therefore, the antenna gain of each of the first antenna element 122 and the third antenna element 124 can be improved.

Further, in each of the second capacitance loading elements 168, among the conductors forming the meandering shape, the conductor positioned farthest to the front extends upward, and an upper end portion thereof is shorter than lengths of other portions in the up-down direction. Thus, the isolation from the first capacitance loading element 140 can be improved and it is possible to improve the antenna gain in the third frequency band.

The front and rear second engagement pieces 173*a* and 173*b* are portions extending downward from lower end portions in the vicinity of the front end portion and in the vicinity of the rear end portion, respectively. The second engagement pieces 173*a* and 173*b* are locked to the second engagement piece fitting portions 136*a* and 136*b* by being inserted into the second engagement piece fitting portions 136*a* and 136*b*, respectively.

The second fastening hole 174 is a hole penetrating in the left-right direction and is positioned to the side of the second connection conductor 167 when the front and rear second engagement pieces 173*a* and 173*b* are respectively fitted into the second engagement piece fitting portions 136*a* and 136*b*.

In this way, the second capacitance loading element 168 has a relatively complicated shape including a meandering shape. By adopting such a complicated shape, a natural frequency as a structure of the second capacitance loading element 168 is increased. Thus, similarly to the first capacitance loading element 140, discomfort during use can be reduced without providing a reinforcing member or the like for preventing chattering noise.

The second fastener 169 is a bolt, screw, or the like made of a conductor such as metal. The second fastener 169 is screwed into the second connection conductor 167 by passing through the second fastening hole 174 to be screwed with the second connection conductor 167.

Thus, the left and right second capacitance loading elements 168 are fixed to the left and right second element attachment portions 132, respectively, by the second fasteners 169 screwed into the second connection conductor 167 from the left and right. At this time, the left and right second capacitance loading elements 168 are electrically connected via the second fasteners 169 and the second connection conductor 167.

Since the front and rear second engagement pieces 173*a* and 173*b* are locked to the front and rear second engagement piece fitting portions 136*a* and 136*b* and the locking groove portion 131, respectively, the second capacitance loading element 168 may have only one second fastener 169 for fixing the second capacitance loading element 168 to the inner case 121. Since there is no need to provide a plurality of fasteners and the like, the number of parts in the entire antenna device 100 can be reduced. Therefore, it is possible to facilitate the assembly of the antenna device 100 and reduce manufacturing costs.

In addition, the first capacitance loading element 140 and the second capacitance loading element 168 attached to the inner case 121 have substantially the same position in the up-down direction at their lower end portions.

In general, the capacitance loading element can widen the frequency characteristics of the antenna as the area increases and improve the antenna gain in the frequency band used. On the other hand, if the capacitance loading element is enlarged downward in the up-down direction to widen the frequency characteristics, a stray capacitance with respect to the ground increases, and the antenna gain gradually decreases.

In the present embodiment, the lower end portions of the capacitance loading elements 140 and 168 are set at positions separated from the first circuit board 104 by a certain distance. Thus, the antenna gains of the first antenna element 122 and the third antenna element 124 can be ensured as much as possible within the inner case region.

Further, by setting the lower end portions in the up-down direction of the first capacitance loading element 140 and the second capacitance loading element 168 apart from the first circuit board 104 at a certain distance and at approximately the same position, interference with low elevation angle characteristics of the fourth antenna element 125 can be suppressed. Thus, the antenna gain of the fourth antenna element 125 can be improved.

Figure 14:
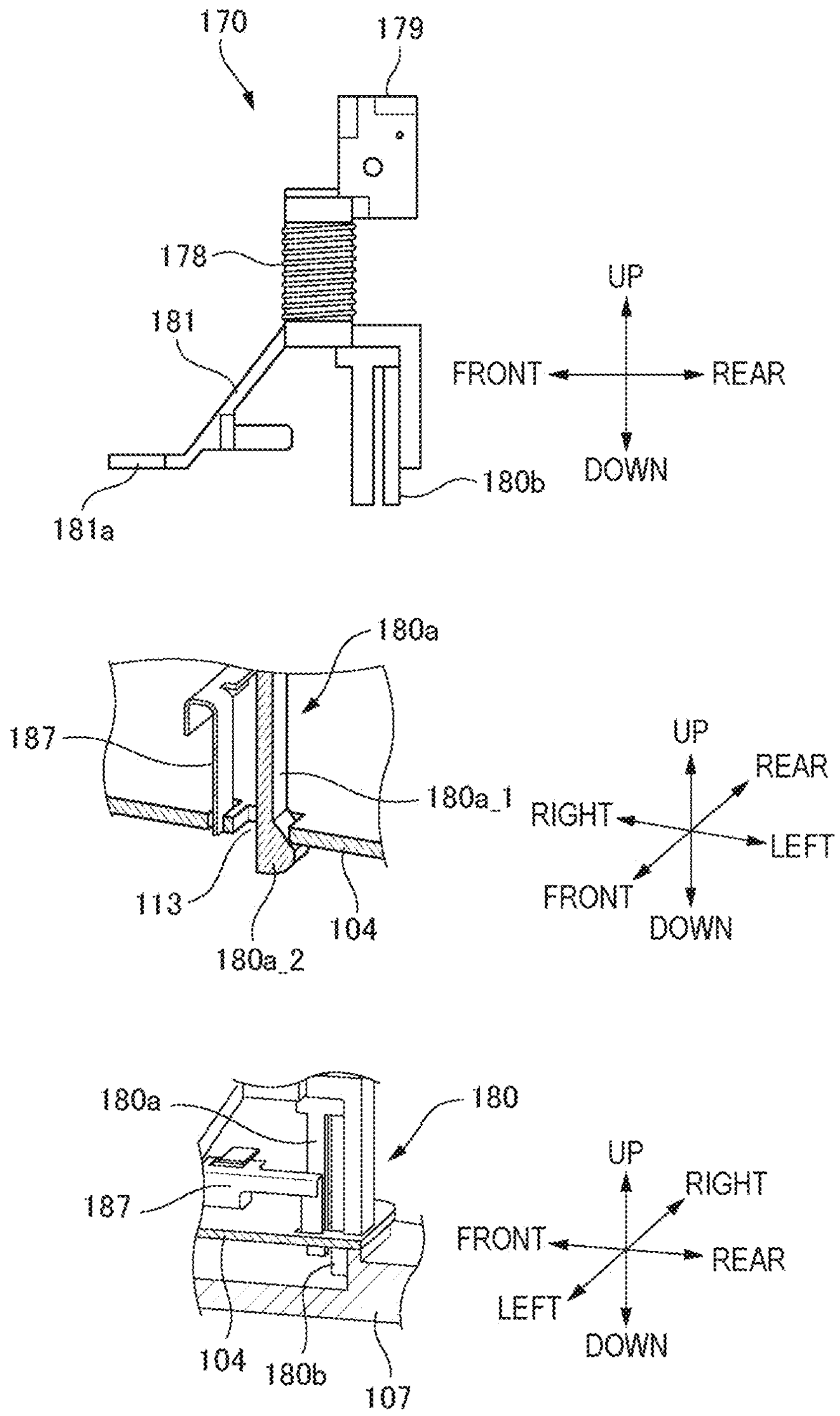
FIG. 14 (*a*) is a left side view of a second holder according to the first embodiment, and (b) and (c) are enlarged perspective views showing the vicinity of a tip of a base locking claw attached to a first circuit board.

The second holder 170 is a member made of synthetic resin having radio wave transmittance, and as shown in the left side view of FIG. 14(*a*), the second holder 170 includes an element attachment portion 178, a second metal member attachment portion 179, a first base engagement leg portion 180*a*, a second base engagement leg portion 180*b*, and a fixing leg portion 181.

The element attachment portion 178 is a circular columnar or elliptical columnar portion provided at approximately the center in the up-down direction.

The second metal member attachment portion 179 is provided above the element attachment portion 178 and includes a groove that is open toward the left in an upper end portion.

As shown in the perspective views of FIGS. 14(*b*) and 14(*c*), the first base engagement leg portion 180*a* and the second base engagement leg portion 180*b* extend substantially parallel downward from the rear of a lower end portion of the element attachment portion 178 in the vicinity thereof and each tip portion thereof is inserted into the fifth through-hole 113.

The first base engagement leg portion 180*a* includes an elastic portion 180*a*_1 and a claw 180*a*_2 provided at a tip portion of the elastic portion 180*a*_1. When the elastic portion 180*a*_1 is arranged in the fifth through-hole 113, the claw 180*a*_2 at the tip portion is locked to a lower end peripheral portion of the fifth through-hole 113 in the first circuit board 104.

An upper surface of the claw 180*a*_2 is inclined so as to gradually protrude to the right as it goes downward, and when the claw 180*a*_2 is inserted into the fifth through-hole 113, the upper surface of the claw 180*a*_2 is pressed into contact with the lower end peripheral portion of the fifth through-hole 113 by elasticity of the elastic portion 180*a*_1. Thus, the upper surface of the claw 180*a*_2 and the lower end peripheral portion of the fifth through-hole 113 can be reliably brought into contact with each other such that there is no gap therebetween. Therefore, even though there are variations in dimensions due to manufacturing errors and the like, the second holder 170 can be fixed to the first circuit board 104 so as not to rattle.

Further, a lower end portion of the second base engagement leg portion 180*b* passes through the fifth through-hole 113 and contacts the upper surface of the base 107, as shown in the perspective view of FIG. 14(*c*).

By having such base engagement leg portions 180*a* and 180*b*, a structure for screw fixing to attach the second holder 170 is not required. Therefore, the configuration of the antenna device 100 can be simplified.

The fixing leg portion 181 is a portion extending downward and forward from the vicinity of the lower end portion of the element attachment portion 178, and includes a tip portion 181*a* having a disk shape. The tip portion 181*a* is arranged above the fourth through-hole 112 and between the co-fastening boss portion 156 and the first circuit board 104.

Thus, by passing a screw or bolt through the fourth through-hole 112 and the tip portion of the fixing leg portion 181 from below the first circuit board 104 to be screwed into a hole of the co-fastening boss portion 156, the second holder 170 and the first holder 142 are fastened together and fixed to the first circuit board 104. This makes it possible to reduce the number of parts of the antenna device 100 and reduce manufacturing costs.

As shown in FIG. 3, the second helical element 171 is composed of a conducting wire spirally wound around a winding axis and is fixed to the element attachment portion 178. A direction of the winding axis of the second helical element 171 according to the present embodiment is the same up-down direction as that of the first helical element 144.

As described above, the element attachment portion 178 has a circular columnar or elliptical columnar shape. The second helical element 171 can be easily attached to the element attachment portion 178 by press-fitting or the like by configuring the shape of the second helical element 171 into a circular columnar or elliptical columnar shape corresponding to the shape of the element attachment portion 178. Thus, there is no need to use employ thermal welding, screws, or the like for attaching the second helical element 171, so that manufacturing costs can be reduced.

The second spring contact metal member 172 is a member integrally made of metal and has the same configuration as the first spring contact metal member 145 (see FIG. 11). That is, the second spring contact metal member 172 includes a second held portion 182, a second connection portion 183, and a second contact portion 184 corresponding to the first held portion 159, the first connection portion 160, and the first contact portion 161, respectively.

The second held portion 182 is fixed to the second holder 170 by being press-fitted into the second metal member attachment portion 179. Like the first held portion 159, the second held portion 182 includes flat plate portions facing three different directions, thereby defining the positions of the second spring contact metal member 172 with respect to the second holder 170 in all directions.

The second connection portion 183 is a portion protruding leftward. The second helical element 171 can be easily electrically connected by winding the vicinity of an upper end portion of a conducting wire constituting the second helical element 171 around the second contact portion 183.

According to the present embodiment, by having the connection portions 160 and 183, the spring contact metal members 145 and 172 having the same structure can be easily electrically connected to any of the second circuit board 143 and the second helical element 171.

The second contact portion 184 is a portion extending obliquely upward and forward. A base end portion of the second contact portion 184 is curved and connected to the second held portion 182, so that the second contact portion 184 has elasticity.

When the third antenna element 124 is arranged on the inner case 121 and the base 107 and the inner case 121 is screwed to the base 107, the second contact portion 184 comes into contact with the second connection conductor 167 and is pressed from above. Since the second contact portion 184 repels due to elastic force when being pressed from above, the second contact portion 184 and the second connection conductor 167 are reliably brought into contact with each other and electrically connected at a second contact point 185 shown in FIG. 3.

As a result, the second capacitance loading element 168 is electrically connected to the second helical element 171 through the second fastener 169, the second connection conductor 167, and the second spring contact metal member 172.

By arranging the second spring contact metal member 172 in the vicinity of the second helical element 171, an electrical connection can be made reliably with a simple configuration while reducing an electrical length. Therefore, it is possible to reduce manufacturing costs while improving the antenna gain.

Further, since the first spring contact metal member 145 and the second spring contact metal member 172 may have the same structure, they can be used as common parts. This makes it possible to reduce manufacturing costs.

Figure 15:
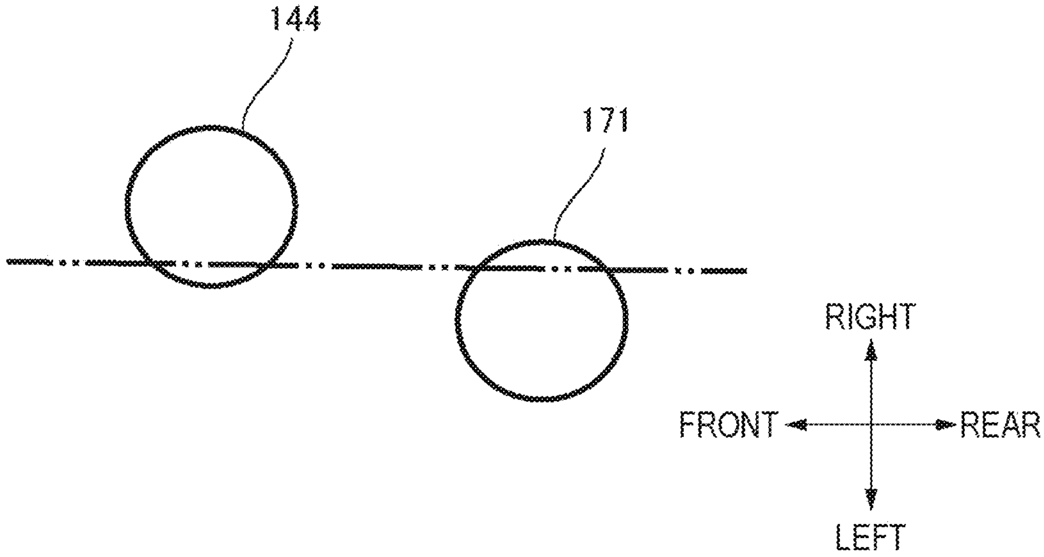
FIG. 15 is a view showing an arrangement relationship between a first helical element and a second helical element according to the first embodiment, as viewed from above.

As shown in FIG. 3, the first helical element 144 and the second helical element 171 according to the present embodiment do not completely match and are shifted from each other in positions in the up-down direction when viewed from the side. Further, as shown in FIG. 15, when viewed from above, positions in the left-right direction of the first helical element 144 and the second helical element 171 do not completely match and are shifted from each other. Preferably, the first helical element 144 and the second helical element 171 may be shifted such that their positions in one or both of the up-down direction and the left-right direction are completely different (do not match).

In this way, by positioning the first helical element 144 and the second helical element 171 to be shifted such that at least parts of their positions in the up-down direction and the left-right direction are different from each other, a distance between the first helical element 144 and the second helical element 171 can be increased.

Thus, mutual interference between the first helical element 144 and the second helical element 171 can be reduced, so that it is possible to suppress the decrease in antenna gain of the first antenna element 122 and the third antenna element 124.

The lower terminal 187 is fitted into a lower end portion of the second holder 170 and is fixed to the first circuit board 104 in a state in which a portion protruding downward is electrically connected by soldering or the like. Further, a lower end portion of the second helical element 171 is wound around a portion projecting leftward above the first circuit board 104. Thus, the second helical element 171 is electrically connected to the first circuit board 104 via the lower terminal 187. Various circuits may be interposed between the second helical element 171 and the first circuit board 104.

(Configuration of Fourth Antenna Element 125)

The fourth antenna element 125 transmits and receives radio waves in a fourth frequency band different from any of the first to third frequency bands.

The fourth antenna element 125 according to the present embodiment receives radio waves in a frequency band around 1.5 GHz of a global navigation satellite system (GNSS). The GNSS is a general term for satellite positioning systems such as a GPS, a GLONASS, a Galileo, and a quasi-zenith satellite system (QZSS).

The fourth antenna element 125 transmits and receives circularly polarized radio waves.

The fourth antenna element 125 is a planar antenna and is fixed to the first circuit board 104 with a pressure-sensitive adhesive or the like.

In the antenna device 100 according to the present embodiment, the first antenna element 122 and the second antenna element 123 are positioned behind the fourth antenna element 125, and further, the third antenna element 124 is positioned behind them.

Here, in general, when the first helical element 144 approaches the third antenna element 124, the isolation between the third antenna element 124 and the circuit of the first frequency band deteriorates. Further, when the first helical element 144 approaches the second helical element 171, the isolation between the circuits of the first frequency band and the third frequency band deteriorates.

In the present embodiment, the first helical element 144 is positioned between the first capacitance loading element 140, and the third antenna element 124 in the front-rear direction. Thus, deterioration of the isolation between the third antenna element 124 and the circuit of the first frequency band can be suppressed, and deterioration of the isolation between the circuits of the first frequency band and the third frequency band can be suppressed. Therefore, it becomes possible to improve the antenna gain of the third antenna element 124.

Since the antenna device 100 has a streamlined shape, a height (a length in the up-down direction) of the antenna device 100 increases toward the rear. Therefore, a length in the up-down direction of the third antenna element 124 can be increased by positioning the third antenna element 124 farthest to the rear. This makes it possible to improve the antenna gain of the third frequency band by the third antenna element 124.

In the present embodiment, the antenna device 100 includes four antenna elements 122 to 125 accommodated in a housing having a streamlined shape and can receive radio waves of five types of media. In general, when elements for transmitting and receiving radio waves of media are arranged on the glass, back door, or the like of a vehicle, the price of those parts increase. Since the antenna device 100 can transmit and receive radio waves of five types of media while suppressing an increase in price of parts of the vehicle, it is possible to reduce the price of the vehicle to which the antenna device 100 is installed and reduce the overall costs.

In the antenna device 100, interconnects of the antenna elements 122 to 125 are output via one connector 105. This makes it possible to facilitate the attachment work to the vehicle.

It is desirable that the antenna device 100 is attached to the vehicle via a pad P made of resin (see FIG. 1). Unnecessary resonance generated in the base 107 can be suppressed by a dielectric constant of the outer pad, and a decrease in antenna gain of each of the antenna elements 122 to 125 can be suppressed.

When the antenna device 100 according to the present embodiment is operated, a first voltage point 175, which is the maximum voltage of the first capacitance loading element 140, is a portion slightly forward of a rear end portion, in an upper end portion of the first capacitance loading element 140, as shown in FIG. 3.

Further, a second voltage point 176, which is the maximum voltage of the second capacitance loading element 168, is portions of an upper front end portion and a lower rear end portion of the second capacitance loading element 168.

As can be seen in FIG. 3, a minimum distance between the first voltage point 175 and the second voltage point 176 is greater than a distance between adjacent end portions of the first capacitance loading element 140 and the second capacitance loading element 168.

The adjacent end portions of the first capacitance loading element 140 and the second capacitance loading element 168 are the end portion of the first capacitance loading element 140 on the third antenna element side and the end portion of the second capacitance loading element 168 on the first antenna element side.

By making the distance between the first voltage point 175 and the second voltage point 176 greater than the distance between the adjacent end portions of the first capacitance loading element 140 and the second capacitance loading element 168 as described above, mutual interference between the first antenna element 122 and third antenna element 124 can be suppressed. Therefore, it is possible to arrange the first antenna element 122 and the third antenna element 124 close to each other while maintaining the antenna gain.

Modification Example 1

In the first embodiment, the first antenna element 122 has been described with an example of receiving AM broadcast radio waves and FM broadcast radio waves. The second antenna element 123 has been described with an example of transmitting and receiving telephone radio waves. The third antenna element 124 has been described with an example of receiving radio waves for DAB. The fourth antenna element 125 has been described with an example of receiving radio waves for GNSS.

However, the radio waves transmitted and received by the antenna elements 122 to 125 are not limited thereto.

For example, the second antenna element 123 may transmit and receive radio waves for WiFi or MIMO (Multiple-Input-Multiple-Output) (for example, 2.4 GHz band or 5 GHz band), radio waves for GNSS, radio waves for SDARS (Satellite-Digital-Audio-Radio-Service) (2.3 GHz band), and radio waves for V2X (Vehicle to X: Vehicle to Everything) (5.9 GHz band). In a case where the second antenna element 123 receives radio waves for GNSS, the fourth antenna element 125 may not be provided, and the fourth antenna element 125 may transmit and receive radio waves for SDARS.

For example, the third antenna element 124 may transmit and receive radio waves for DTTB (Digital-Terrestrial-Television-Broadcasting) (470 MHz to 710 MHz) and V2X.

Modification Example 2

In the first embodiment, an example in which each of the first capacitance loading element 140 and the second capacitance loading element 168 is provided in pairs on the left and right has been described. However, one or both of the first capacitance loading element 140 and the second capacitance loading element 168 may be only one provided, for example, on only one of the left and right.

When one or both of the first capacitance loading element 140 and the second capacitance loading element 168 are provided one, the configuration of the antenna device 100 can be simplified and the thickness thereof can be reduced.

Second Embodiment

Figure 16:
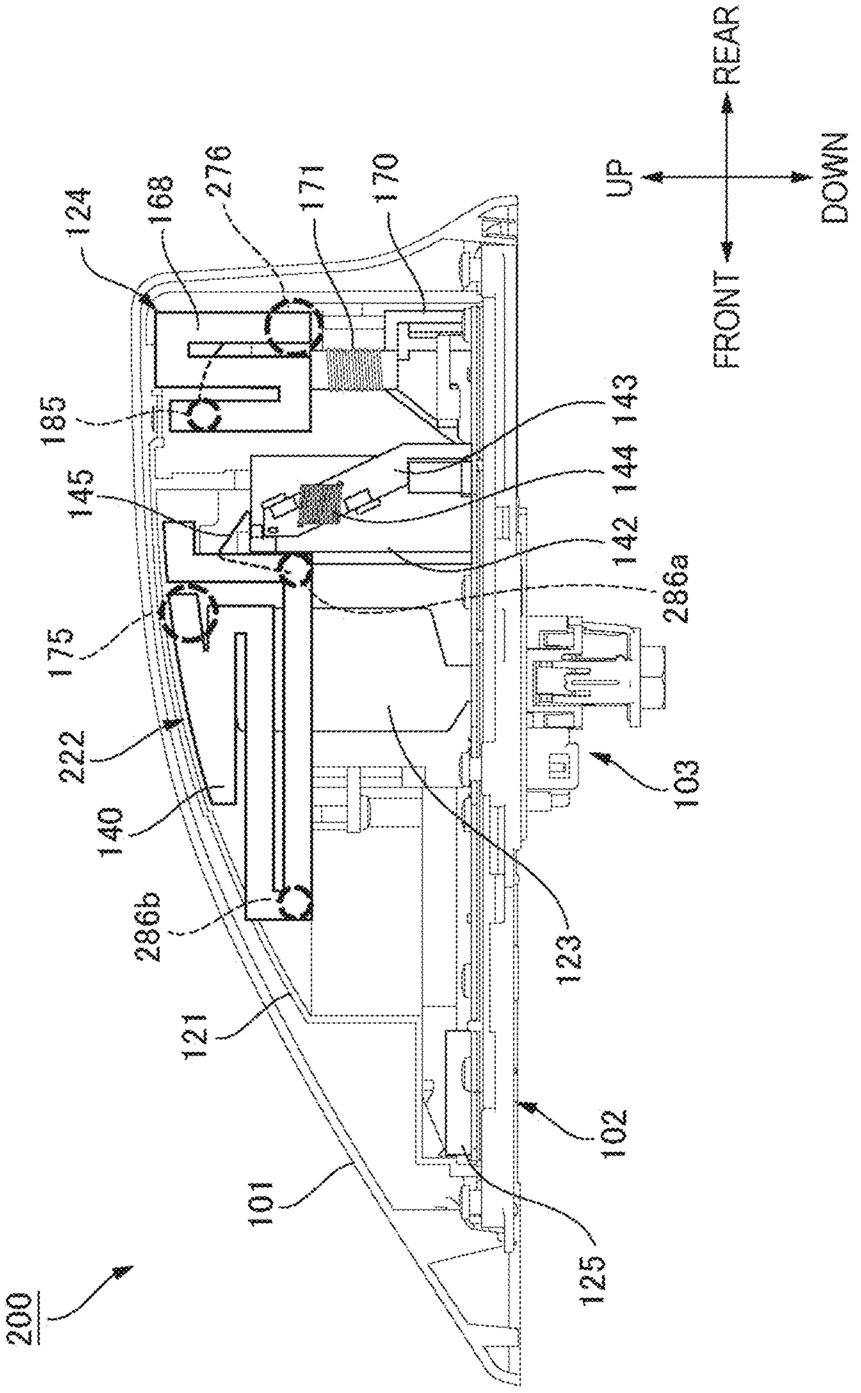
FIG. 16 is a left side view of an antenna device for a vehicle according to a second embodiment of the present invention, corresponding to FIG. 3 according to the first embodiment.

FIG. 16 is a left side view of an antenna device 200 according to a second embodiment of the present invention. FIG. 16 shows the inside of the accommodation space in a state in which the antenna case 101 and the inner case 121 are removed at approximately the center in the left-right direction, as in FIG. 3 according to the first embodiment.

The antenna device 200 includes a first antenna element 222 in place of the first antenna element 122 according to the first embodiment, as shown in the figure. Except for this point, the antenna device 200 may be configured similarly to the antenna device 100 according to the first embodiment.

The first antenna element 222 is different from the first antenna element 122 according to the first embodiment in that the first contact portion 161 is electrically connected at a first connection point 286*a* provided on the lower rear side of the first capacitance loading element 140. Except for this point, the first antenna element 222 may be configured similarly to the first antenna element 122 according to the first embodiment.

For the electrical connection between the first contact portion 161 and the first capacitance loading element 140 according to the present embodiment, for example, pressure contact such as spring connection or soldering may be employed.

According to the present embodiment, the first voltage point 175 is generally at the same position as in the first embodiment. On the other hand, the second voltage point

276 is located at substantially the same position as the second voltage point 176 positioned on the rear side among the second voltage points 176 according to the first embodiment. Therefore, a distance between the first voltage point 175 and the second voltage point 276 can be made larger than the minimum distance in the first embodiment.

Thus, mutual interference between the first antenna element 222 and the third antenna element 124 can be further suppressed. Therefore, it is possible to further improve the antenna gains of the first antenna element 222 and the third antenna element 124.

Modification Example 3

The first contact portion 161 may be electrically connected at a first connection point 286*b* provided on the lower front side of the first capacitance loading element 140, as shown in FIG. 16. By this configuration, first voltage points 175 also results in two portions extending above the first capacitance loading element 140, so that the same effect as in the second embodiment can be obtained.

Third Embodiment

Figure 17:
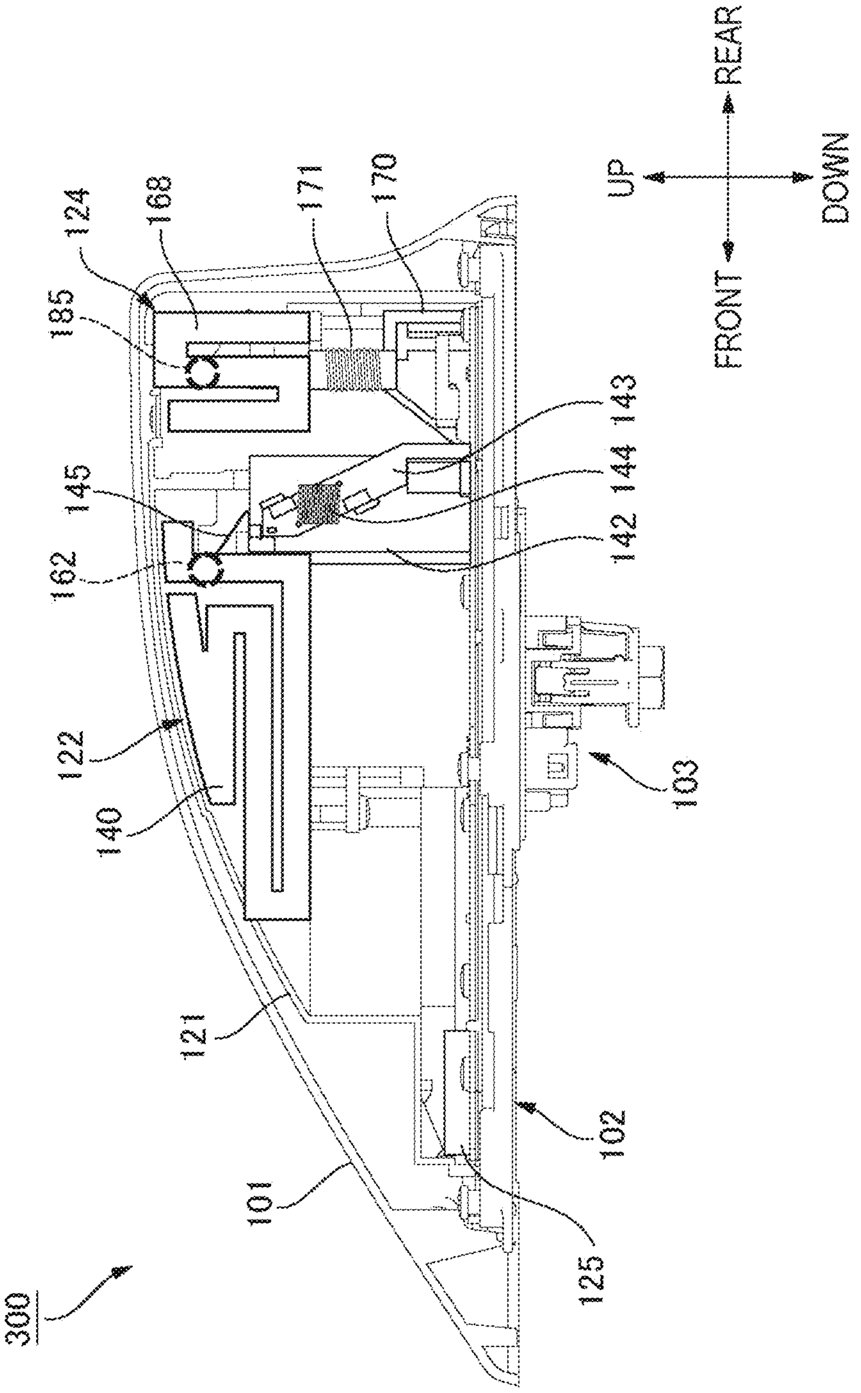
FIG. 17 is a left side view of an antenna device for a vehicle according to a third embodiment of the present invention, corresponding to FIG. 3 according to the first embodiment.

FIG. 17 is a left side view of an antenna device 300 according to a third embodiment of the present invention. FIG. 17 shows the inside of the accommodation space in a state in which the antenna case 101 and the inner case 121 are removed at approximately the center in the left-right direction, as in FIG. 3 according to the first embodiment.

The antenna device 300 does not have the second antenna element 123 as shown in the figure. Except for this point, the antenna device 300 may be configured similarly to the antenna device 100 according to the first embodiment.

The present embodiment also provides the same effects as the first embodiment, except for the effects related to the second antenna element 123.

Fourth Embodiment

Figure 18:
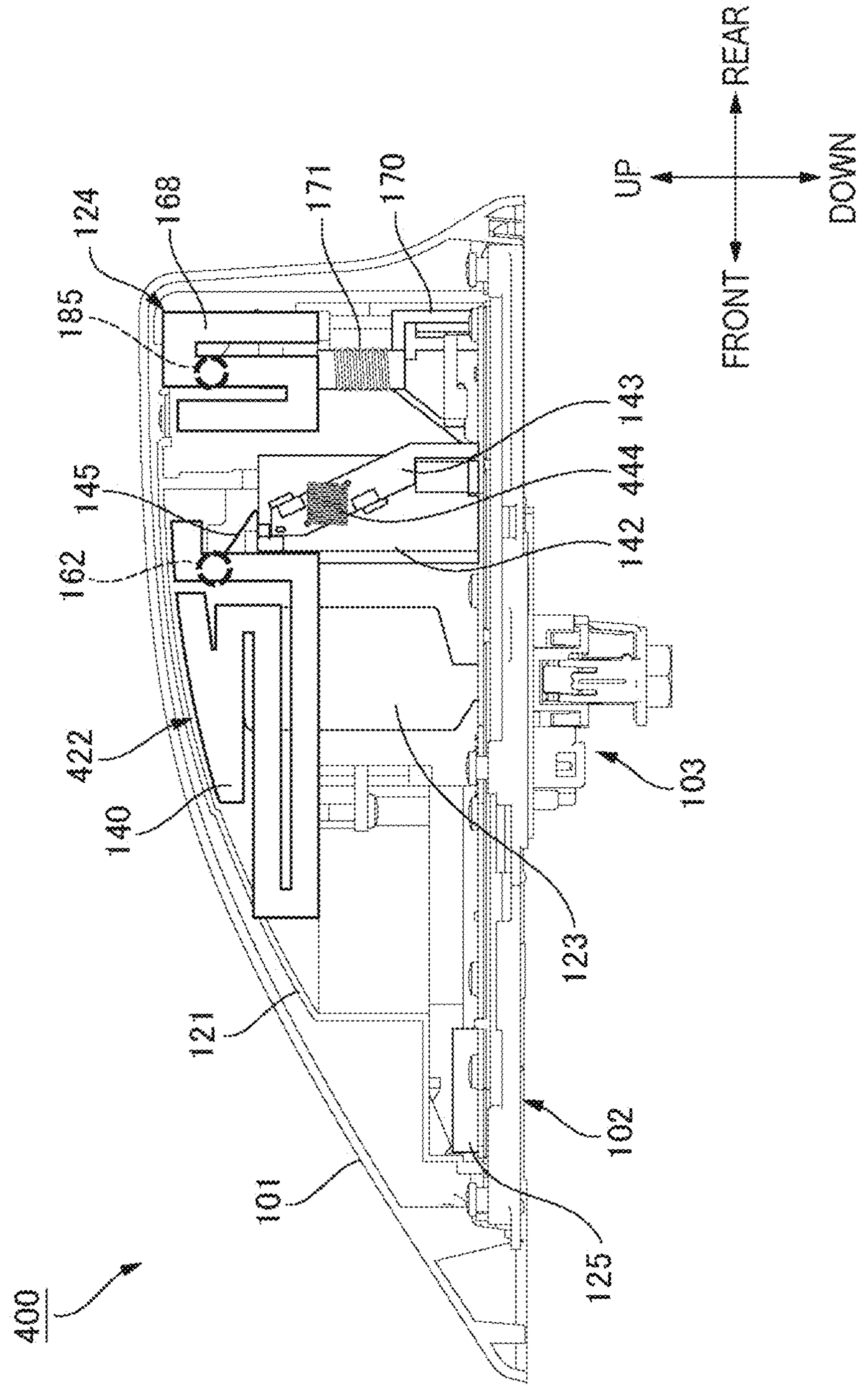
FIG. 18 is a left side view of an antenna device for a vehicle according to a fourth embodiment of the present invention, corresponding to FIG. 3 according to the first embodiment.

FIG. 18 is a left side view of an antenna device 400 according to a fourth embodiment of the present invention. FIG. 18 shows the inside of the accommodation space in a state in which the antenna case 101 and the inner case 121 are removed at approximately the center in the left-right direction, as in FIG. 3 according to the first embodiment.

The antenna device 400 includes a first antenna element 422 in place of the first antenna element 122 according to the first embodiment, as shown in the figure. Except for this point, the antenna device 400 may be configured similarly to the antenna device 100 according to the first embodiment.

Further, the first antenna element 422 includes a first helical element 444 in place of the first helical element 144 according to the first embodiment. Except for this point, the first antenna element 422 may be configured similarly to the first antenna element 122 according to the first embodiment.

A direction of a winding axis of the first helical element 444 is the front-rear direction.

A front end portion of the first helical element 444 is connected to any of the first circuit, the second circuit, and the third circuit provided in the region 158*a* of the second circuit board 143. That is, the series connection is made between the first capacitance loading element 140 and the first helical element 444. Thus, the first circuit provided in the region 158*a* is connected in series between the first capacitance loading element 140 and the first helical element 444.

Further, a rear end portion of the first helical element 444 is connected to either the second circuit or the third circuit provided in the region 158*b* of the second circuit board 143. Thus, one or both of the second circuit and the third circuit provided in the region 158*b* are connected in series between the first helical element 144 and the circuit provided on the first circuit board 104.

Except for these points, the first helical element 444 may be configured similarly to the first helical element 144 according to the first embodiment.

According to the present embodiment, the winding axes of the first helical element 444 and the second helical element 171 are orthogonal to each other. Thus, magnetic fluxes of the first helical element 444 and the second helical element 171 are orthogonal to each other, so that mutual interference is suppressed as shown in FIG. 19.

Figure 19:
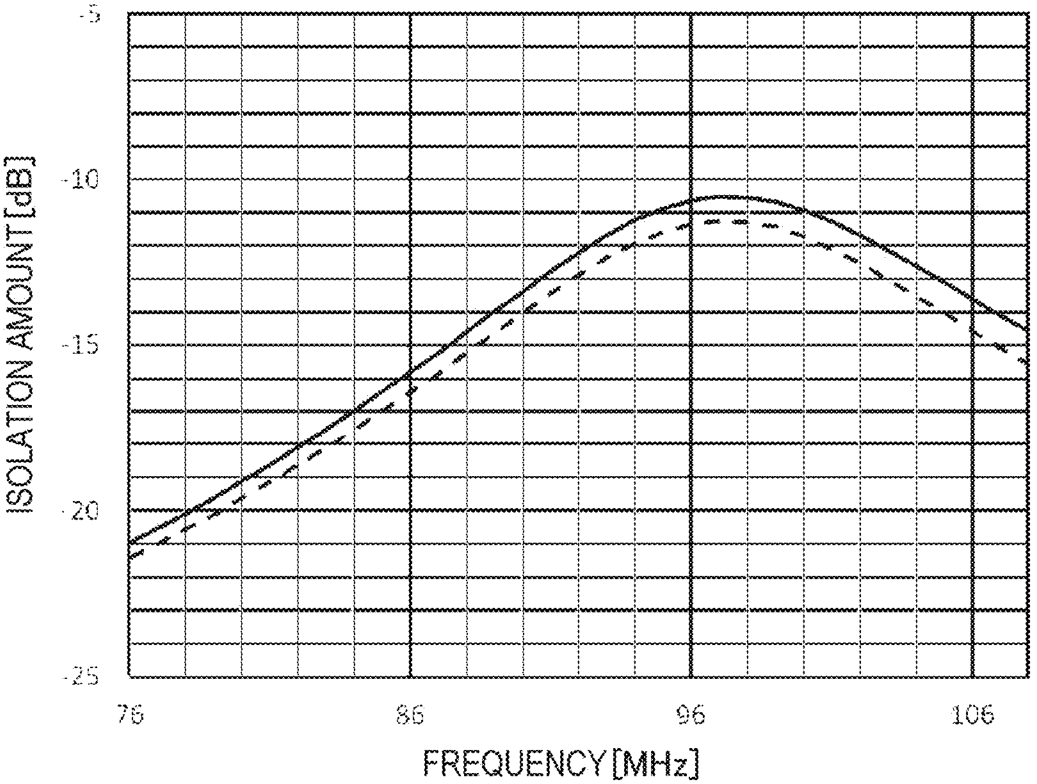
FIG. 19 is a view showing a relationship between an amount of isolation between the first helical element and the second helical element and a frequency in the fourth embodiment.

Here, FIG. 19 is a view showing a relationship between an isolation amount between the first helical element 444 and the second helical element 171 (vertical axis: unit is [dB]) and a frequency (horizontal axis: unit is [MHz]). A dotted line indicates a relationship between the isolation amount between the first helical element 444 and the second helical element 171 and the frequency according to the present embodiment. A solid line indicates a relationship between the isolation amount between the first helical element 144 and the second helical element 171 and the frequency in the first embodiment.

In this way, mutual interference between the first antenna element 122 and the third antenna element 124 can be suppressed. Therefore, it is possible to further improve the antenna gains of the first antenna element 122 and the third antenna element 124.

Modification Example 4

The winding axes of the first helical element 444 and the second helical element 171 are not limited to the orthogonal directions and may be intersecting directions. The third embodiment is an example of this modification example.

Also according to this modification example, mutual interference between the first antenna element 122 and the third antenna element 124 can be reduced compared to the first embodiment. Therefore, it is possible to further improve the antenna gains of the first antenna element 122 and the third antenna element 124.

Fifth Embodiment

Figure 20:
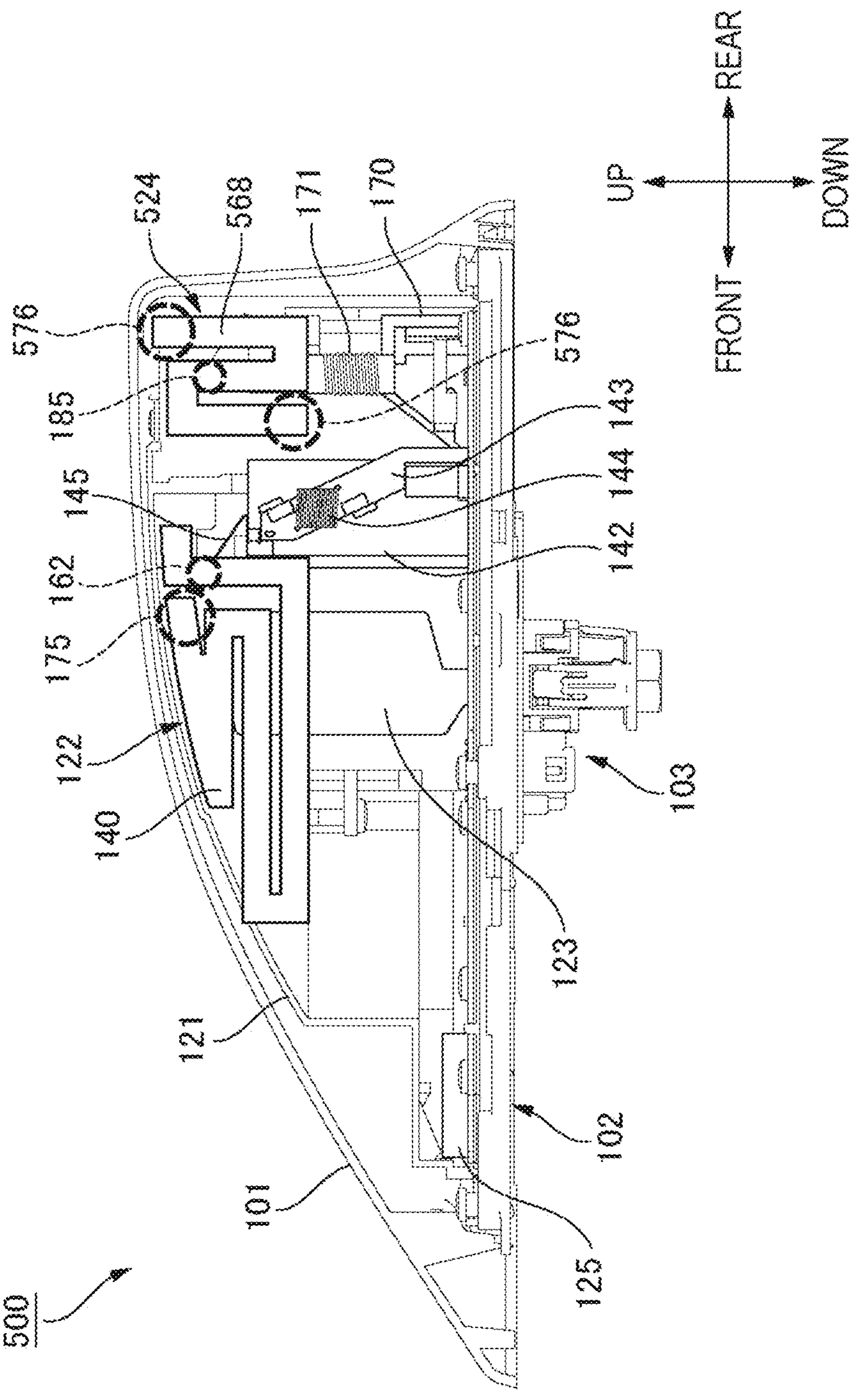
FIG. 20 is a left side view of an antenna device for a vehicle according to a fifth embodiment of the present invention, corresponding to FIG. 3 according to the first embodiment.

FIG. 20 is a left side view of an antenna device 500 according to a fifth embodiment of the present invention. FIG. 20 shows the inside of the accommodation space in a state in which the antenna case 101 and the inner case 121 are removed at approximately the center in the left-right direction, as in FIG. 3 according to the first embodiment.

The antenna device 500 includes a third antenna element 524 in place of the third antenna element 124 according to the first embodiment, as shown in the figure. Except for this point, the antenna device 500 may be configured similarly to the antenna device 100 according to the first embodiment.

Further, the third antenna element 524 includes a second capacitance loading element 568 in place of the second capacitance loading element 168 according to the first embodiment. Except for this point, the third antenna element 524 may be configured similarly to the third antenna element 124 according to the first embodiment.

A meandering shape of the second capacitance loading element 568 is mainly composed of conductors in the up-down direction like the second capacitance loading element 168 according to the first embodiment, but the detailed configuration thereof is different from the second capacitance loading element 168 according to the first embodiment.

The meandering shape of the second capacitance loading element 568 extends long upward from the front lower side, and thereafter, extends short rearward, extends long downward, extends short rearward, and extends long upward in order.

Except for such details of the meandering shape, the second capacitance loading element 568 may be configured similarly to the second capacitance loading element 168 according to the first embodiment.

According to the present embodiment, the first voltage point 175 is generally at the same position as in the first embodiment. In contrast, second voltage points 576 become portions on the lower front side and the upper rear side of the second capacitance loading element 568, as shown in FIG. 20. Therefore, a minimum distance between the first voltage point 175 and the second voltage point 576 can be made larger than the minimum distance in the first embodiment.

Thus, mutual interference between the first antenna element 122 and the third antenna element 524 can be further suppressed. Therefore, it is possible to further improve the antenna gains of the first antenna element 122 and the third antenna element 524.

Sixth Embodiment

Figure 21:
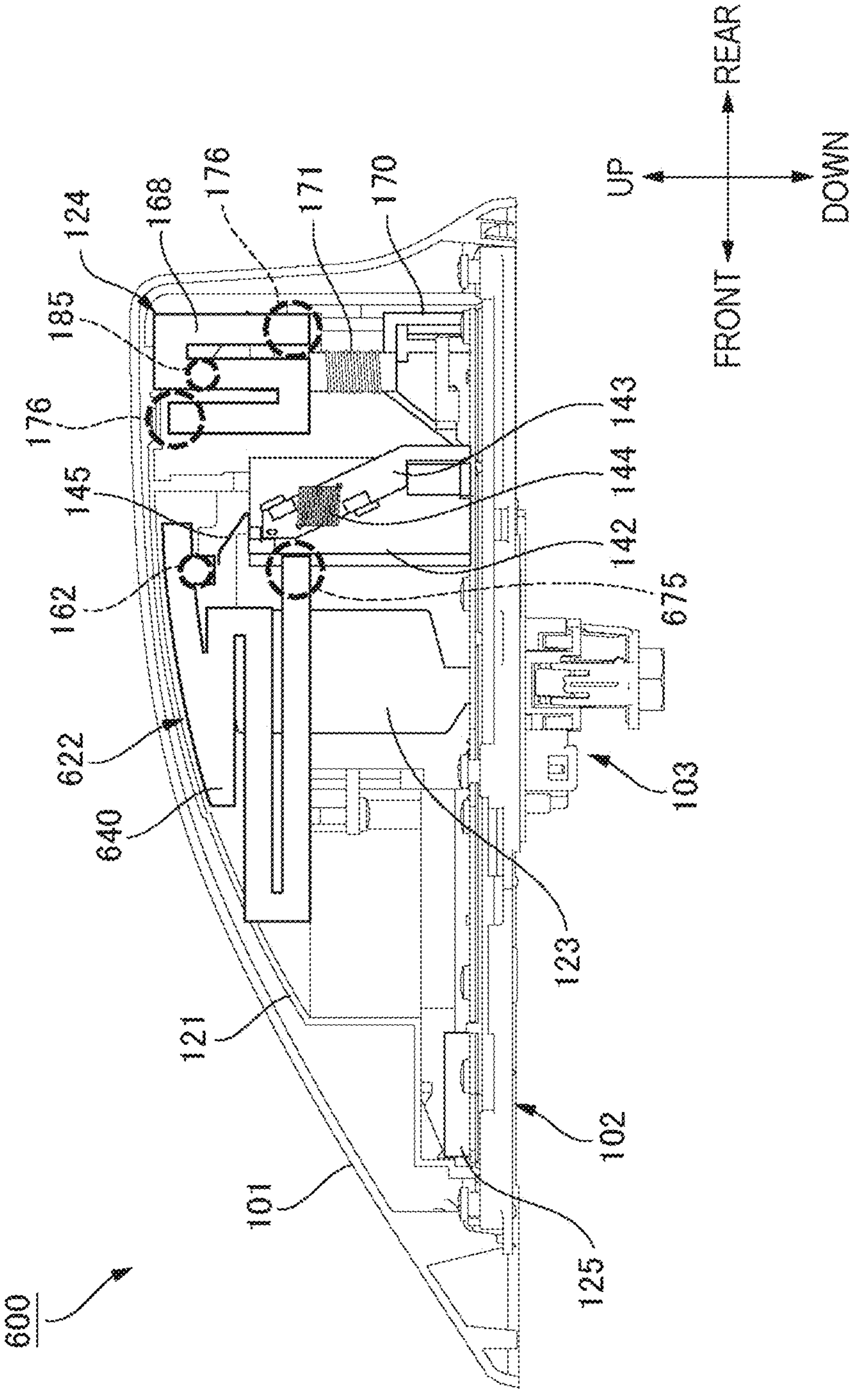
FIG. 21 is a left side view of an antenna device for a vehicle according to a sixth embodiment of the present invention, corresponding to FIG. 3 according to the first embodiment.

FIG. 21 is a left side view of an antenna device 600 according to a sixth embodiment of the present invention. FIG. 21 shows the inside of the accommodation space in a state in which the antenna case 101 and the inner case 121 are removed at approximately the center in the left-right direction, as in FIG. 3 according to the first embodiment.

The antenna device 600 includes a first antenna element 622 in place of the first antenna element 122 according to the first embodiment, as shown in the figure. Except for this point, the antenna device 600 may be configured similarly to the antenna device 100 according to the first embodiment.

Further, the first antenna element 622 includes a first capacitance loading element 640 in place of the first capacitance loading element 140 according to the first embodiment. Except for this point, the first antenna element 622 may be configured similarly to the first antenna element 122 according to the first embodiment.

A meandering shape of the first capacitance loading element 640 is mainly composed of conductors in the front-rear direction like the first capacitance loading element 140 according to the first embodiment, but the detailed configuration thereof is different from the first capacitance loading element 140 according to the first embodiment.

That is, the meandering shape of the first capacitance loading element 640 extends forward while inclining slightly downward from the upper side, and thereafter extends rearward, extends short downward, extends long forward, extends short downward, and extends rearward in order. As described above, the first capacitance loading element 140 according to the first embodiment is provided with the conductor extending upward while being connected to the conductor extending rearward at the lowermost portion. However, the first capacitance loading element 640 is not provided with the conductor extending upward.

Except for such meandering details, the first capacitance loading element 622 may be configured similarly to the first capacitance loading element 140 according to the first embodiment.

According to the present embodiment, a first voltage point 675 is a lower rear portion of the first capacitance loading element 640. The second voltage point 176 is at substantially the same position as in the first embodiment. Therefore, a minimum distance between the first voltage point 675 and the second voltage point 176 can be made larger than the minimum distance in the first embodiment.

Thus, mutual interference between the first antenna element 622 and the third antenna element 124 can be further suppressed. Therefore, it is possible to further improve the antenna gains of the first antenna element 622 and the third antenna element 124.

Seventh Embodiment

Figure 22:
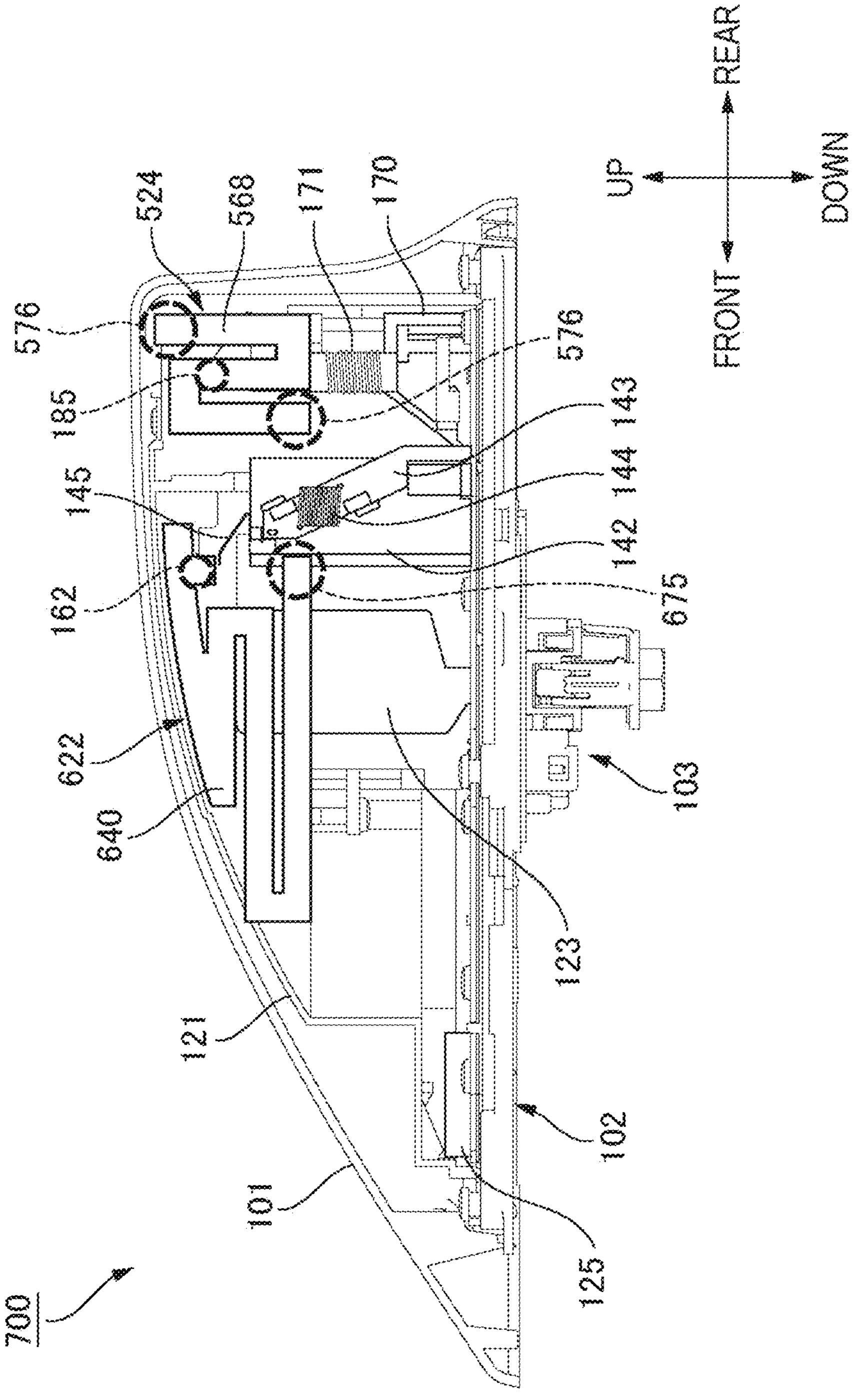
FIG. 22 is a left side view of an antenna device for a vehicle according to a seventh embodiment of the present invention, corresponding to FIG. 3 according to the first embodiment.

FIG. 22 is a left side view of an antenna device 700 according to a seventh embodiment of the present invention. FIG. 22 shows the inside of the accommodation space in a state in which the antenna case 101 and the inner case 121 are removed at approximately the center in the left-right direction, as in FIG. 3 according to the first embodiment.

As shown in the figure, the antenna device 700 includes the first antenna element 622 according to the sixth embodiment and the third antenna element 524 according to the fifth embodiment, in place of the first antenna element 122 and the third antenna element 124 according to the first embodiment. Except for these, the antenna device 700 may be configured similarly to the antenna device 100 according to the first embodiment.

According to the present embodiment, the first voltage point 675 is at substantially the same position as in the sixth embodiment, and the second voltage point 576 is at substantially the same position as in the fifth embodiment. Therefore, a minimum distance between the first voltage point 675 and the second voltage point 576 is substantially the same as the minimum distance in the first embodiment.

Thus, mutual interference between the first antenna element 622 and the third antenna element 524 can be suppressed to the same extent as in the first embodiment. Therefore, it is possible to improve the antenna gains of the first antenna element 622 and the third antenna element 524.

Eighth Embodiment

Figure 23:
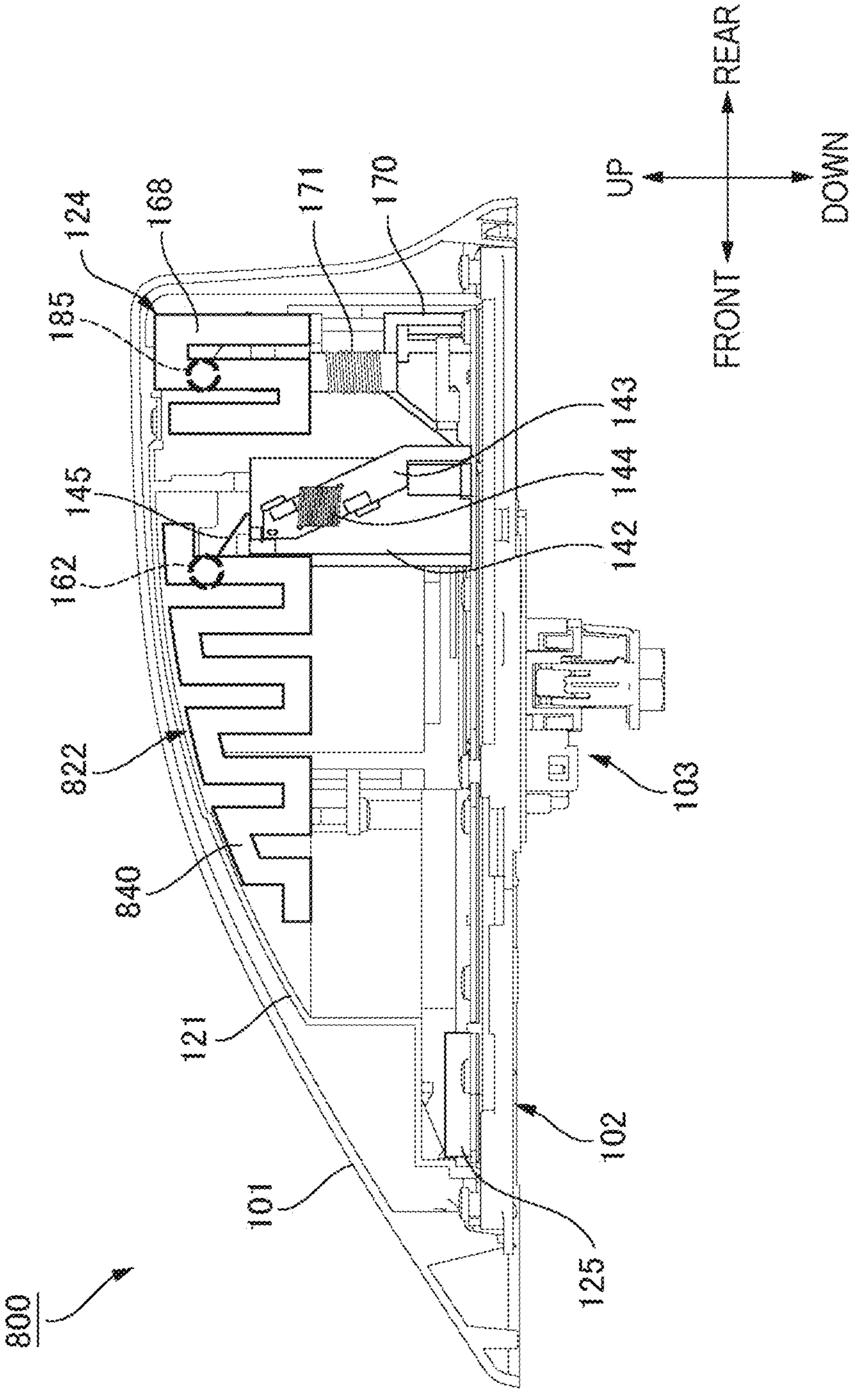
FIG. 23 is a left side view of an antenna device for a vehicle according to an eighth embodiment of the present invention, corresponding to FIG. 3 according to the first embodiment.

FIG. 23 is a left side view of an antenna device 800 according to an eighth embodiment of the present invention. FIG. 23 shows the inside of the accommodation space in a state in which the antenna case 101 and the inner case 121 are removed at approximately the center in the left-right direction, as in FIG. 3 according to the first embodiment.

The antenna device 800 includes a first antenna element 822 in place of the first antenna element 122 according to the first embodiment, as shown in the figure. Further, the antenna device 800 does not include the second antenna element 123. Except for these, the antenna device 800 may be configured similarly to the antenna device 100 according to the first embodiment.

The first antenna element 822 includes a first capacitance loading element 840 in place of the first capacitance loading element 140 according to the first embodiment. Except for this point, the first antenna element 822 may be configured similarly to the first antenna element 122 according to the first embodiment.

The first capacitance loading element 840 differs from the first capacitance loading element 140 according to the first embodiment in the meandering shape thereof. Except for this point, the first capacitance loading element 840 may be configured similarly to the first capacitance loading element 140 according to the first embodiment.

The meandering shape of the first capacitance loading element 840 is generally formed in a serpentine shape including conductors in the up-down direction and conductors in the front-rear direction, which extends rearward from the lower front side, and thereafter repeats a shape pattern extending upward and extending rearward while slightly inclining to the upper side three times, then extends rearward and further extends upward. The shape pattern that is repeated has a larger size in the up-down direction as it is positioned rearward.

In such a meandering shape of the first capacitance loading element 840, regarding conductor portions in the front-rear direction and conductor portions in the up-down direction, a total length of the conductor portions in the up-down direction is greater than a total length of the conductor portions in the front-rear direction. Therefore, unlike the first capacitance loading element 140 according to the first embodiment, the meandering shape included in the first capacitance loading element 840 is a meandering shape mainly composed of the conductors extending in the up-down direction. That is, in the present embodiment, the meandering shapes of the first capacitance loading element 840 and the second capacitance loading element 168 are in the same direction.

According to the present embodiment, the first capacitance loading element 840 can reduce the influence of radio waves radiated at a low elevation angle from the fourth antenna element 125 compared to the first capacitance loading element 140 according to the first embodiment. Therefore, it becomes possible to further improve the antenna gain of the first antenna element 822.

Ninth Embodiment

Figure 24:
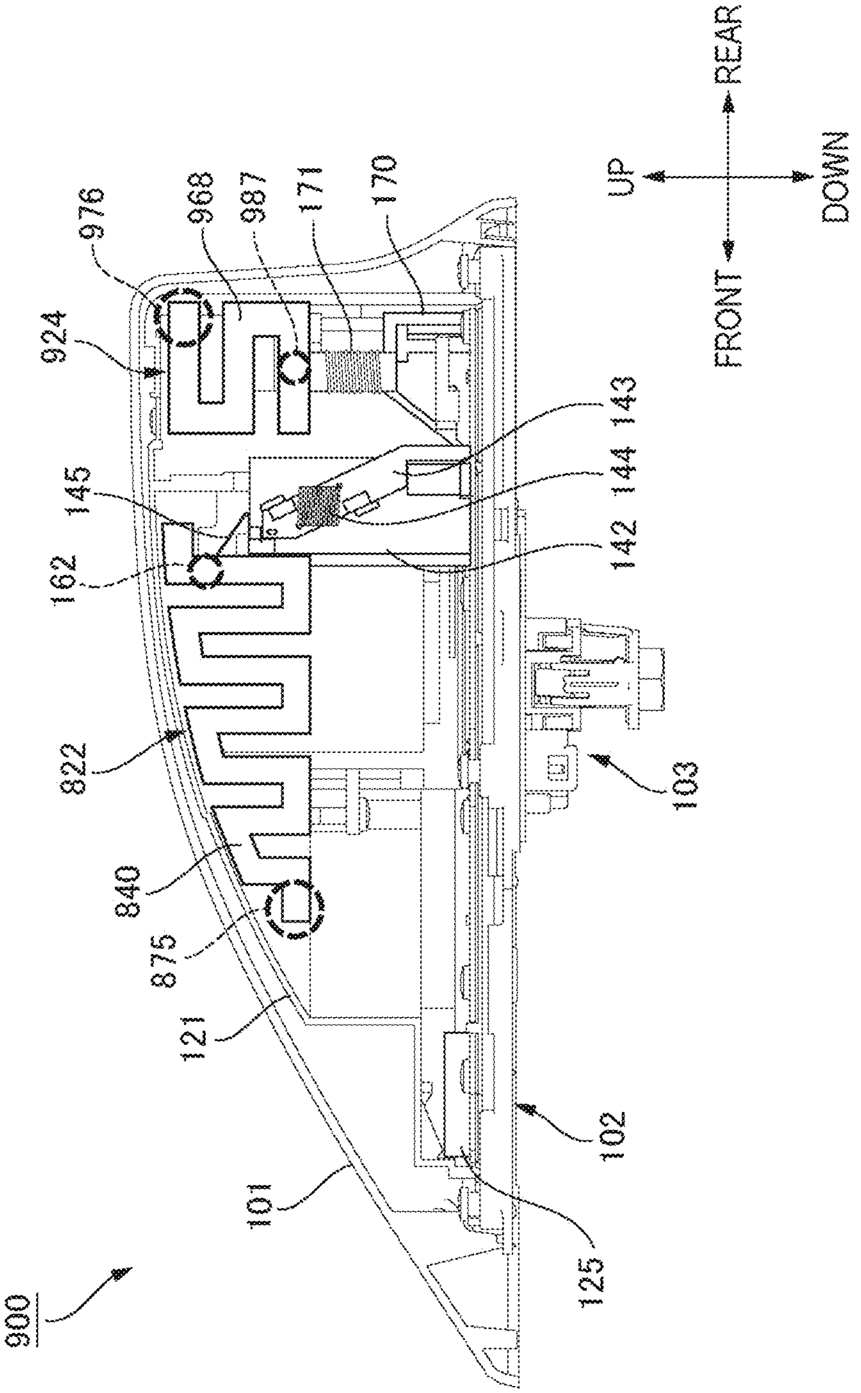
FIG. 24 is a left side view of an antenna device for a vehicle according to a ninth embodiment of the present invention, corresponding to FIG. 3 according to the first embodiment.

FIG. 24 is a left side view of an antenna device 900 according to a ninth embodiment of the present invention. FIG. 24 shows the inside of the accommodation space in a state in which the antenna case 101 and the inner case 121 are removed at approximately the center in the left-right direction, as in FIG. 3 according to the first embodiment.

As shown in the figure, the antenna device 900 includes the first antenna element 822 according to the eighth embodiment in place of the first antenna element 122 according to the first embodiment, and includes a third antenna element 924 in place of the third antenna element 124 according to the first embodiment. Further, the antenna device 900 does not include the second antenna element 123.

Except for these, the antenna device 900 may be configured similarly to the antenna device 100 according to the first embodiment.

The third antenna element 924 includes a second capacitance loading element 968 in place of the second capacitance loading element 168 according to the first embodiment. In the second capacitance loading element 968, the second contact portion 184 is electrically connected to the second capacitance loading element 968 at a second connection point 987 provided approximately at the center of a lower end portion of the second capacitance loading element 968. Except for these points, the third antenna element 924 may be configured similarly to the third antenna element 124 according to the first embodiment.

For the electrical connection between the second contact portion 184 and the second capacitance loading element 968 according to the present embodiment, for example, conductors that are soldered or pressure-contacted thereto may be adopted.

The second capacitance loading element 968 differs from the second capacitance loading element 168 according to the first embodiment in the meandering shape thereof. Except for this point, the second capacitance loading element 968 may be configured similarly to the second capacitance loading element 168 according to the first embodiment.

The meandering shape of the second capacitance loading element 968 is generally formed in a serpentine shape including conductors in the up-down direction and conductors in the front-rear direction, which extends rearward from the lower front side, and thereafter extends upward, extends forward, extends upward, and extends rearward.

In such a meandering shape of the second capacitance loading element 968, regarding conductor portions in the front-rear direction and conductor portions in the up-down direction, a total length of the conductor portions in the front-rear direction is greater than a total length of the conductor portions in the up-down direction. Therefore, unlike the second capacitance loading element 168 according to the first embodiment, the meandering shape included in the second capacitance loading element 968 is a meandering shape mainly composed of the conductors extending in the front-rear direction.

The meandering shape included in the first capacitance loading element 840 is a meandering shape mainly composed of the conductors extending in the up-down direction, as described above. Therefore, in the present embodiment, the meandering shapes of the first capacitance loading element 840 and the second capacitance loading element 968 are in different directions.

A first voltage point 875 is a front end portion of the first capacitance loading element 840. A second voltage point 976 is an upper rear end portion. Therefore, in the present embodiment, a distance between the first voltage point 875 and the second voltage point 976 is greater than the minimum distance in the first embodiment.

Thus, mutual interference between the first antenna element 822 and the third antenna element 924 can be further suppressed. Therefore, it is possible to further improve the antenna gains of the first antenna element 822 and the third antenna element 924.

Tenth Embodiment

Figure 25:
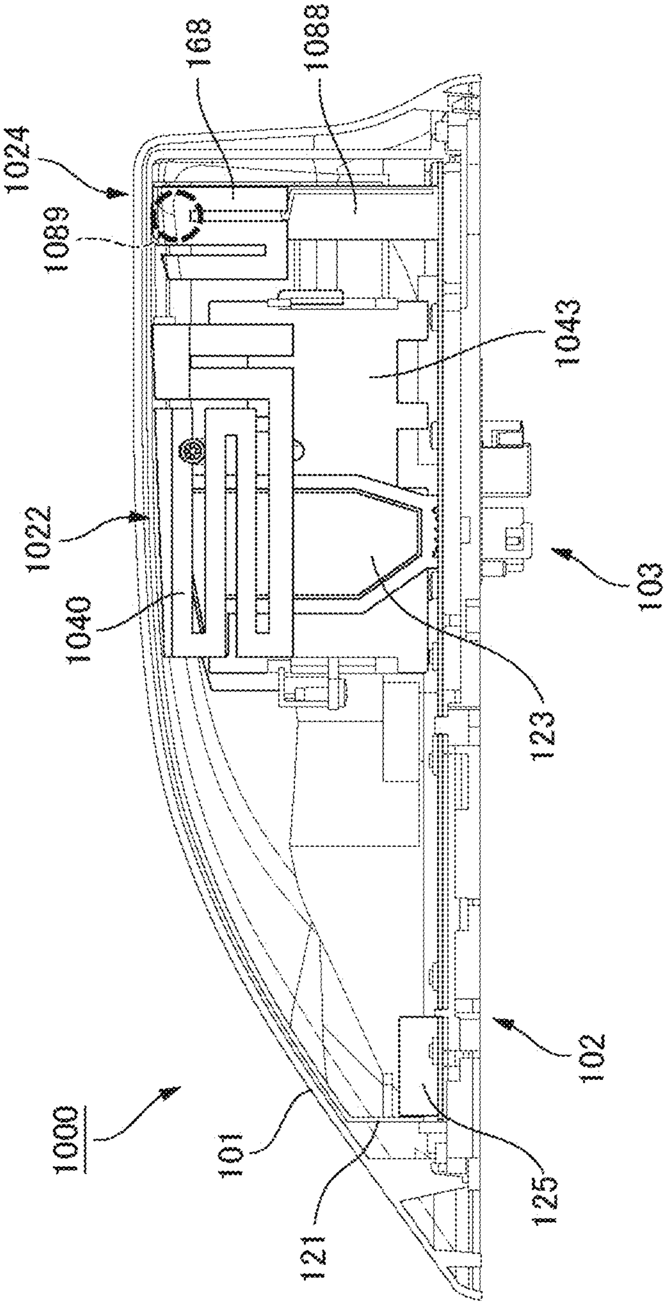
FIG. 25 is a left side view of an antenna device for a vehicle according to a tenth embodiment of the present invention, corresponding to FIG. 3 according to the first embodiment.

FIG. 25 is a left side view of an antenna device 1000 according to a tenth embodiment of the present invention. FIG. 25 shows the inside of the accommodation space in a state in which the antenna case 101 and the inner case 121 are removed at approximately the center in the left-right direction, as in FIG. 3 according to the first embodiment.

As shown in the figure, the antenna device 1000 includes a first antenna element 1022 in place of the first antenna element 122 according to the first embodiment, and includes a third antenna element 1024 in place of the third antenna element 124 according to the first embodiment. The antenna device 1000 further includes a fifth antenna element 1088.

Except for these, the antenna device 1000 may be configured similarly to the antenna device 100 according to the first embodiment.

The first antenna element 1022 includes a first capacitance loading element 1040 and a second circuit board 1043 in place of the first capacitance loading element 140 and the second circuit board 143 according to the first embodiment, respectively. Further, the first antenna element 1022 does not include the first holder 142 and the first helical element 144.

As shown in the figure, the first capacitance loading element 1040 includes a meandering shape in the front-rear direction at the front and a meandering shape in the up-down direction at the rear. Since an area of the meandering shape at the front is larger than an area of the meandering shape at the rear, the first capacitance loading element 1040 as a whole has a meandering shape in the front-rear direction.

The second circuit board 1043 is erected on the first circuit board 104 of the antenna base 102 and is electrically interposed between the first circuit board 104 and the first capacitance loading element 1040.

Except for these, the first antenna element 1022 may be configured similarly to the first antenna element 122 according to the first embodiment.

The third antenna element 1024 includes the second capacitance loading element 168 similar to the first embodiment. In place of the second helical element 171 according to the first embodiment, the fifth antenna element 1088 is connected to the second capacitance loading element 168 according to the present embodiment.

The fifth antenna element 1088 is connected in series with the second capacitance loading element 168 of the third antenna element 1024, and transmits and receives radio waves in a frequency band higher than that of the third antenna element.

Figure 26:
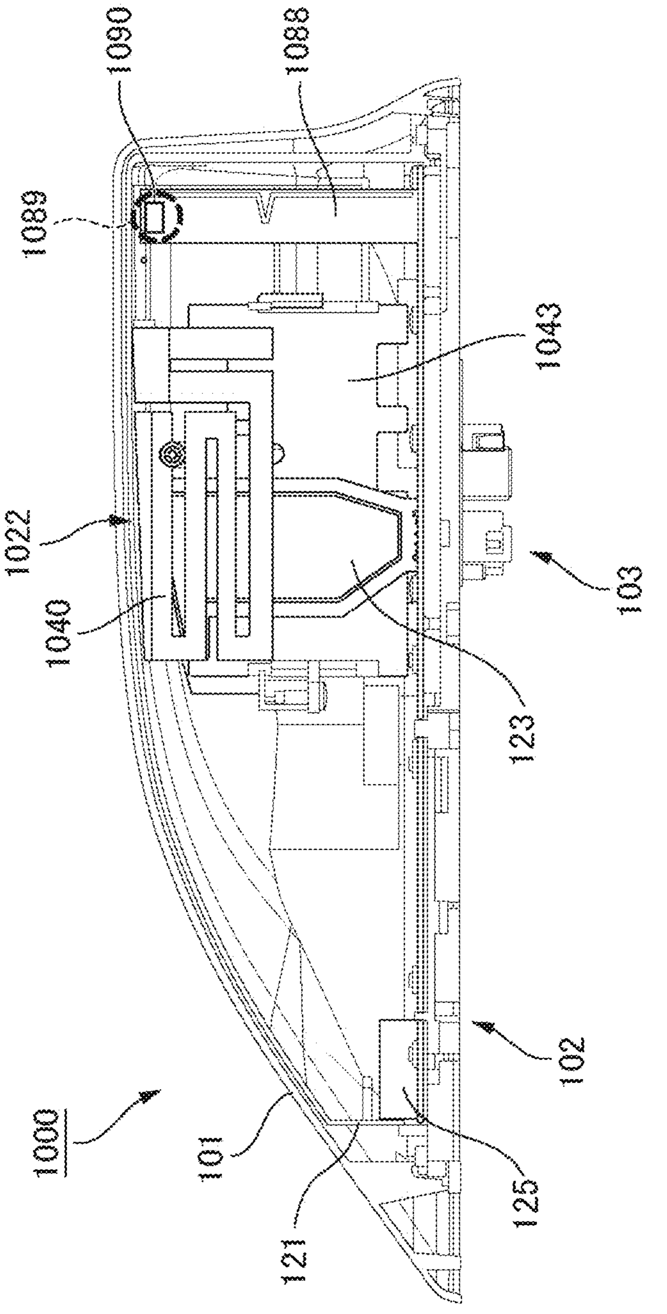
FIG. 26 is a left side view of the antenna device according to the tenth embodiment, showing a state in which a second capacitance loading element is removed from the left side view shown in FIG. 25.

FIG. 26 is a left side view of the antenna device 1000 according to the tenth embodiment, showing a state in which the second capacitance loading element 168 is removed from the left side view shown in FIG. 25 for easy understanding. As shown in the figure, the fifth antenna element 1088 is connected in series to the second capacitance loading element 168 via a trap coil 1090 provided at a fifth connection point 1089.

By loading the trap coil 1090 at the fifth connection point 1089, frequencies of the fifth antenna element 1088 and the third antenna element 1024 are separated. Specifically, a low frequency current passes through the fifth antenna element 1088 and is fed to the third antenna element 1024. A high frequency current flows very little beyond the fifth connection point 1089 due to the high impedance in the trap coil 1090.

At this time, the fifth antenna element 1088 also operates as a two-stage array antenna and operates, for example, as a collinear array antenna.

The fifth antenna element 1088 forms a directivity in a horizontal plane by the two-stage array antenna, and by operating the second capacitance loading element 168 as a reflector, it is possible to further bias the directivity in the rear of the vehicle.

In addition, an element serving as a reflector may be formed on the second circuit board 1043 to further bias the directivity in the rear of the vehicle.

The fifth antenna element 1088 is used at frequencies higher than the frequency band transmitted and received by the third antenna element 1024. Examples of applications for radio waves transmitted and received by the fifth antenna element 1088 include WiFi, BLE (Bluetooth Low Energy), V2X, and ITS (Intelligent Transport Systems).

In the present embodiment, an example in which the fifth antenna element 1088 operates as a two-stage array antenna is shown. However, the fifth antenna element 1088 is not limited thereto and may be a monopole antenna, a dipole antenna, or the like.

Eleventh Embodiment

Figure 27:
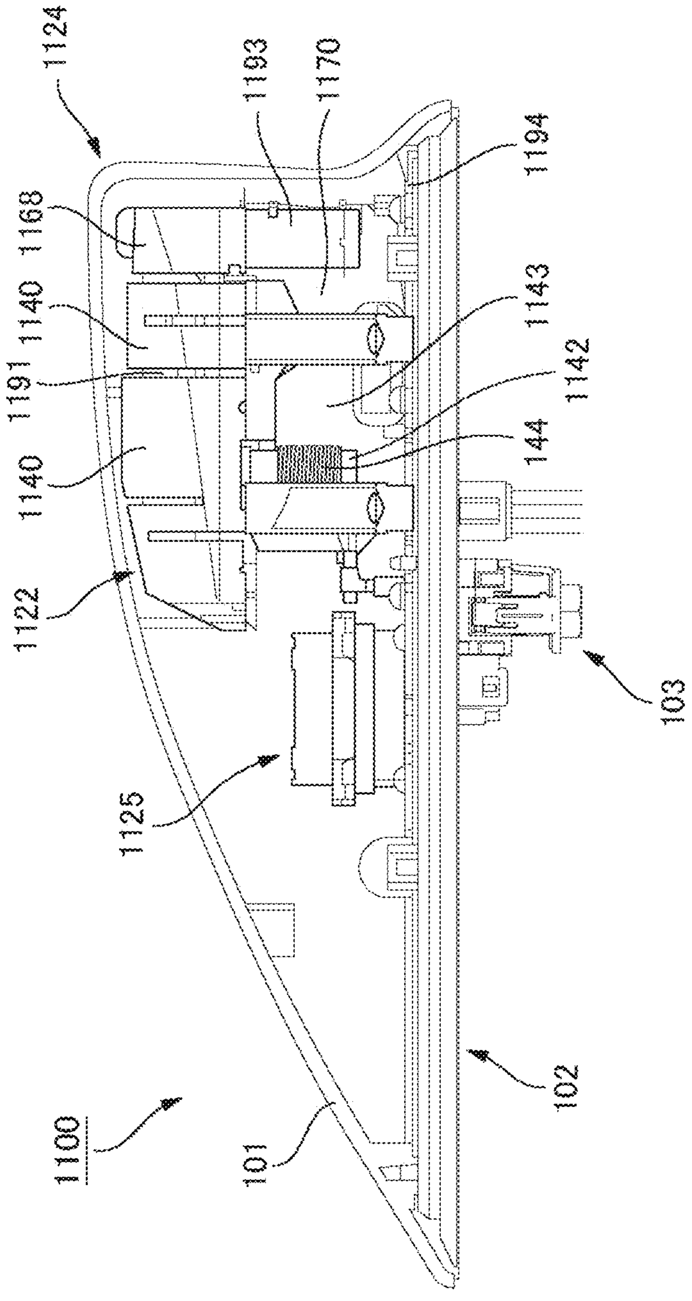
FIG. 27 is a left side view of an antenna device according to an eleventh embodiment, corresponding to FIG. 3 according to the first embodiment.

FIG. 27 is a left side view of an antenna device 1100 according to an eleventh embodiment of the present invention. FIG. 27 shows the inside of the accommodation space in a state in which the antenna case 101 is removed at approximately the center in the left-right direction, as in FIG. 3 according to the first embodiment.

The antenna device 1100 is an antenna device for AM/FM/GNSS/DTTB.

The antenna device 1100 includes a first antenna element 1122, a third antenna element 1124, and a fourth antenna element 1125 in place of the first antenna element 122, the third antenna element 124, and the fourth antenna element 125 according to the first embodiment, respectively. Further, the antenna device 1100 does not include the inner case 121 and the second antenna element 123.

Except for these, the antenna device 1100 may be configured similarly to the antenna device 100 according to the first embodiment.

The first antenna element 1122 receives AM/FM broadcast waves as radio waves in the first frequency band. The third antenna element 1124 receives radio waves for DTTB as radio waves in the second frequency band. The fourth antenna element 1125 receives radio waves for GNSS as radio waves in the fourth frequency band.

These antenna elements 1122, 1124, and 1125 are arranged in order of the fourth antenna element 1125, the first antenna element 1122, and the third antenna element 1124 from the front side of the vehicle in the accommodation space.

Specifically, the first antenna element 1122 includes a first capacitance loading element 1140, a first holder 1142, and a second circuit board 1143 in place of the first capacitance loading element 140, the first holder 142, and the second circuit board 143 according to the first embodiment, respectively. The first antenna element 1122 further includes an element holder 1191.

The first capacitance loading element 1140 is divided into two front and rear parts, as shown in the figure.

The first capacitance loading element 1140 on the front side has a meandering shape in which lower end portions and upper end portions of adjacent conductor elements are alternately connected and gaps are provided between the adjacent conductor elements. The first capacitance loading element 1140 on the rear side has a meandering shape in the up-down direction in which upper end portions of adjacent conductor elements are connected and gaps are provided between the adjacent conductor elements. Therefore, the first capacitance loading element 1140 has a meandering shape in the up-down direction as a whole.

The first capacitance loading element 1140 is fixed to the antenna base 102 by being held by the element holder 1191 fixed to the antenna base 102.

The first holder 1142 is fixed to the antenna base 102 and holds the first helical element 144 like the first holder 142 according to the first embodiment. The first helical element 144 is electrically connected to the first capacitance loading element 1140.

The second circuit board 1143 is fixed to the antenna base 102 and electrically connected to the first helical element 144.

Except for these, the first antenna element 1122 may be configured in substantially the same manner as the first antenna element 122 according to the first embodiment.

The third antenna element 1124 includes a second capacitance loading element 1168 and a second holder 1170 in place of the second capacitance loading element 168 and the second holder 170 according to the first embodiment, respectively. The third antenna element 1124 further includes a feeder element 1193 and a third circuit board 1194. The third antenna element 1124 does not include the second helical element 171.

The second capacitance loading element 1168 is a conductor having a generally flat or curved plate shape that does not include a meandering shape, as shown in the figure. The second capacitance loading element 1168 is held behind the first capacitance loading element 1140 by the element holder 1191 shared with the first capacitance loading element 1140 and fixed to the antenna base 102.

The second holder 1170 is fixed to the antenna base 102 and the feeder element 1193 is attached thereto. The feeder element 1193 is electrically connected to the second capacitance loading element 1168.

The third circuit board 1194 is fixed to the antenna base 102 and electrically connected to the feeder element 1193.

Except for these, the third antenna element 1124 may be configured in substantially the same manner as the third antenna element 124 according to the first embodiment.

The fourth antenna element 1125 is an antenna unit for GNSS and is composed of a patch antenna, a PCB (polychlorinated biphenyl) holder, a shield cover, and the like.

The polarization of the second frequency band is horizontal polarization. The meandering shape included in the first capacitance loading element 1140 is in the up-down direction as described above, which is a direction that intersects the polarization of the second frequency band. Thus, interference between the first antenna element 1122 and the third antenna element 1124 is suppressed as in other embodiments. Therefore, as shown in the figure, even though the first antenna element 1122 and the third antenna element 1124 are arranged close to each other, the antenna gain of the third antenna element 1124 can be ensured.

Twelfth Embodiment

Figure 28:
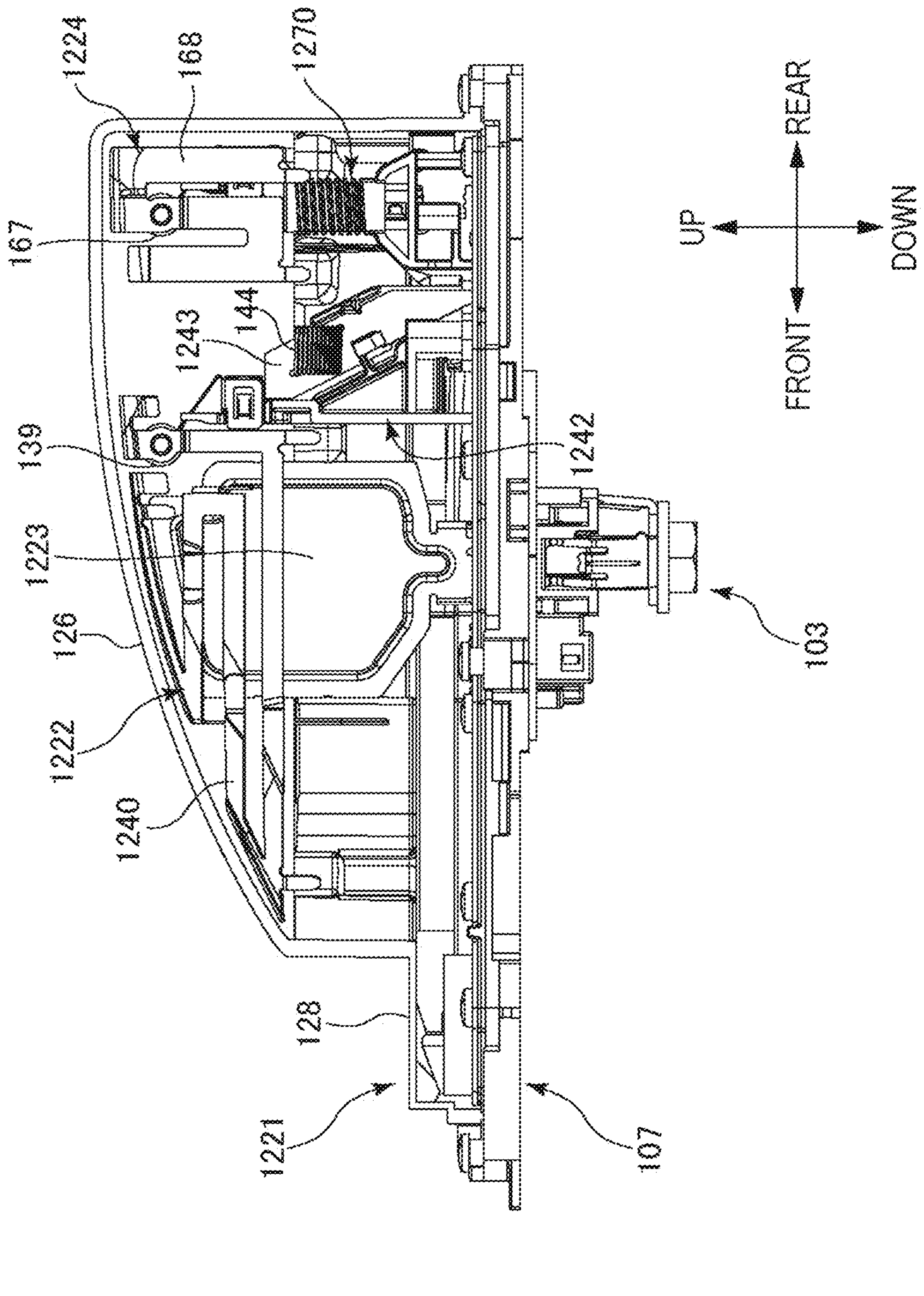
FIG. 28 is a left side view of an antenna device according to a twelfth embodiment of the present invention, corresponding to FIG. 3 according to the first embodiment.
Figure 29:
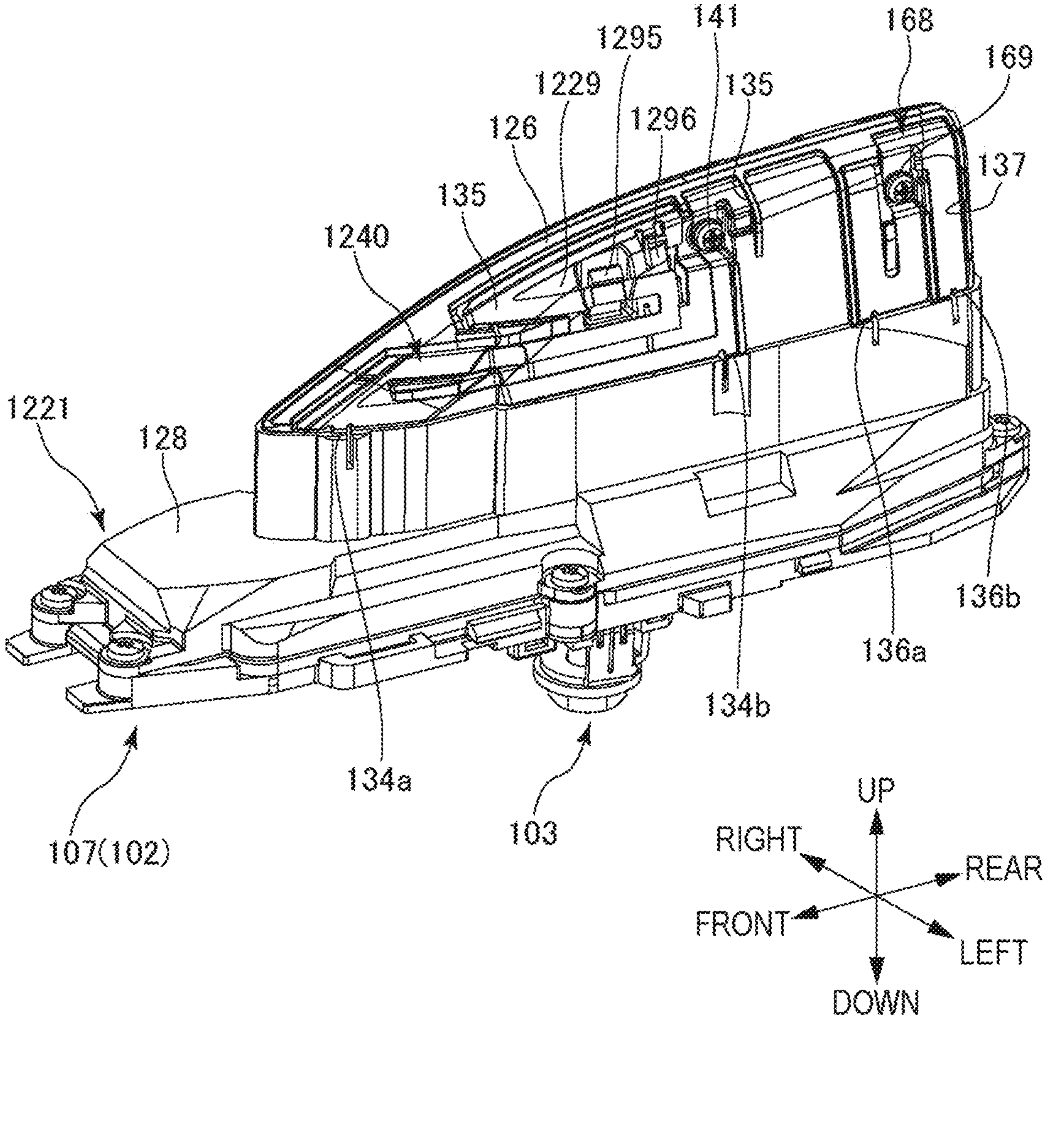
FIG. 29 is a perspective view of the antenna device for a vehicle according to the twelfth embodiment in a state an antenna case is not attached.
Figure 30:
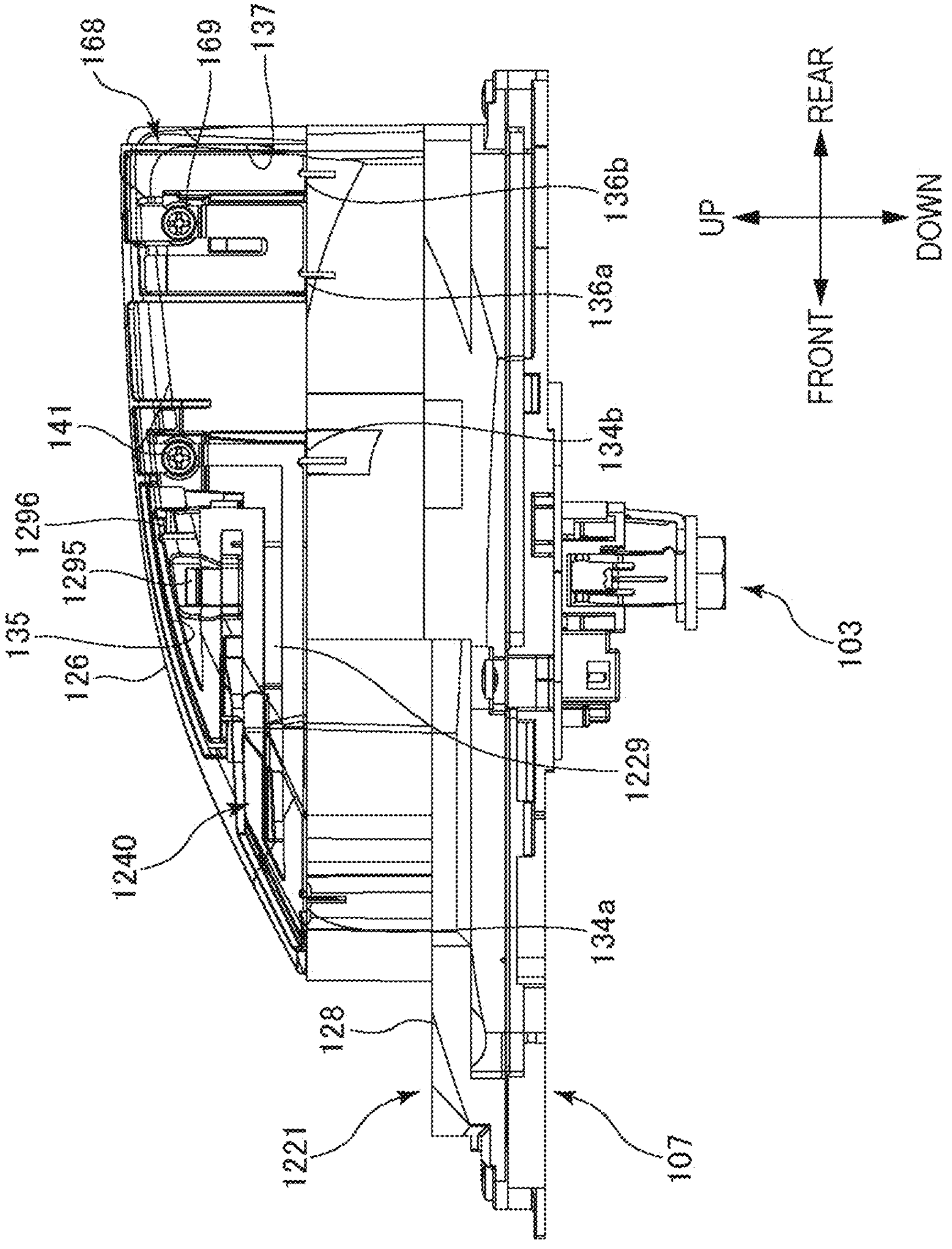
FIG. 30 is a side view of the antenna device for a vehicle according to the twelfth embodiment in a state in which the antenna case is not attached.

FIG. 28 is a left side view of an antenna device 1200 according to a twelfth embodiment of the present invention. FIG. 29 is a perspective view of the antenna device 1200 in a state in which the antenna case 101 is not attached. FIG. 30 is a side view of the antenna device 1200 in a state in which the antenna case 101 is not attached.

The antenna device 1200 according to the present embodiment includes a first circuit board 1204, an inner case 1221, a first antenna element 1222, a second antenna element 1223 and a third antenna element 1224 in place of the first circuit board 104, the inner case 121, the first antenna element 122, the second antenna element 123 and the third antenna element 124 according to the first embodiment, respectively. Except for these, the antenna device 1200 according to the present embodiment may be configured in substantially the same manner as the antenna device 100 according to the first embodiment.

(Configuration of First Circuit Board 1204)

The first circuit board 1204 may be configured in the same manner as the first circuit board 104 according to the first embodiment, except that the configuration for attaching the antenna elements 1222 to 1224 is different from that of the first circuit board 104 according to the first embodiment.

The configuration of the first circuit board 1204 which is different from the first circuit board 104 will be described in connection with the antenna elements 1222 to 1224.

(Configuration of Inner Case 1221)

As shown in FIGS. 28 to 32, in addition to the configuration provided by the inner case 121 according to the first embodiment, the inner case 1221 further includes a locking claw 1295, a third engagement piece fitting portion 1296, and a fourth engagement piece attachment portion 1297 that are provided on left and right first element attachment portions 1229 on each of which a first capacitance loading element 1240 described later is arranged. Further, the locking groove portion 131 according to the present embodiment does not penetrate in the left-right direction and is separated to the left and right.

Figure 31:
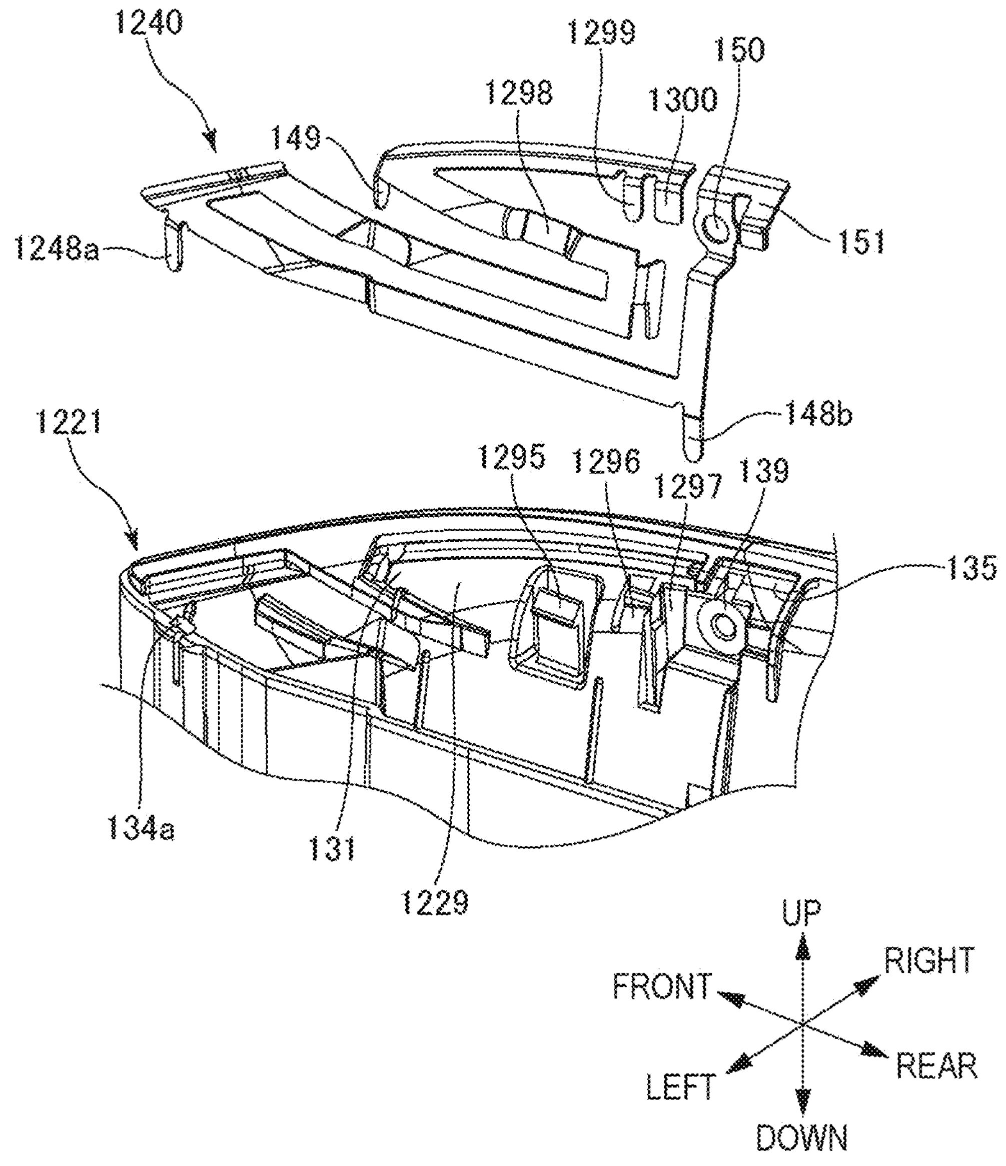
FIG. 31 is an exploded perspective view showing a part of an inner case and a first capacitance loading element according to the twelfth embodiment.
Figure 32:
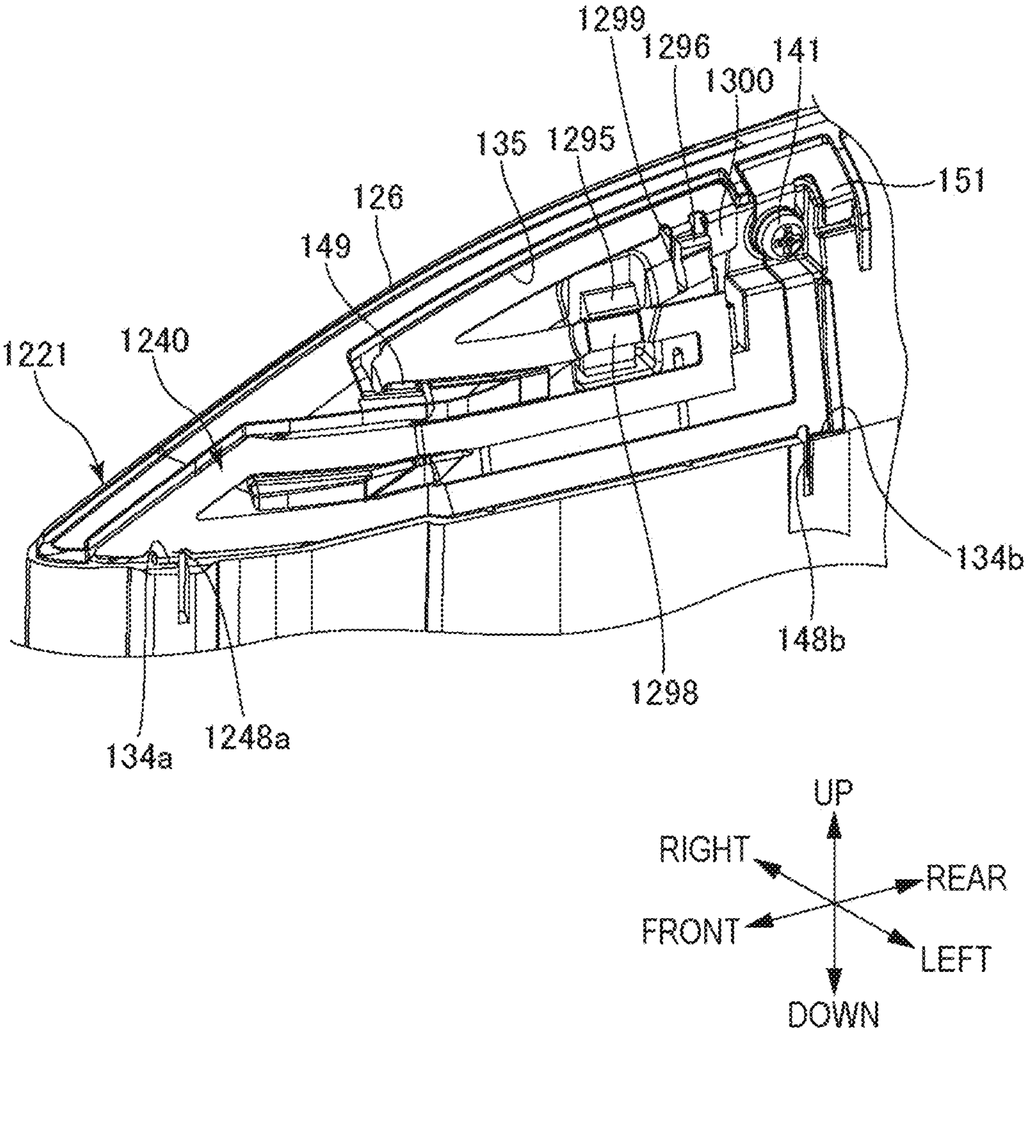
FIG. 32 is a perspective view showing the first capacitance loading element attached to the inner case in the twelfth embodiment.

FIG. 31 is an exploded perspective view showing a part of the inner case 1221 and the first capacitance loading element 1240 according to the present embodiment. FIG. 32 is a perspective view showing the first capacitance loading element 1240 attached to the inner case 1221 according to the present embodiment.

The locking claw 1295 includes a claw for locking the first capacitance loading element 1240. The third engagement piece fitting portion 1296 is provided at an upper rear end portion of the first element attachment portion 1229 and is surrounded by wall surface portions on the front, rear, left, and right to form an upwardly open space. The fourth engagement piece attachment portion 1297 is provided in the third engagement piece fitting portion 1296 and forms an exposed surface facing outward (a surface exposed parallel to the front-rear direction and the up-down direction in the present embodiment).

FIG. 31 shows the locking claw 1295, the third engagement piece fitting portion 1296, and the fourth engagement piece attachment portion 1297 provided on the left first element attachment portion 1229, but these portions 1295 to 1297 may be provided on the right first element attachment portion 1229 approximately in left-right symmetry.

(Configuration of First Antenna Element 1222)

The first antenna element 1222 includes the first capacitance loading element 1240, a first holder 1242, a second circuit board 1243, and a first spring contact metal member 1245 in place of the first capacitance loading element 140, the first holder 142, the second circuit board 143, and the first spring contact metal member 145 according to the first embodiment, respectively. Except for these, the first antenna element 1222 may be configured similarly to the first antenna element 122 according to the first embodiment.

As shown in FIGS. 29 to 32, the first capacitance loading element 1240 has a shape extending more forward than the first capacitance loading element 140 according to the first embodiment. The first capacitance loading element 1240 includes a first engagement piece **1248*a* in place of the first engagement piece 148*a* according to the first embodiment. Furthermore, the first capacitance loading element 1240 includes a locking recessed portion 1298, a third engagement piece 1299 and a fourth engagement piece 1300. Except for these, the first capacitance loading element 1240 may be configured similarly to the first capacitance loading element 140** according to the first embodiment.

The first engagement piece **1248*a* has a different shape from the first engagement piece 148*a* according to the first embodiment and extends downward from a front lower end portion of the inclined portion 147**.

The first engagement piece **1248*a* is fitted into the first engagement piece fitting portion 134*a* through the opening of the first engagement piece fitting portion 134*a*, like the first engagement piece 148*a*** according to the first embodiment. The shape of the first engagement piece fitting portion 134*a* may be changed to a shape different from that of the first embodiment according to the shape of the first engagement piece 1248*a*.

The locking recessed portion 1298 forms an inward recess at a portion extending in the front-rear direction in the first capacitance loading element 1240 having a meandering shape. That is, in the left first capacitance loading element 1240, the locking recessed portion 1298 forms a rightward recess, and in the right first capacitance loading element 1240, the locking recessed portion 1298 forms a leftward recess.

The locking recessed portion 1298 can be attached to the first element attachment portion 1229 by snap-fitting to the locking claw 1295. When the locking recessed portion 1298 is attached to the first element attachment portion 1229, the locking recessed portion 1298 is locked to the locking claw 1295 so as not to move upward.

The third engagement piece 1299 is provided to extend downward from the vicinity of an upper end of a portion that extends forward while being inclined slightly downward from the upper side in the first capacitance loading element 1240 having a meandering shape. The third engagement piece 1299 is fitted into the third engagement piece fitting portion 1296.

The fourth engagement piece 1300 is provided behind the third engagement piece 1299 so as to extend downward. The fourth engagement piece 1300 has a small flat plate shape parallel to the front-rear direction and the up-down direction, and when being attached to the first element attachment portion 1229, one surface thereof comes into surface contact with the fourth engagement piece attachment portion 1297.

By providing the locking recessed portion 1298, the third engagement piece 1299 and the fourth engagement piece 1300, the first capacitance loading element 1240 can be firmly held in the inner case 1221.

As shown in FIGS. 28 and 33 to 36, the first holder 1242 includes a second circuit board attachment portion 1252, a projection pair portion 1253, a first metal member attachment portion 1254, a first protrusion portion 1255, and a co-fastening boss portion 1256 in place of the flat plate portion 152, the projection pair portion 153, the first metal member attachment portion 154, the first protrusion portion 155, the co-fastening boss portion 156 according to the first embodiment, respectively. Except for these, the first holder 1242 may be configured similarly to the first holder 142 according to the first embodiment.

Figure 33:
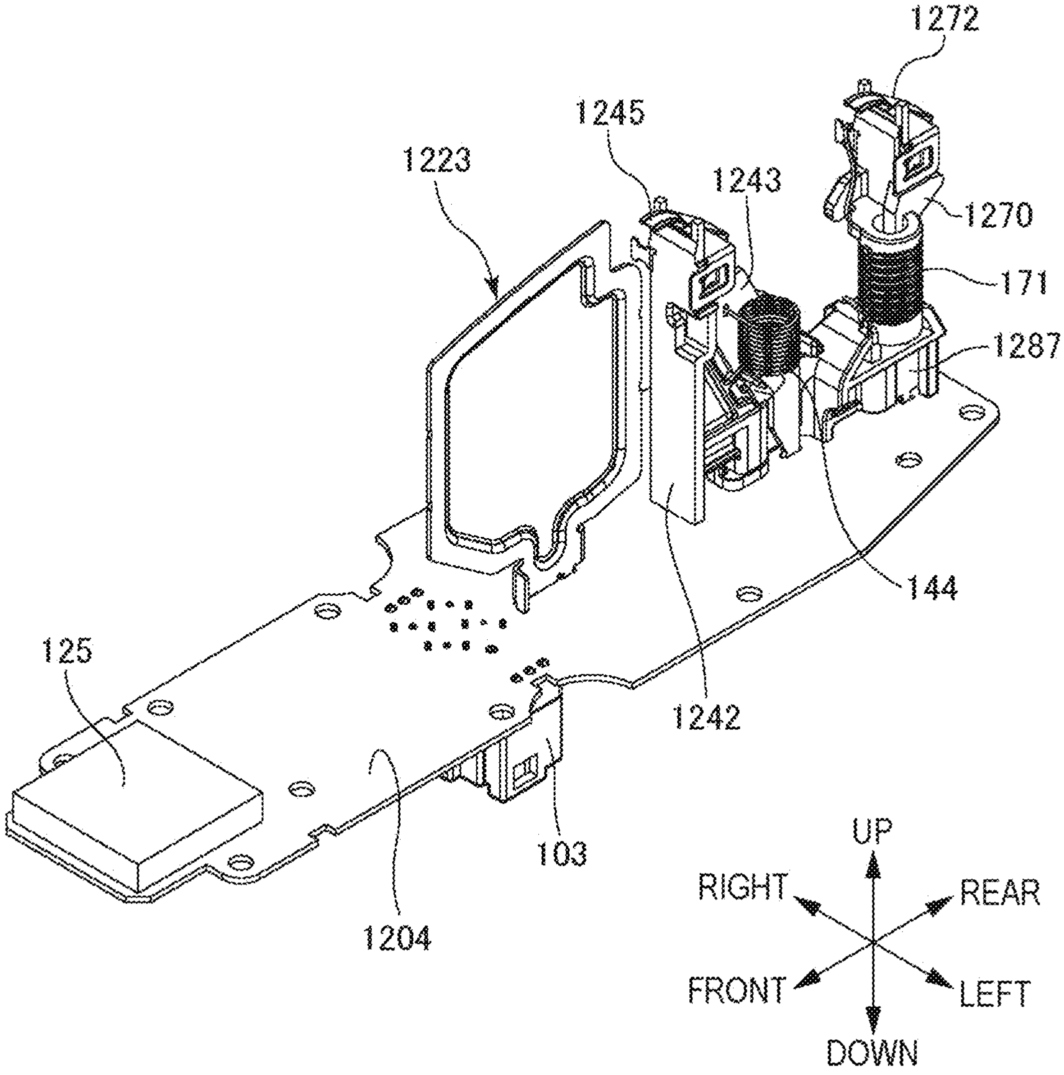
FIG. 33 is a perspective view showing a first holder, a second antenna element, a second holder, and a fourth antenna element that are attached to a first circuit board in the twelfth embodiment.
Figure 34:
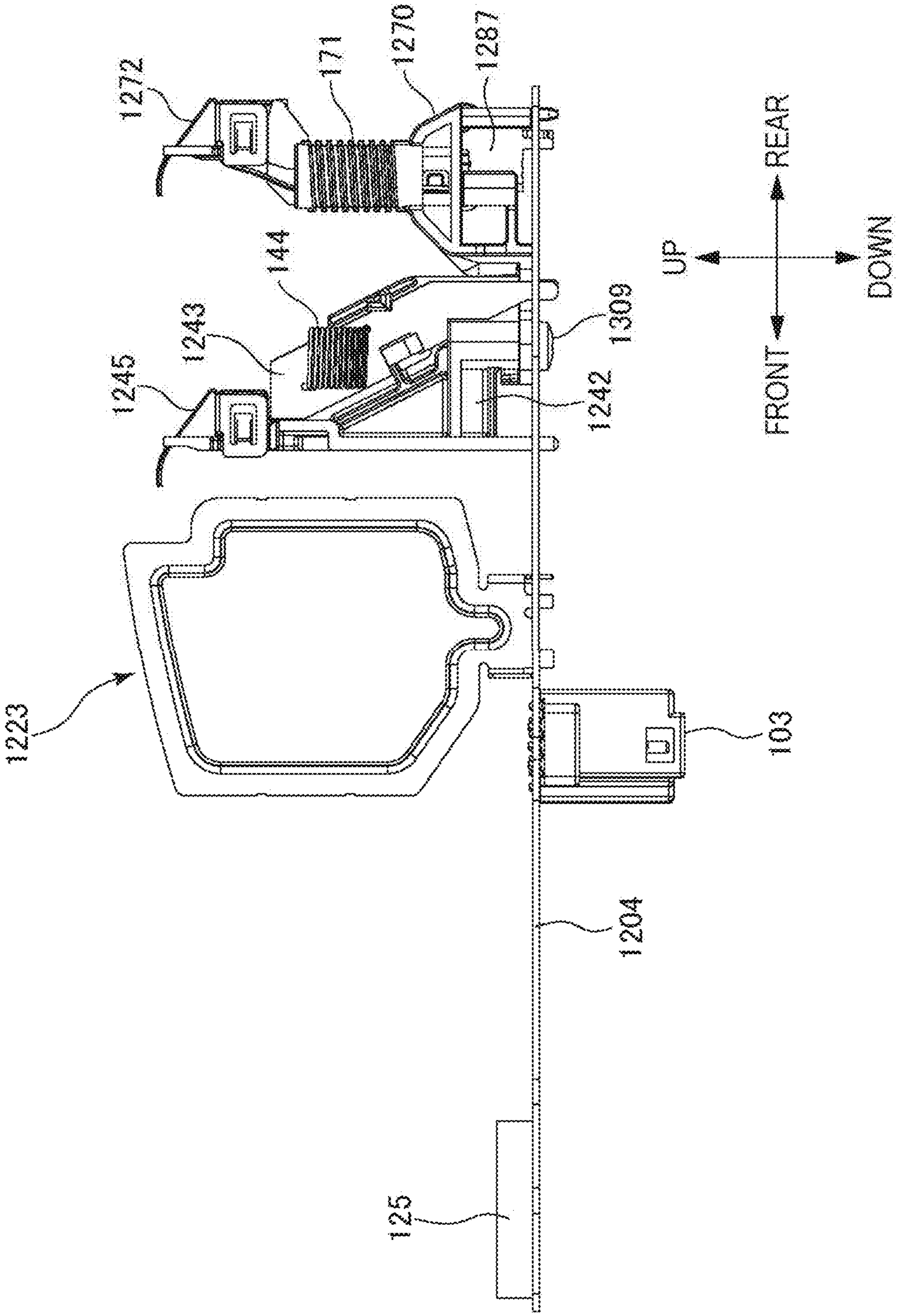
FIG. 34 is a left side view showing the first holder, the second antenna element, the second holder, and the fourth antenna element that are attached to the first circuit board in the twelfth embodiment.

FIG. 33 is a perspective view showing the first holder 1242, the second antenna element 1223, a second holder 1270 (described later in detail), and the fourth antenna element 125 that are attached to the first circuit board 1204 according to the present embodiment. FIG. 34 is a left side view showing the first holder 1242, the second antenna element 1223, the second holder 1270 (described later in detail), and the fourth antenna element 125 that are attached to the first circuit board 1204 according to the present embodiment.

Figure 35:
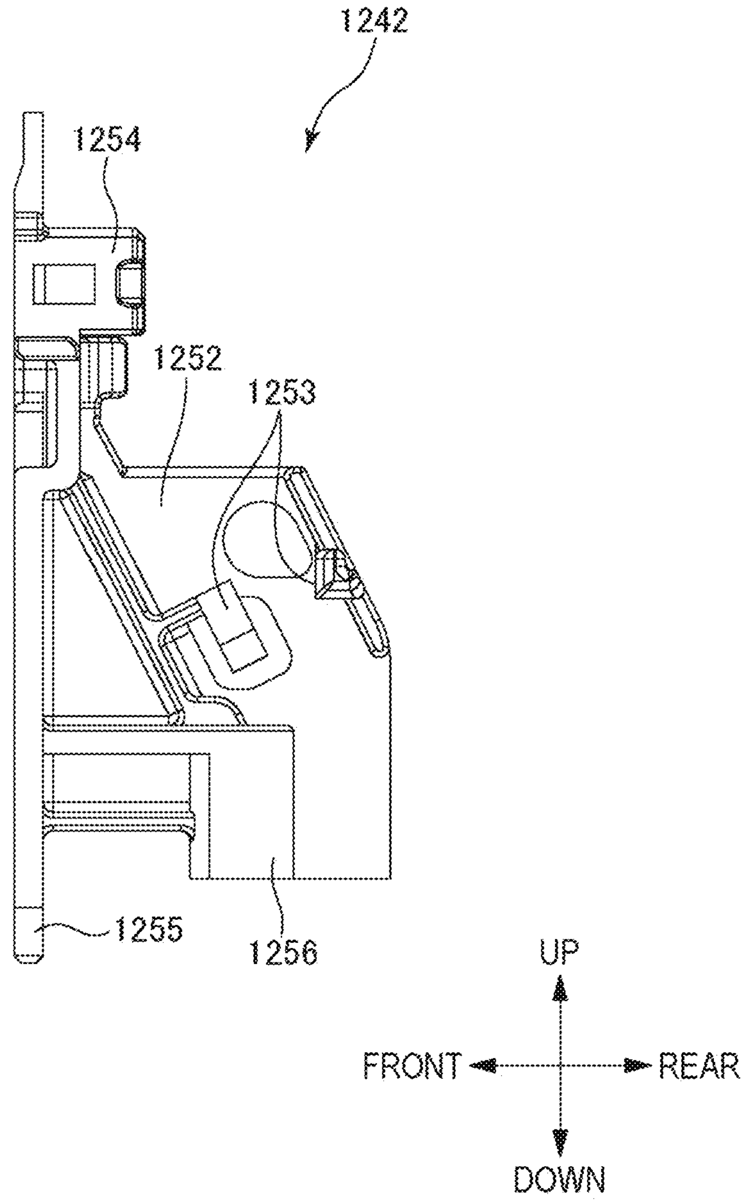
FIG. 35 is a left side view of the first holder according to the twelfth embodiment.
Figure 36:
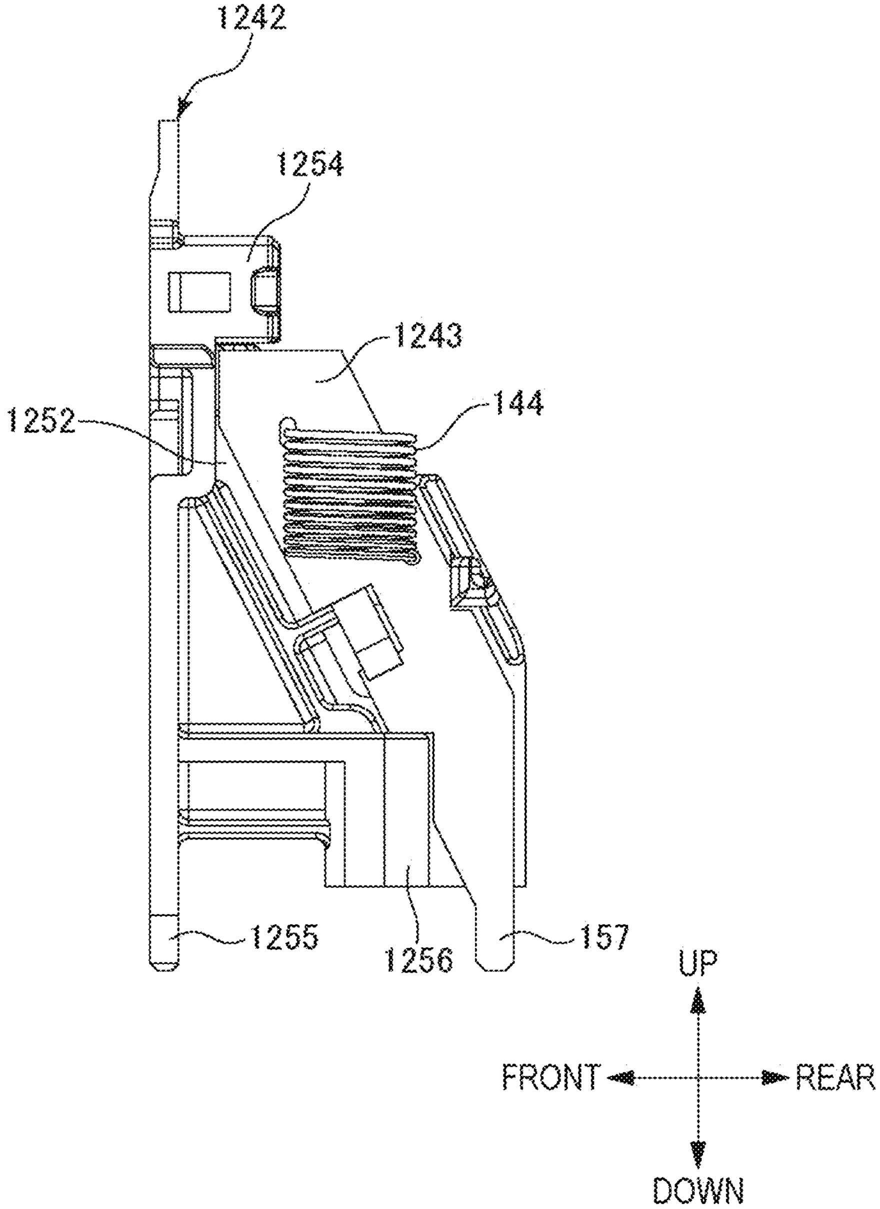
FIG. 36 is a left side view of the first holder to which a second circuit board and a first helical element are attached in the twelfth embodiment.

FIG. 35 is a left side view of the first holder 1242 according to the present embodiment. FIG. 36 is a left side view of the first holder 1242 to which the second circuit board 1243 and the first helical element 144 are attached according to the present embodiment.

The second circuit board attachment portion 1252 is a portion to which the second circuit board 1243 having a shape different from that of the second circuit board 143 according to the first embodiment is attached. The second circuit board attachment portion 1252 has a shape different from that of the flat plate portion 152 according to the first embodiment and forms a generally flat plate shape in which an upper right portion and a lower portion of the flat plate are cut out when viewed from the left, and a rib for reinforcement is provided.

The projection pair portion 1253 is a portion protruding leftward and is composed of a lower projection portion of the projection pair portion 153 according to the first embodiment and a projection portion provided opposite thereto.

The first metal member attachment portion 1254 is a portion extending in the front-rear direction. The first metal member attachment portion 1254 according to the present embodiment is composed of lower and left and right wall portions and is a generally prismatic portion forming a hollow that is open upward. The first metal member attachment portion 1254 may extend in the front-rear direction and may be, for example, a part of a hollow columnar wall portion or a solid columnar shape.

The first protrusion portion 1255 is a portion protruding downward from a front end lower portion of the second circuit board attachment portion 1252 and is fitted into the third through-hole 111, like the first protrusion portion 155 of the first embodiment.

The co-fastening boss portion 1256 is a portion provided with a hole extending upward from a lower end surface and has a substantially cylindrical shape, like the first protrusion portion 155 of the first embodiment. In the present embodiment, the co-fastening boss portion 1256 is provided at approximately the center in the front-rear direction or at a lower portion reward from the center.

Figure 37:
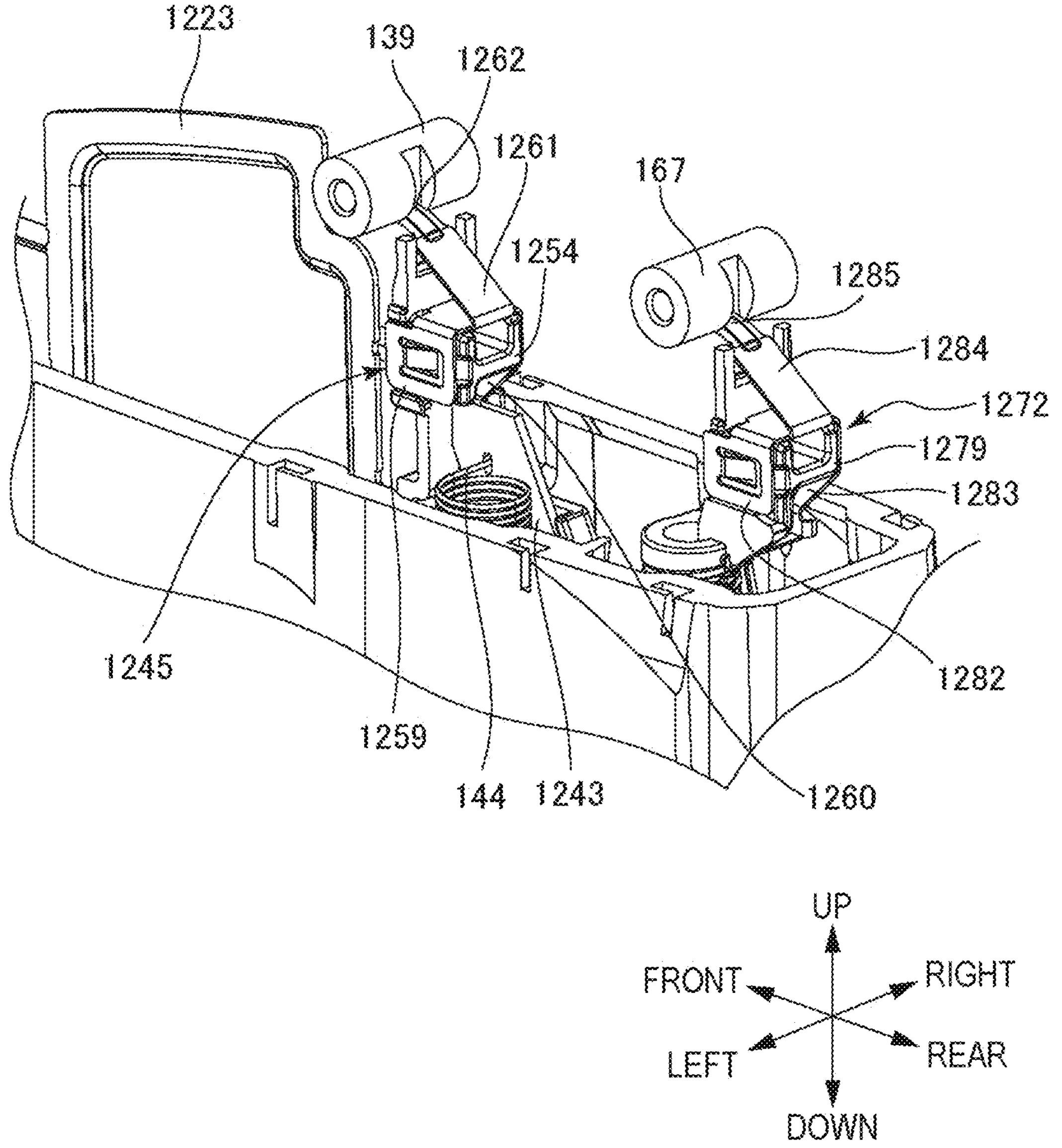
FIG. 37 is a perspective view of the first holder to which a first spring contact metal member is attached, as viewed from a first direction in the twelfth embodiment.
Figure 38:
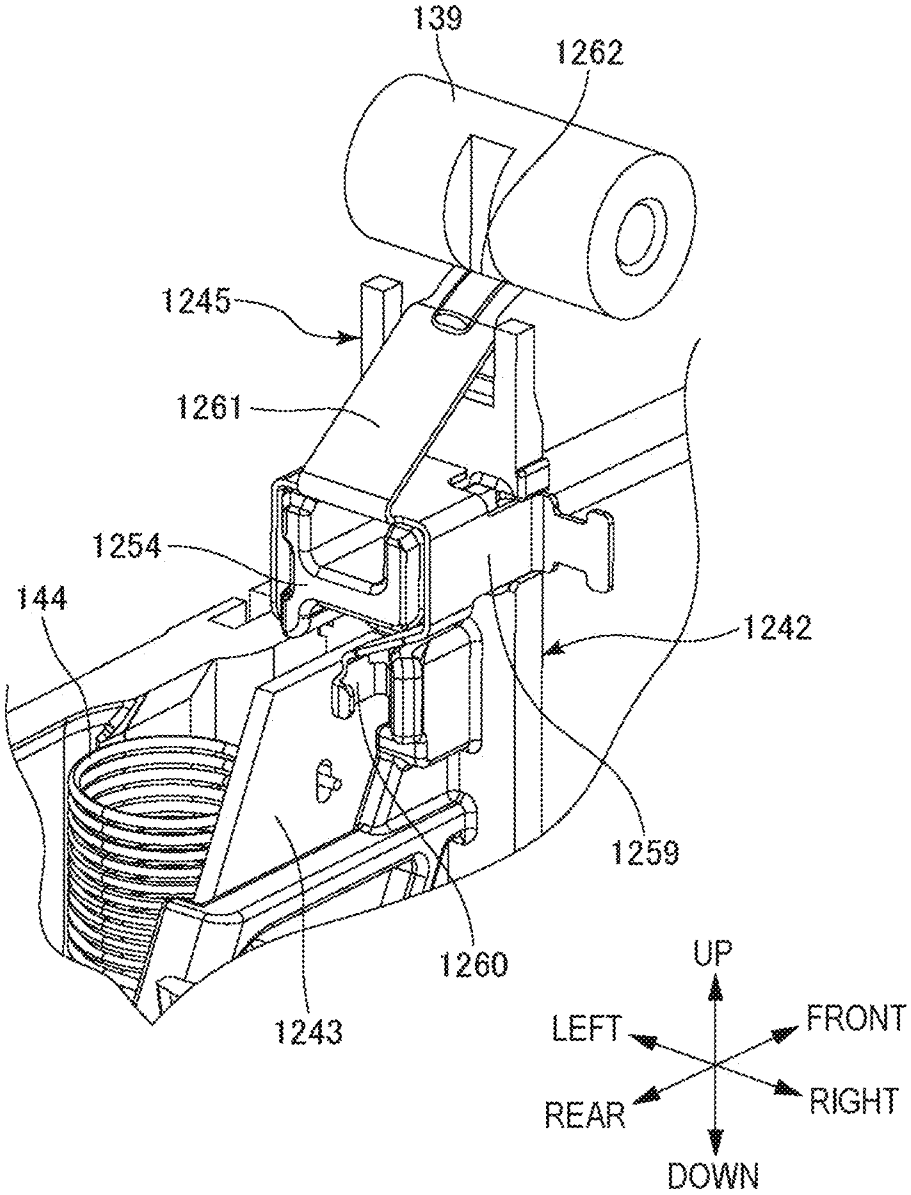
FIG. 38 is a perspective view of the first holder to which the first spring contact metal member is attached, as viewed from a second direction in the twelfth embodiment.

The first spring contact metal member 1245 is a member integrally made of metal and as shown in FIGS. 37 and 38, includes a first held portion 1259, a first connection portion 1260, and a first contact portion 1261.

FIGS. 37 and 38 are perspective views of the first holder 1242 to which the first spring contact metal member 1245 according to the present embodiment is attached, as viewed from different directions.

The first held portion 1259 is a portion forming a hole extending in the front-rear direction. The first held portion 1259 is configured to fit together with the first metal member attachment portion 1254.

The first connection portion 1260 is a portion extending downward from the first held portion 1259. A lower end of the first connection portion 1260 is arranged to be in contact with the second circuit board 1243 and is soldered to the second circuit board 1243. Thus, the first connection portion 1260 and the second circuit board 1243 can be reliably electrically connected.

The first contact portion 1261 is a portion extending obliquely upward and forward, like the first contact portion 161 according to the first embodiment.

When the first antenna element 1222 is arranged on the inner case 1221 and the base 107 and the inner case 1221 is screwed to the base 107, the first contact portion 1261 comes into contact with the first connection conductor 139 and is pressed from above. Since the first contact portion 1261 repels due to elastic force when being pressed from above, the first contact portion 1261 is reliably brought into contact with and electrically connected to the first connection conductor 139 at a first contact point 1262, as shown in FIGS. 37 and 38.

The first contact point 1262 according to the present embodiment is provided with an upwardly protruding ridge. The ridge has an arc shape when viewed from an extension direction. By providing such a ridge, the first contact point 1262 can more stably comes into contact with the first connection conductor 139.

Figure 39:
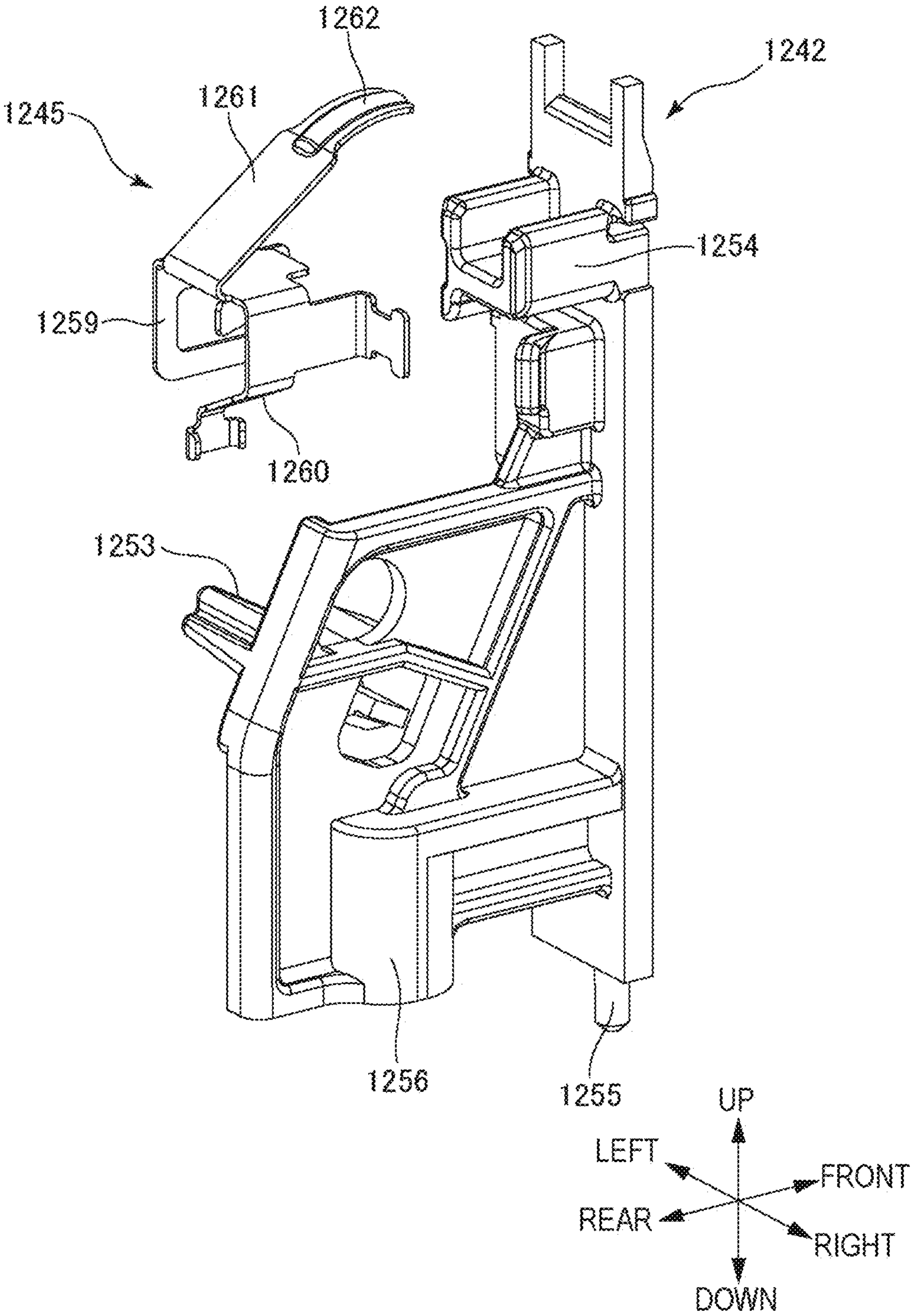
FIG. 39 is a view showing a method of attaching the first spring contact metal member to the first holder in the twelfth embodiment.

Such a first held portion 1259 is fixed to the first holder 1242 by being fitted with the first metal member attachment portion 1254 as shown in FIG. 39. FIG. 39 is a view showing a method of attaching the first spring contact metal member 1245 to the first holder 1242. The first held portion 1259 may be press-fitted into the first metal member attachment portion 1254.

Figure 40:
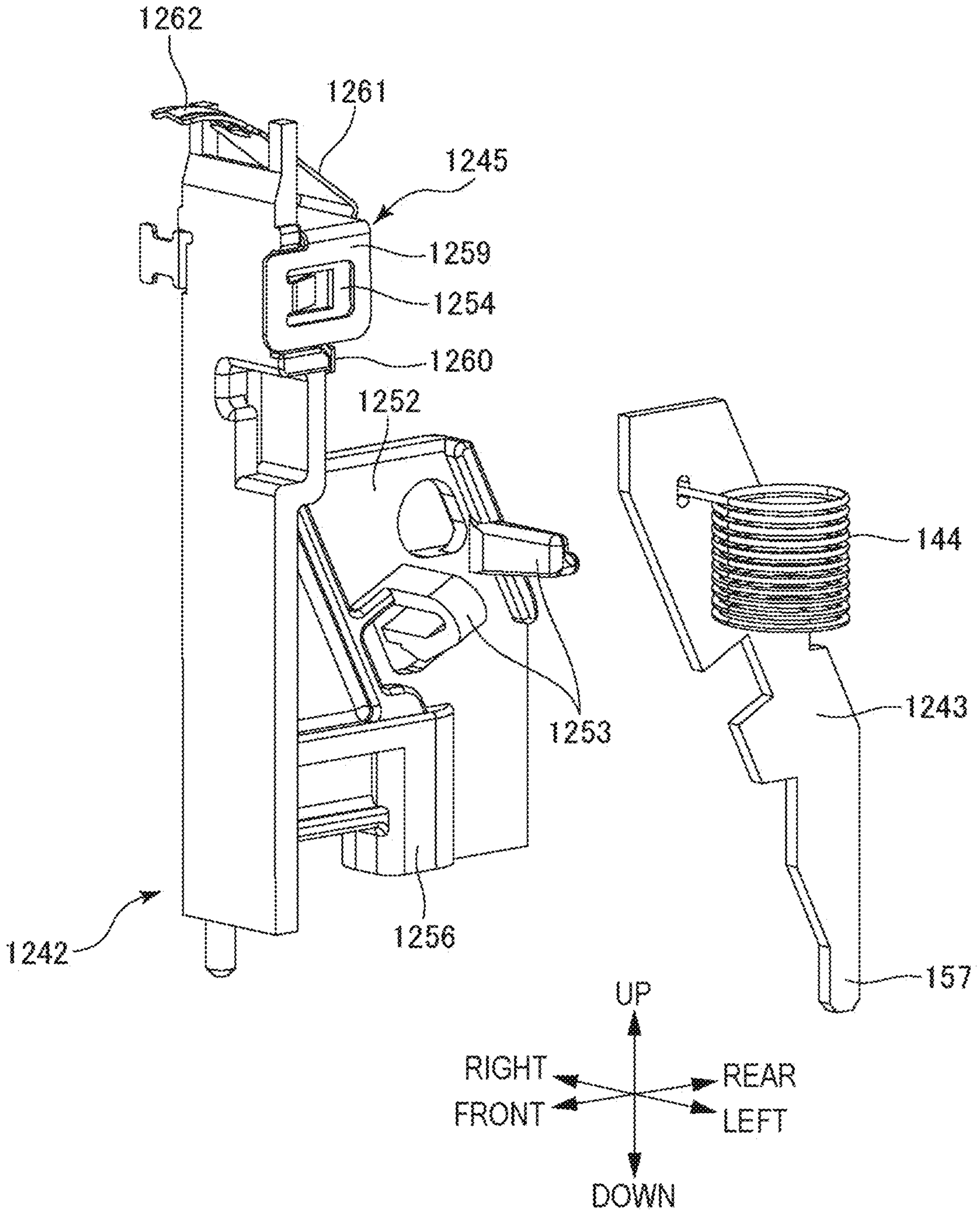
FIG. 40 is a view showing a method of attaching the second circuit board to the first holder in the twelfth embodiment.

Further, as shown in FIG. 40, the second circuit board 1243 is attached to the second circuit board attachment portion 1252 of the first holder 1242 by being fitted to the projection pair portion 1253 from the left. FIG. 40 is a view showing a method of attaching the second circuit board 1243 to the first holder 1242.

Further, each end portion of the first helical element 144 is inserted into a through-hole in the left-right direction provided in the second circuit board 1243 and soldered to the second circuit board 1243. The through-hole into which each end portion of the first helical element 144 is inserted may be circular, but is desirably an elongated hole having a length in a predetermined direction (for example, rearward in the up-down direction). By forming the through-hole into an elongated hole, the first helical element 144 can be easily provided on the second circuit board 1243 regardless of variations in shape of the first helical element 144.

(Configuration of Second Antenna Element 1223)

Figure 41:
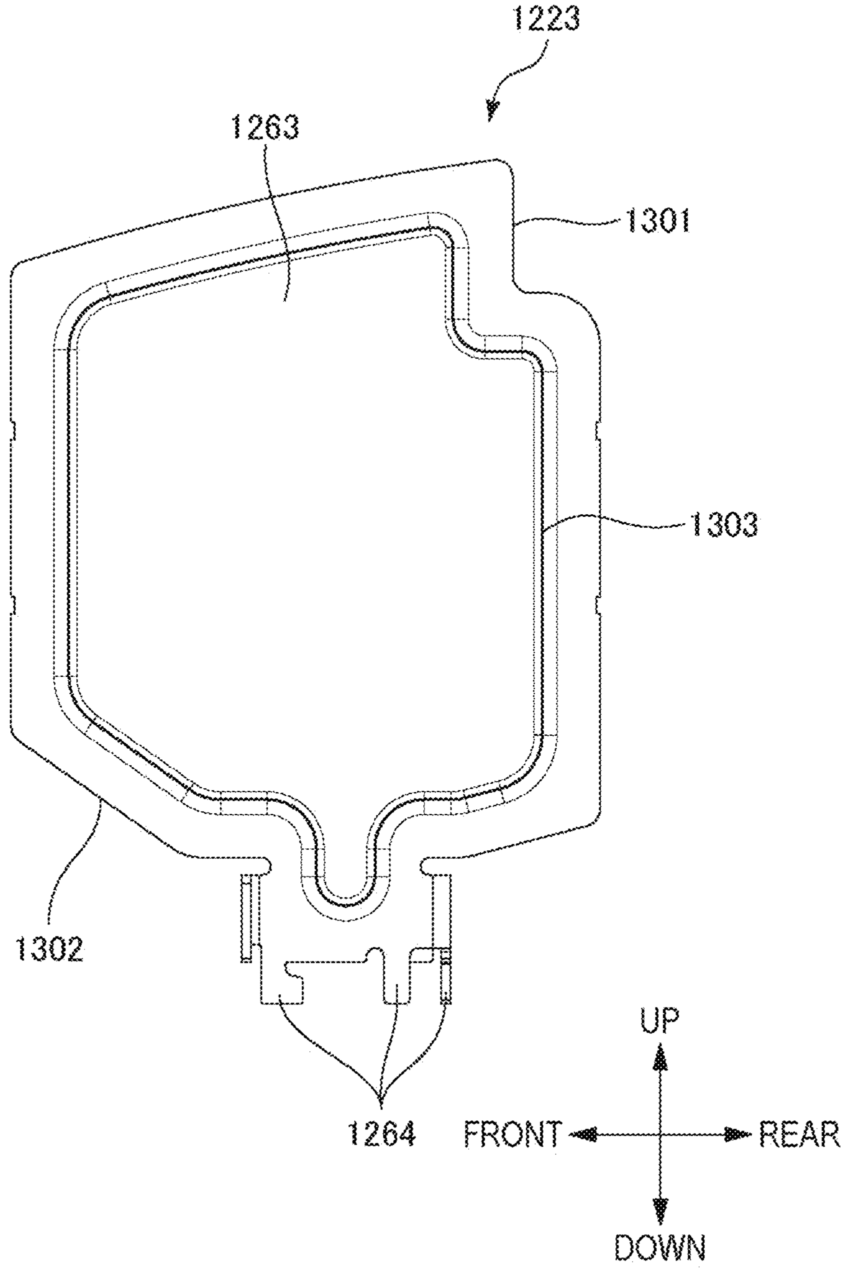
FIG. 41 is a left side view of the second antenna element according to the twelfth embodiment.

The second antenna element 1223 is made by processing a metal plate (metal sheet), and as shown in FIGS. 28, 33, 34, and 41, includes a flat plate portion 1263 having a flat plate shape and a plurality of attachment projection portions 1264 projecting downward from a lower end portion of the flat plate portion 1263. FIG. 41 is a left side view of the second antenna element 1223 according to the present embodiment.

The flat plate portion 1263 includes a first cutout portion 1301 provided on the upper right side when viewed from the left, a second cutout portion 1302 provided on the lower left side when viewed from the left, and a reinforcing structural portion 1303.

The first cutout portion 1301 and the second cutout portion 1302 are portions that form a cut-out shape.

By providing the first cutout portion 1301, an outer edge of the flat plate portion 1263 can be further separated from the feeder (first connection conductor 139 in the present embodiment) of the first capacitance loading element 1240 compared to a case where the first cutout portion 1301 is not provided. Thus, the isolation between the first antenna element 1122 and the second antenna element 1223 can be improved.

In addition, like the second cutout portion 1302, by providing a portion having a cut-out shape at a lower end of the flat plate portion 1263, the outer edge of the flat plate portion 1263 can be further separated, for example, from a reference potential in the first circuit board 1204, compared to a case where the second cutout portion 1302 is not provided. Thus, capacitive coupling between the second antenna element 1223 and the reference potential can be reduced, and transmission/reception efficiency can be improved.

The reinforcing structural portion 1303 is a portion for reinforcing the flat plate portion 1263. The reinforcing structural portion 1303 according to the present embodiment forms a ridge substantially along an outer edge. The reinforcing structural portion 1303 is provided by, for example, drawing or beading. By providing the reinforcing structural portion 1303, a strength of the second antenna element 1223 can be improved compared to a case where the reinforcing structural portion 1303 is not provided, and the second antenna element 1223 can stand on its own with respect to the first circuit board 1204.

Figure 42:
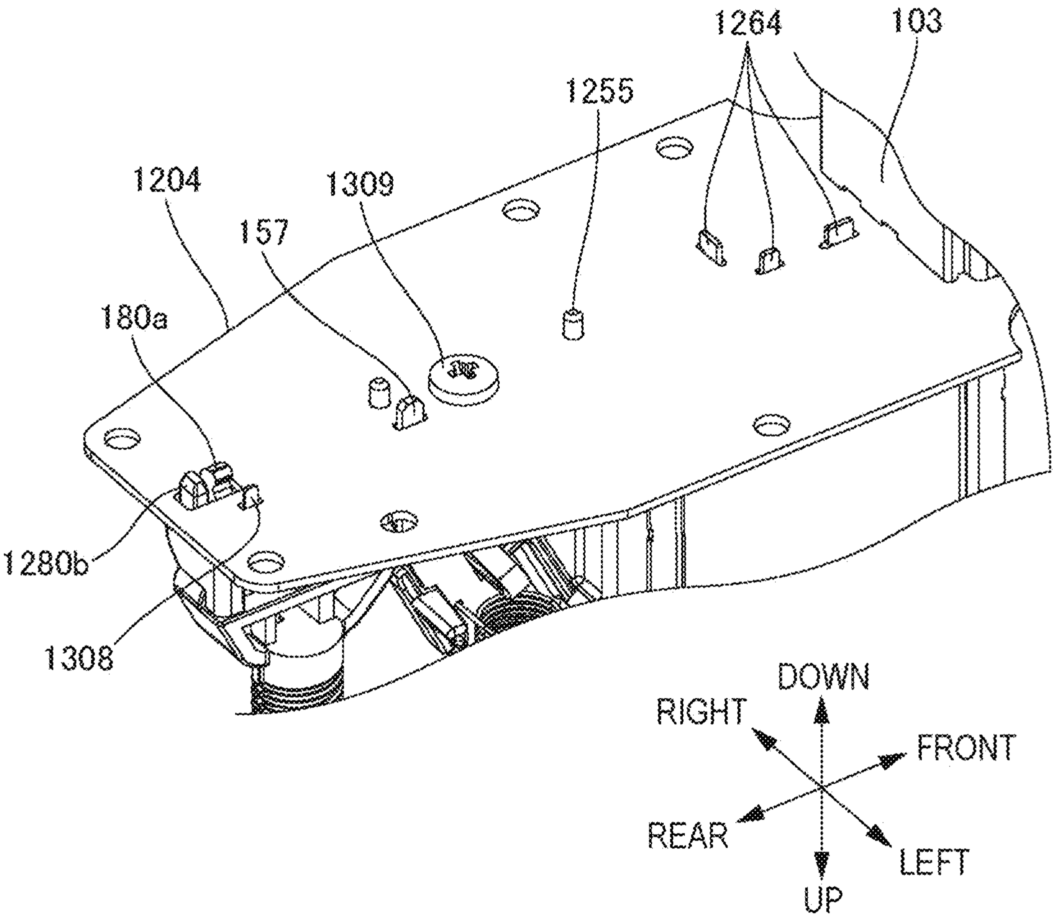
FIG. 42 is a perspective view of a rear portion of the first circuit board according to the twelfth embodiment, as viewed from below.

As shown in FIGS. 41 and 42, each of the plurality of attachment projection portions 1264 is a portion protruding downward. FIG. 42 is a perspective view of a rear portion of the first circuit board 1204 viewed from below.

The plurality of attachment projection portions 1264 are fitted into second through-holes each provided corresponding thereto in the first circuit board 1204 and fixed to the first circuit board 1204. Soldering, for example, may be adopted for fixing each of the attachment projection portions 1264, as in the first embodiment.

Further, clinching may be adopted for fixing some of the attachment projection portions 1264. The clinching is a method of fixing by twisting a quadrangular portion protruding from the first circuit board 1204 in the attachment projection portion 1264 so as to rotate around the up-down direction. By adopting clinching, the number of parts can be reduced compared to fixing using screws or the like, and fixing can be performed more easily than soldering.

(Configuration of Third Antenna Element 1224)

As shown in FIGS. 33 and 34, the third antenna element 1224 includes a second holder 1270, a second spring contact metal member 1272, and a lower terminal 1287 in place of the second holder 170, the second spring contact metal member 172, and the lower terminal 187 according to the first embodiment, respectively. Except for these, the third antenna element 1224 may be configured similarly to the third antenna element 124 according to the first embodiment.

Figure 43:
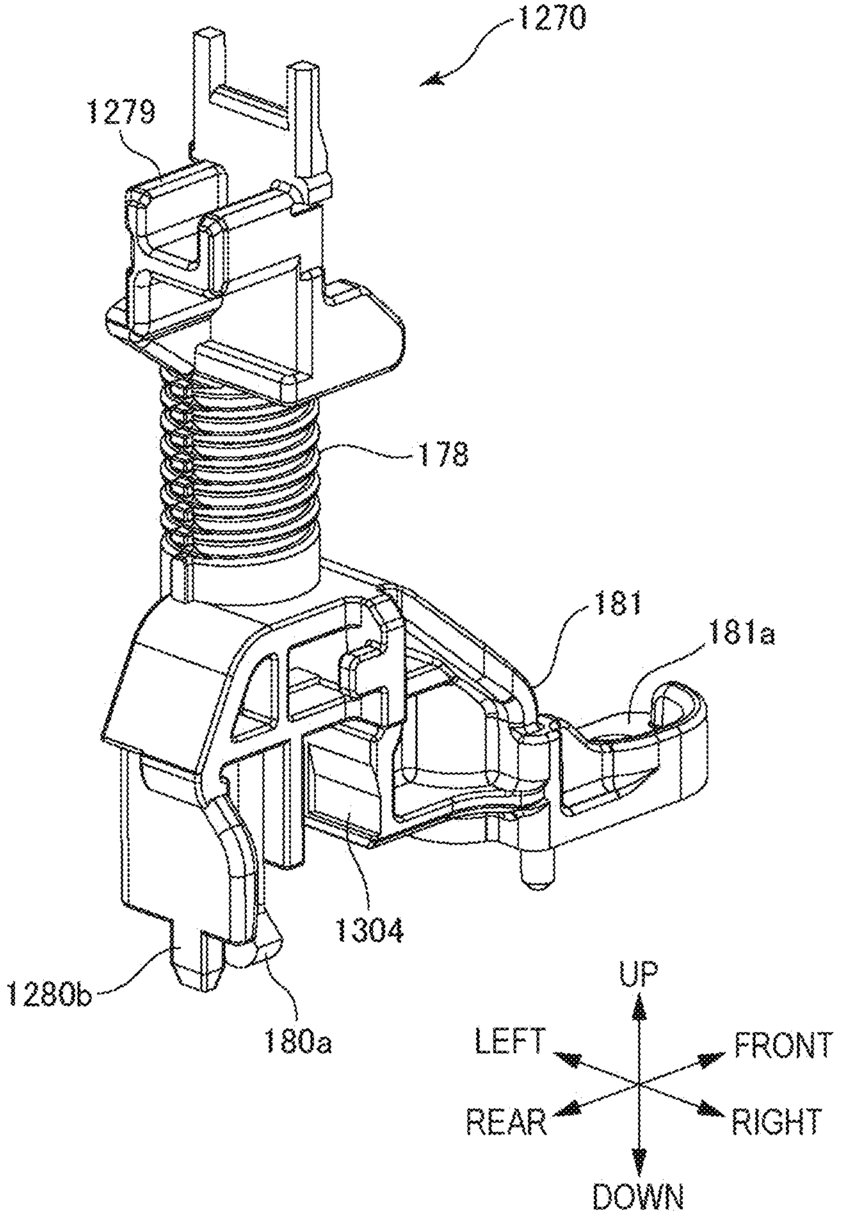
FIG. 43 is a perspective view of the second holder according to the twelfth embodiment.

As shown in FIG. 43, the second holder 1270 includes a second metal member attachment portion 1279 and a second base engagement leg portion 1280*b* in place of the second metal member attachment portion 179 and the second base engagement leg portion 180*b* according to the first embodiment. Further, the second holder 1270 includes a lower terminal attachment portion 1304 behind the fixing leg portion 181 and generally below the element attachment portion 178. Except for these, the second holder 1270 may be configured similarly to the second holder 170 according to the first embodiment. Here, FIG. 43 is a perspective view of the second holder 1270 according to the present embodiment.

The second metal member attachment portion 1279 is a portion extending in the front-rear direction. The second metal member attachment portion 1279 according to the present embodiment is composed of lower and left and right wall portions and is a generally prismatic portion forming a hollow that is open upward. The second metal member attachment portion 1279 may extend in the front-rear direction and may be, for example, a part of a hollow columnar wall portion or a solid columnar shape.

The second base engagement leg portion 1280*b* is provided at a rear lower end portion of the second holder 1270, and the vicinity of a tip thereof is arranged in the fifth through-hole (see FIG. 42). Further, the second base engagement leg portion 1280*b* may be locked to a lower end peripheral portion of the fifth through-hole 113 by including an elastic portion and a claw provided at a tip portion of the elastic portion, similarly to the first base engagement leg portion 180*a*.

The lower terminal attachment portion 1304 is a portion to which the lower terminal 1287 is attached. In the present embodiment, the lower terminal attachment portion 1304 forms a generally rectangular parallelepiped space that is open downward and rightward.

The second spring contact metal member 1272 is a member integrally made of metal and has the same configuration as the first spring contact metal member 1245. That is, the second spring contact metal member 1272 includes a second held portion 1282, a second connection portion 1283, a second contact portion 1284 provided with a second contact point 1285 corresponding to corresponding to the first held portion 1259, the first connection portion 1260, and the first contact portion 1261 provided with the first contact point 1262, respectively.

The second held portion 1282 is a portion forming a hole extending in the front-rear direction. The second held portion 1282 is configured to fit together with the second metal member attachment portion 1279.

The second connection portion 1283 is a portion extending rightward from the second held portion 1282. The second helical element 171 can be easily electrically connected to the second connection portion 1283 by winding the vicinity of the upper end portion of the conducting wire constituting the second helical element 171 around the second contact portion 1283.

The second contact portion 1284 is a portion extending obliquely upward and forward, like the second contact portion 184 according to the first embodiment.

When the third antenna element 1224 is arranged on the inner case 1221 and the base 107 and the inner case 1221 is screwed to the base 107, the second contact portion 1284 comes into contact with the second connection conductor 167 and is pressed from above. Since the second contact portion 1284 repels due to elastic force when being pressed from above, the second contact portion 1284 is reliably brought into contact with and electrically connected to the second connection conductor 167 at the second contact point 1285, in the same manner as the first contact portion 1261 and the first connection conductor 139 (see FIG. 37).

The second contact point 1285 according to the present embodiment is provided with an upwardly projecting ridge. The ridge has an arc shape when viewed from an extension direction. By providing such a protrusion, the second contact portion 1284 can more stably comes into contact with the second connection conductor 167.

The lower terminal 1287 is a terminal attached to the lower terminal attachment portion 1304. As shown in the perspective view of FIG. 44, the lower terminal 1287 includes a first terminal wall portion 1305 having a flat plate shape extending in the front-rear direction, a second terminal wall portion 1306 and a third terminal wall portion 1307 extending rearward from a front end portion and a rear end portion of the first terminal wall portion 1305, respectively, and a protrusion portion 1308 protruding downward.

Figure 44:
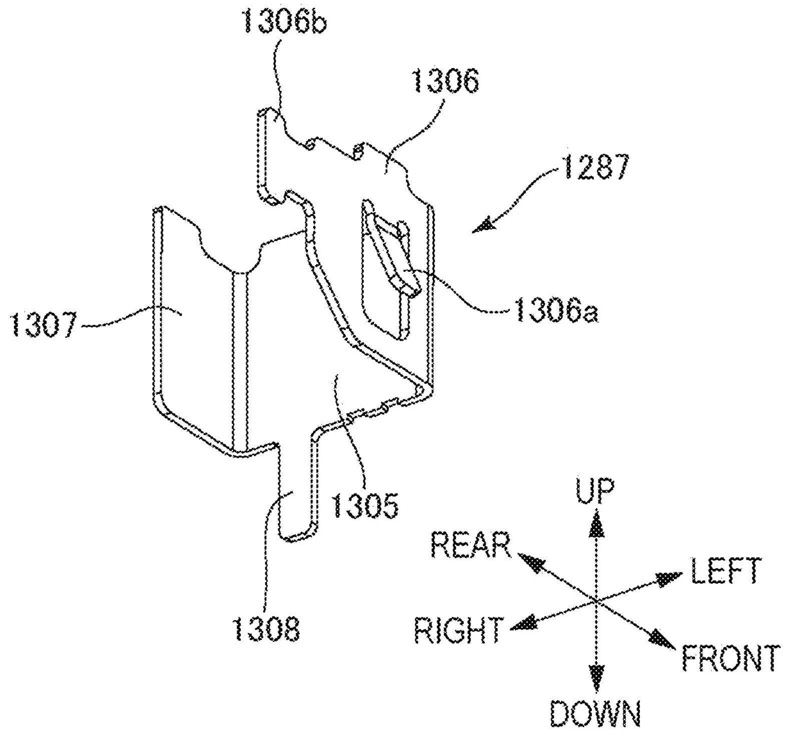
FIG. 44 is a perspective view of a lower terminal according to the twelfth embodiment.

As shown in FIG. 44, the second terminal wall portion 1306 includes a spring piece **1306*a* protruding forward. Therefore, when the lower terminal 1287 is fitted into the lower terminal attachment portion 1304, the lower terminal 1287 is fixed to the lower terminal attachment portion 1304 by elastic force of the spring piece. The lower end portion of the second helical element 171 is wound around an element attachment portion 1306*b* protruding rightward from the second terminal wall portion 1306 and is connected by soldering or the like above the first circuit board 1204. Thus, the second helical element 171 is electrically connected to the first circuit board 1204 via the lower terminal 1287. Various circuits may be interposed between the second helical element 171 and the first circuit board 1204**.

Figure 45:
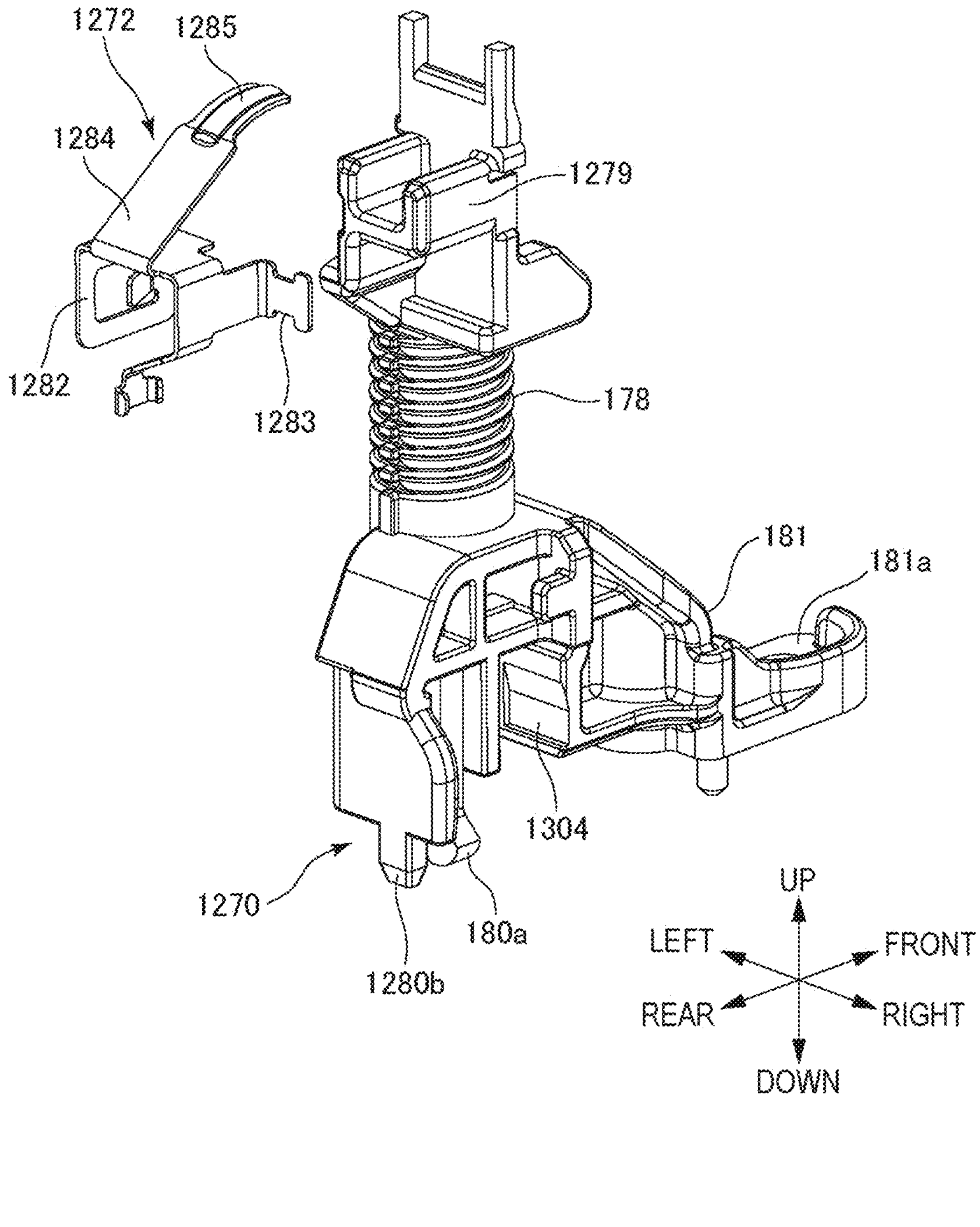
FIG. 45 is a view showing a method of attaching a second spring contact metal member to the second holder in the twelfth embodiment.

According to the second holder 1270, as shown in FIG. 45, the second held portion 1282 is fitted to the second metal member attachment portion 1279 so that the second spring contact metal member 1272 is fixed to the second holder 1270. FIG. 45 is a view showing a method of attaching the second spring contact metal member 1272 to the second holder 1270. The second held portion 1282 may be press-fitted into the second metal member attachment portion 1279.

Figure 46:
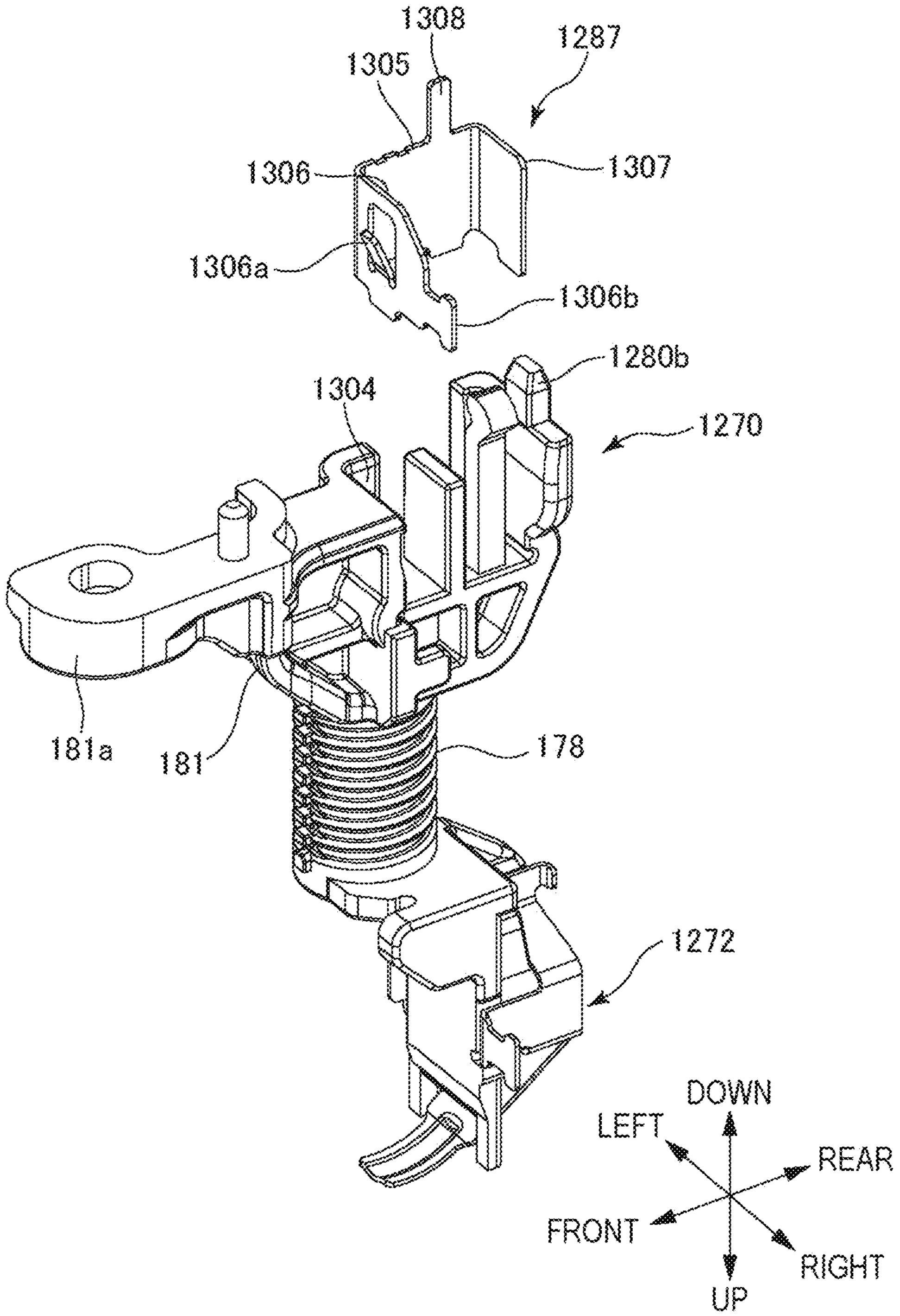
FIG. 46 is a view showing a method of attaching the lower terminal to the second holder in the twelfth embodiment.

Further, as shown in FIG. 46, the lower terminal 1287 is fixed to the second holder 1270 by being fitted into the lower terminal attachment portion 1304 from below. FIG. 46 is a view showing a method of attaching the lower terminal 1287 to the second holder 1270.

Further, the protrusion portion 1308 is fixed to the first circuit board 1204 in a state in which a portion protruding below the first circuit board 1204 is electrically connected by soldering or the like.

Then, in the same manner as in the first embodiment, the first circuit board 1204, the tip portion **181*a*, and the co-fastening boss portion 1256 are fastened together by a co-fastening screw 1309 inserted into the co-fastening boss portion 1256 through the fourth through-hole 112 and the tip portion 181*a* from below the first circuit board 1204. Thus, the first holder 1242 and the second holder 1270 are fixed to the first circuit board 1204**.

According to the present embodiment, as in the first embodiment, it is possible to ensure isolation between a plurality of the antenna elements 1222 to 1224 and 125 arranged in a narrow space while reducing a size of the antenna device 1200.

Modification Example 5

A width and a pitch of a pattern in the meandering shape of the first capacitance loading element 1240, a height of the second antenna element 1223, and the like may be changed as appropriate.

Figure 47:
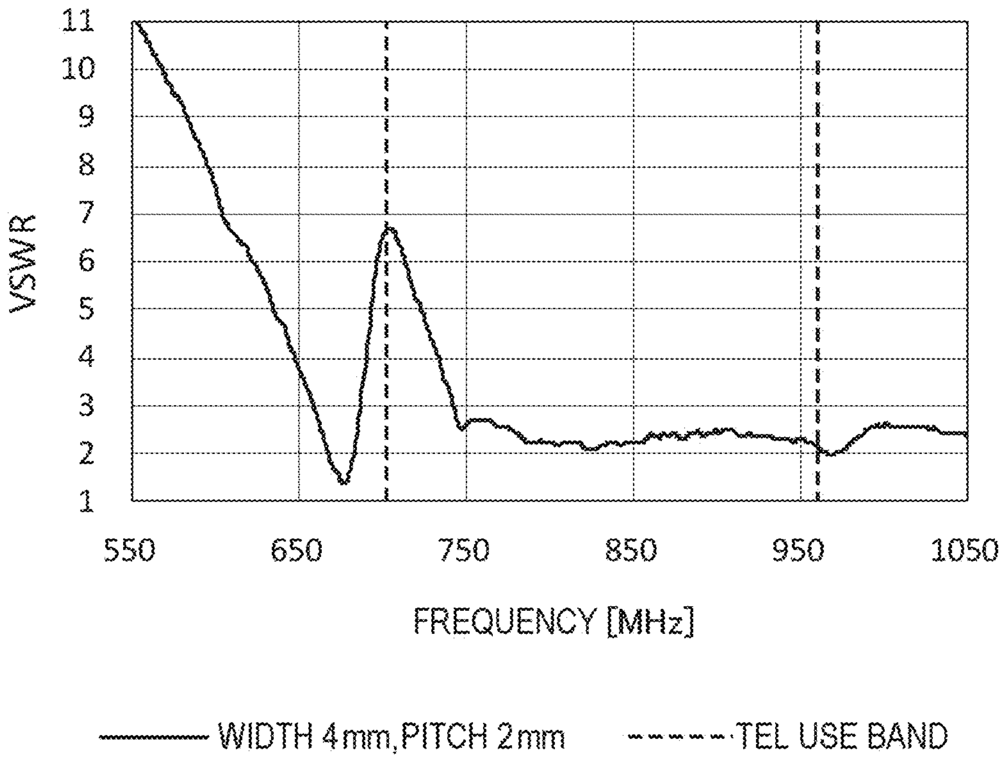
FIG. 47 is a view showing an example of antenna characteristics in a case where a width of a pattern is 4 mm and a pitch of the pattern is 2 mm in a meandering shape of the first capacitance loading element according to the twelfth embodiment.
Figure 48:
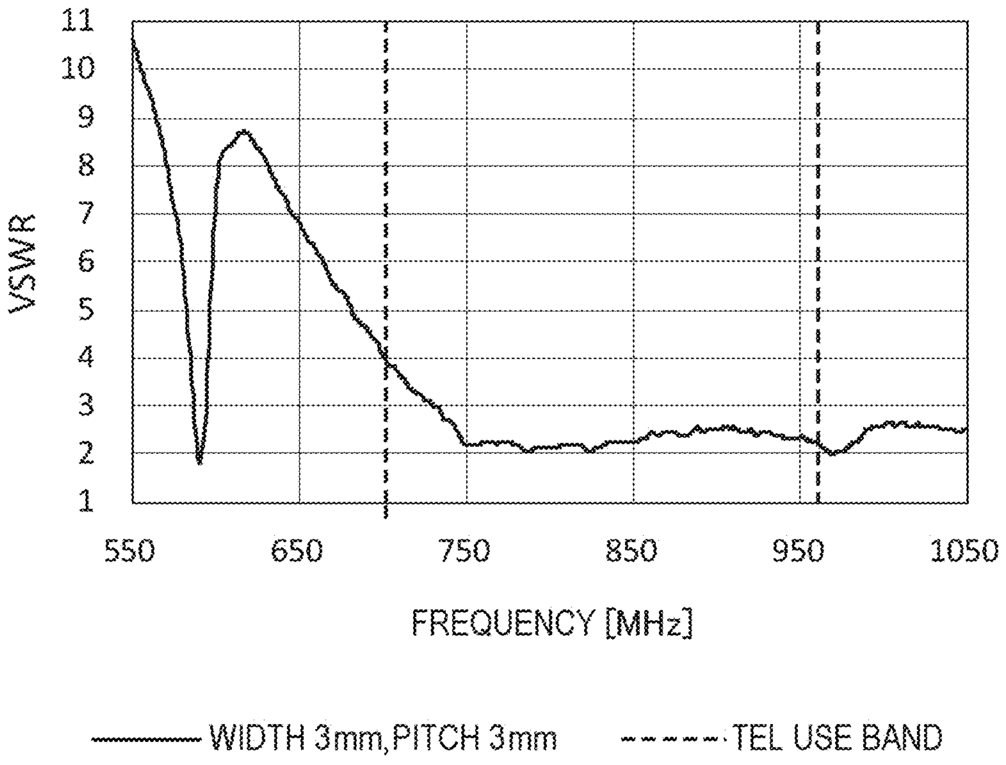
FIG. 48 is a view showing an example of antenna characteristics in a case where a width of a pattern is 3 mm and a pitch of the pattern is 3 mm in a meandering shape of the first capacitance loading element according to the twelfth embodiment.

For example, FIG. 47 is a view showing antenna characteristics of the second antenna element 1223 in a case where a width of a pattern is 4 mm and a pitch of the pattern is 2 mm in the meandering shape of the first capacitance loading element 1240. FIG. 48 is a view showing antenna characteristics of the second antenna element 1223 in a case where the width of the pattern is 3 mm and the pitch of the pattern is 3 mm in the meandering shape of the first capacitance loading element 1240. In each of FIGS. 47 and 48, a horizontal axis represents a frequency and a vertical axis represents a VSWR (voltage standing wave ratio). By changing the width and the pitch of the pattern in the meandering shape, unnecessary resonance can be released downward, and it is possible to respond to radio waves in a specific area.

Further, by adjusting the height of the second antenna element 1223 (for example, increasing the height), it is possible to respond to radio waves in a specific area.

Modification Examples 6 and 7

The antenna device may further include other antenna elements.

Figure 49:
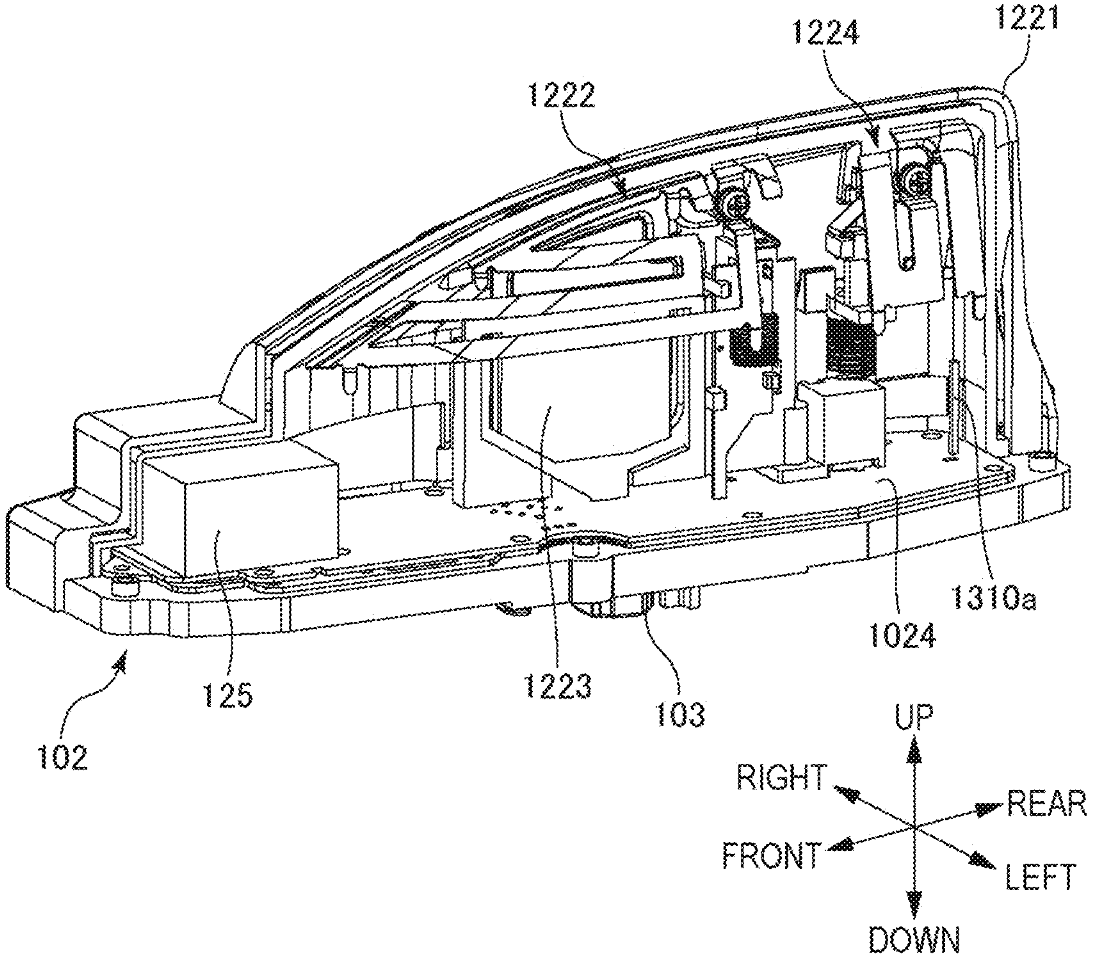
FIG. 49 is a perspective view of an antenna device according to Modification Example 6, showing a state in which an antenna case is not attached.
Figure 50:
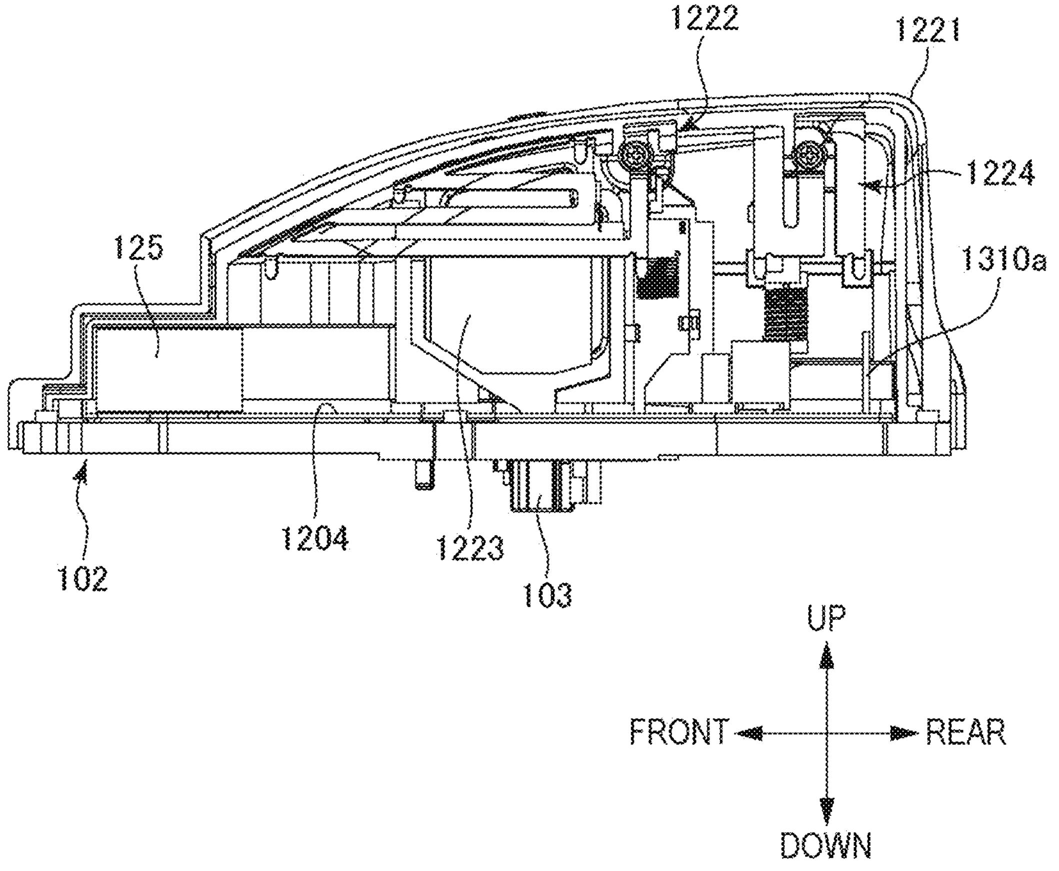
FIG. 50 is a left side view of the antenna device according to Modification Example 6, showing a state in which the antenna case is not attached.

As shown in FIGS. 49 and 50, the antenna device according to Modification Example 6 includes a V2X antenna **1310*a* as a fifth antenna element in addition to the configuration provided in the antenna device 1200 according to the twelfth embodiment. The V2X antenna 1310*a*** according to Modification Example 6 is a quarter-wavelength monopole antenna.

Here, FIG. 49 is a perspective view of the antenna device according to Modification Example 6 showing a state in which the antenna case 101 is not attached, where the inner case 1221 is not shown. FIG. 50 is a left side view of the antenna device according to Modification Example 6 showing a state in which the antenna case 101 is not attached, where the inner case 1221 is not shown.

As shown in FIGS. 51 to 54, the antenna device according to Modification Example 7 includes a V2X antenna 1310*b* as a fifth antenna element in addition to the configuration provided in the antenna device 1200 according to the twelfth embodiment. The V2X antenna 1310*b* according to Modification Example 7 is a collinear array antenna.

Figure 51:
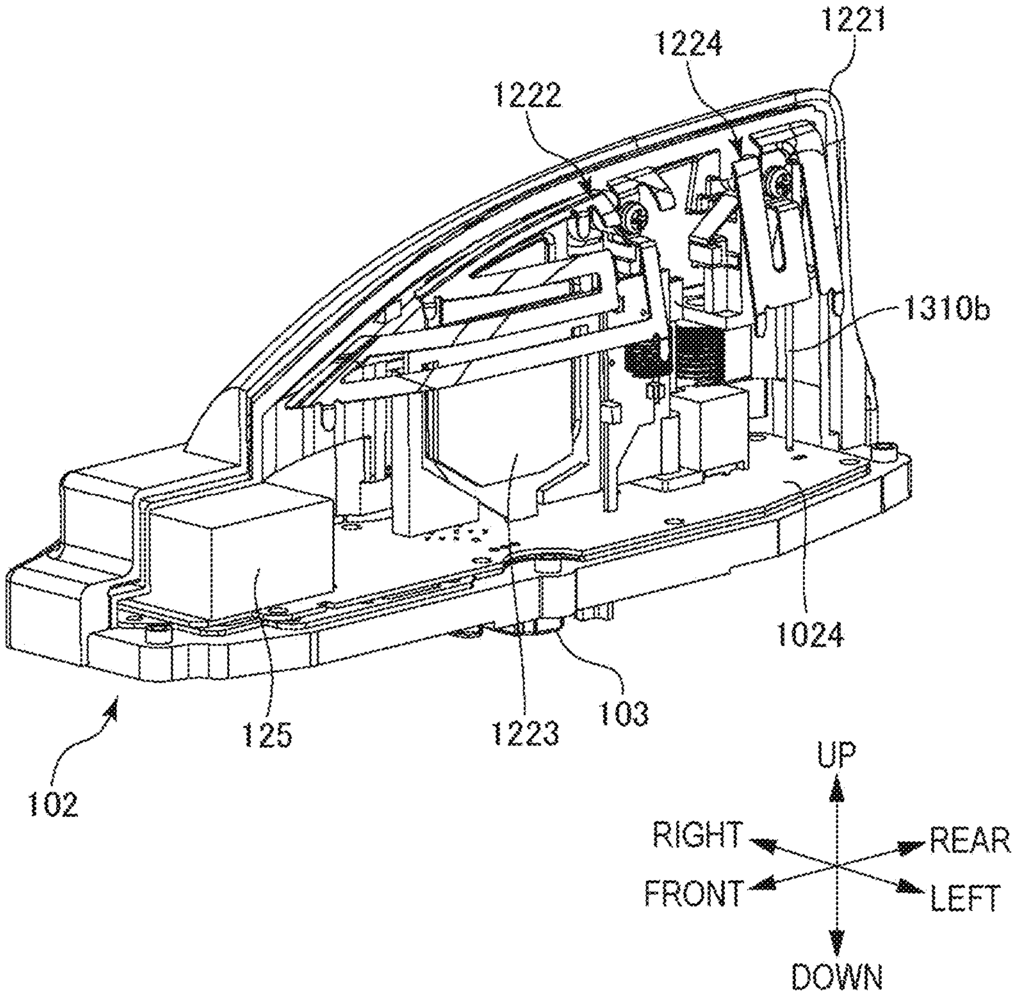
FIG. 51 is a perspective view of an antenna device according to Modification Example 7, showing a state in which an antenna case is not attached.
Figure 52:
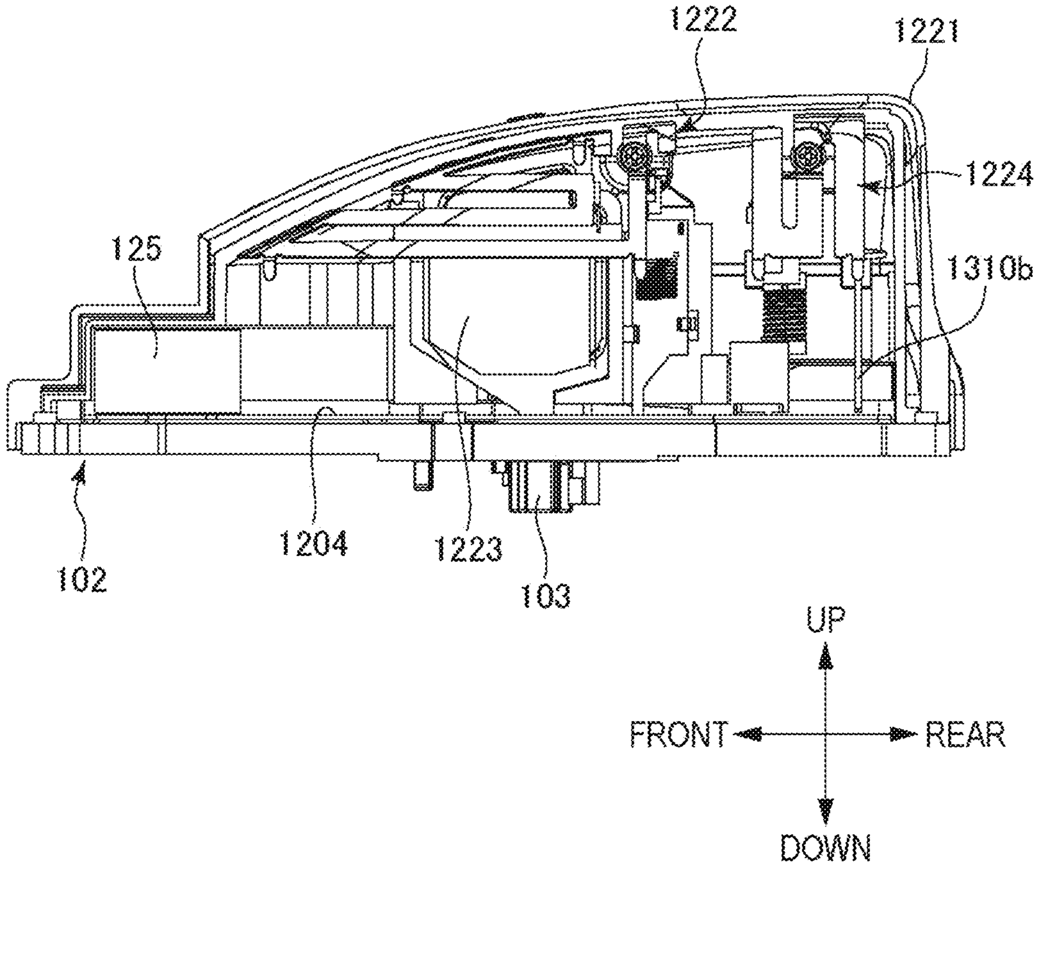
FIG. 52 is a left side view of the antenna device according to Modification Example 7, showing a state in which the antenna case is not attached.
Figure 53:
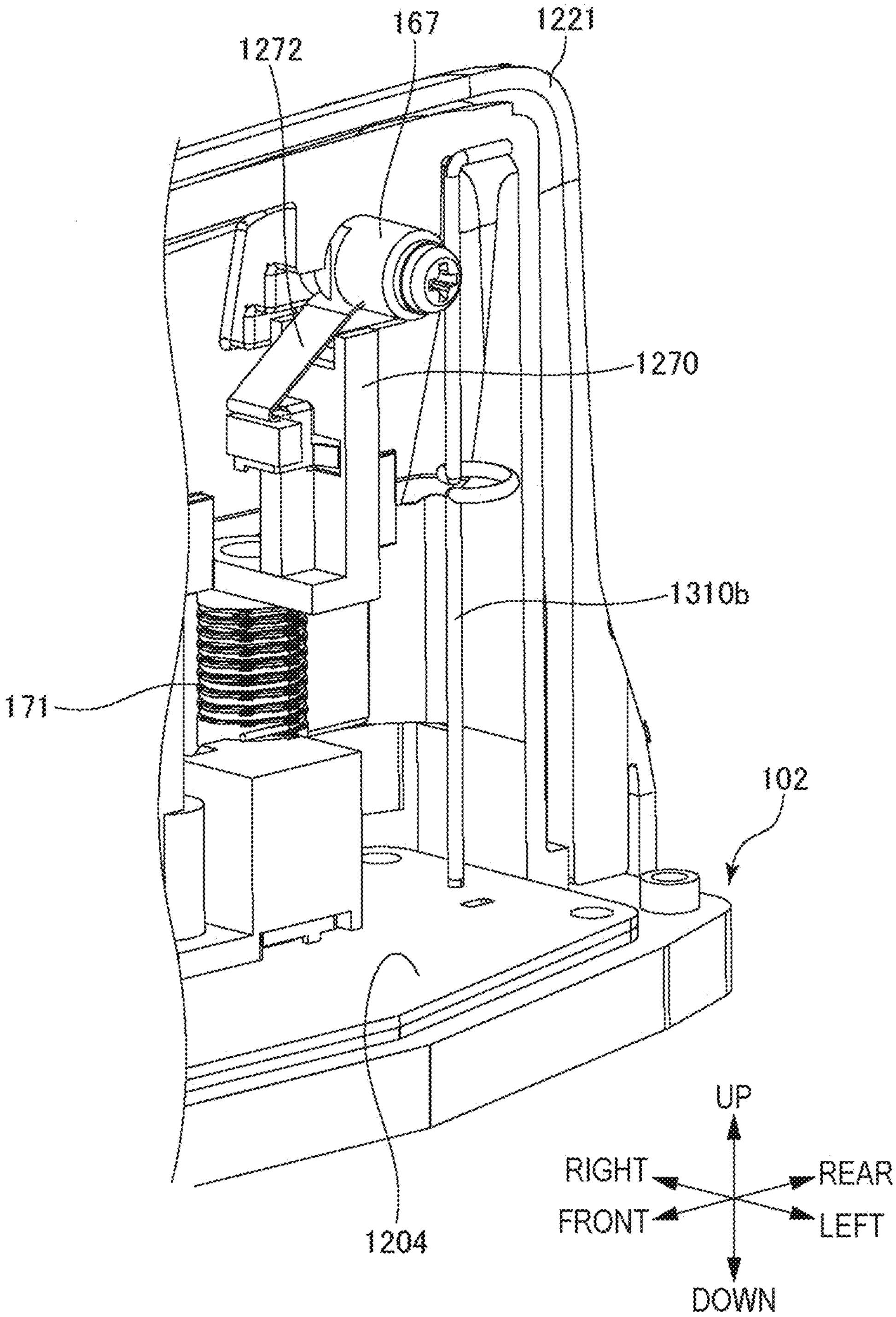
FIG. 53 is an enlarged perspective view showing the vicinity of a V2X antenna according to Modification Example 7.

Here, FIG. 51 is a perspective view of the antenna device according to Modification Example 7 showing a state in which the antenna case 101 is not attached, where the inner case 1221 is not shown. FIG. 52 is a left side view of the antenna device according to Modification Example 7 showing a state in which the antenna case 101 is not attached, where the inner case 1221 is not shown. FIG. 53 is an enlarged perspective view showing the vicinity of the V2X antenna 1310*b* according to Modification Example 7, where the inner case 1221 is not shown.

The V2X antenna is not limited to the quarter-wavelength monopole antenna and may be a monopole antenna such as a collinear array antenna or a helical antenna. Further, the V2X antenna may be a dipole antenna, a dipole array antenna, a slit antenna, a slot antenna, a sleeve antenna, or the like.

Although not shown, directivity control may be performed to improve the gain in a desired direction of the V2X antenna by arranging a parasitic element that acts as a waveguide or a reflector. Furthermore, a bidirectional amplifier, a front-end module, a communication device, and the like may be mounted on the circuit board in order to extend a communication distance of V2X.

In addition, by using a linear, rod-shaped, or plate-shaped conductor antenna having a length longer than a width (elongated) as the V2X antenna, interference between the rear capacitance loading elements 168, 568, 968, and 1168 and the V2X antenna can be reduced. Thus, an arrangement in which at least a portion (part or entirety) of the V2X antenna overlaps with the rear capacitance loading elements 168, 568, 968, 1168 as viewed in the left-right direction can be adopted. Therefore, it is possible to reduce the size of the antenna device.

The telephone antenna (TEL antenna, telematics antenna) and the V2X antenna may be replaced with other communication antennas such as a Wi-Fi antenna and a keyless entry antenna. Further, other communication antennas may be additionally provided in the antenna device.

The patch antenna as the fourth antenna element 125 and 1125 is a GNSS antenna that receives multiple frequencies (GNSS antenna corresponding to at least two frequency bands among frequencies for obtaining positional information such as L1 band, L2 band, L5 band, and L6 band). The patch antenna may be a single-layer patch antenna or may be a multilayer, laminated, or multistage patch antenna.

There may be two or more feeds to the patch antenna. A combiner that combines signals from multiple feeds may be mounted on the circuit board.

Although not shown, a parasitic element may be arranged above a radiation surface of the patch antenna for improving the gain or axial ratio or controlling the directivity.

By changing a shape of a capacitance loading element of an AM/FM broadcast antenna or by configuring a filter in the element, an electrical length of the capacitance loading element can be controlled and the directivity of the GNSS antenna can be controlled to desired characteristics. As a specific example, a configuration is possible in which the capacitance loading element of the AM/FM broadcast antenna is composed of a plurality of divided bodies, and the divided bodies are connected to each other by a filter. Thus, the GNSS antenna can be arranged below the capacitance loading element.

In this case, an antenna receiving different frequencies may be further arranged in front of the GNSS patch antenna. For example, a receiving antenna such as a GNSS patch antenna in a band different from SDARS or GNSS, and a communication antenna such as Wi-Fi and V2X can be arranged in front of the GNSS patch antenna.

Although not shown, the board holding the antenna element and the helical element may be held or fixed by an insulating holder for dealing with positioning, vibration, and impact. The holder may be provided for each element or may be integrally formed for a plurality of elements. Furthermore, by providing a structure for holding or fixing the substrate to members constituting the antenna device such as the antenna case 101 and the inner cases 121 and 1221, the case may also have a holder function for holding the board.

Modification Example 8

The method of providing the antenna may be changed as appropriate. For example, the third antenna elements 124, 524, 924, 1024, 1124, and 1224 may be configured by conductor patterns provided on the board.

Figure 54:
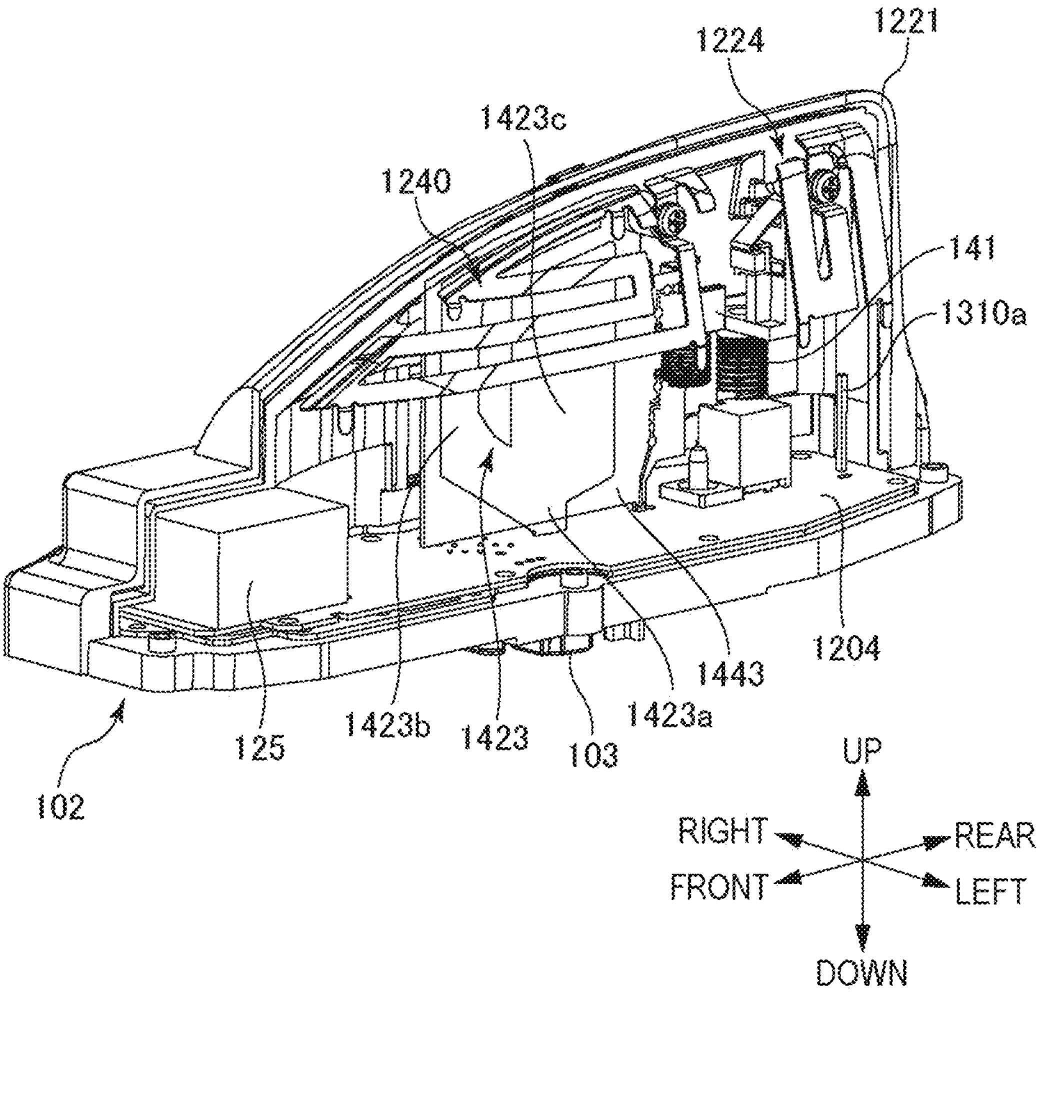
FIG. 54 is a perspective view of an antenna device according to Modification Example 8, showing a state in which an antenna case is not attached.
Figure 55:
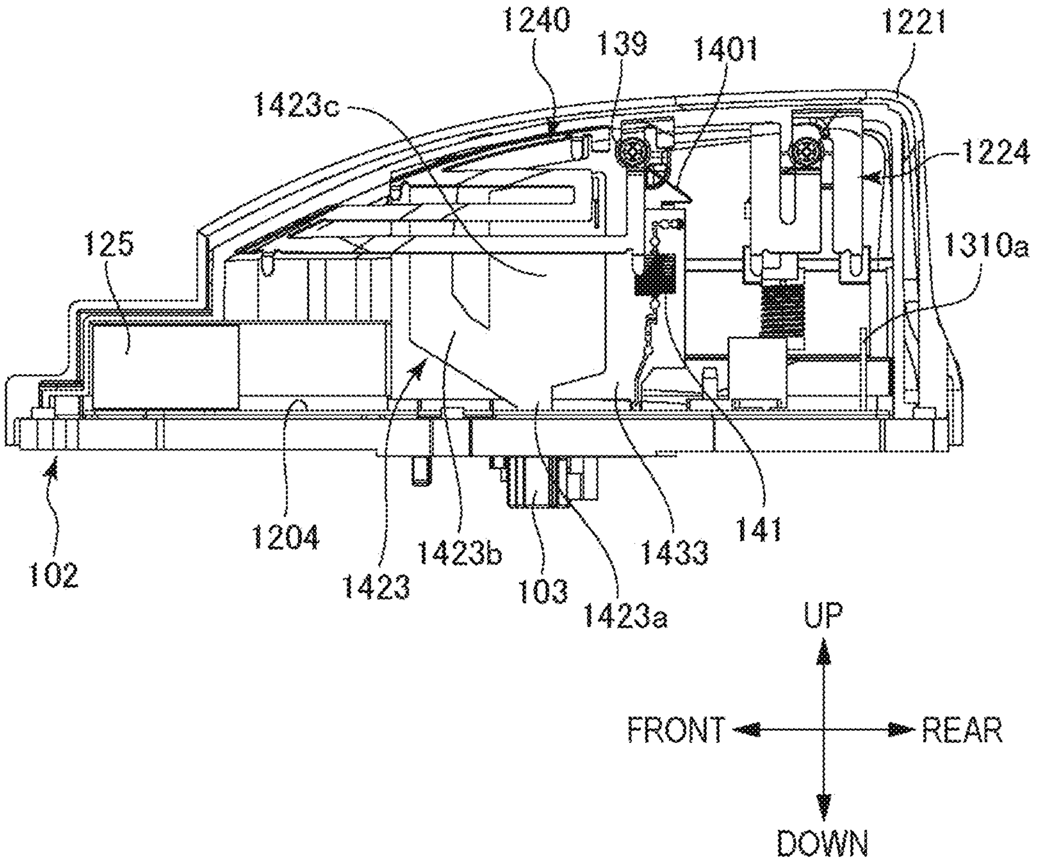
FIG. 55 is a left side view of the antenna device according to Modification Example 8, showing a state in which the antenna case is not attached.

For example, as shown in FIGS. 54 and 55, the antenna device according to Modification Example 8 includes a second antenna element 1423, which is a telephone antenna provided on a second circuit board 1443.

Figure 56:
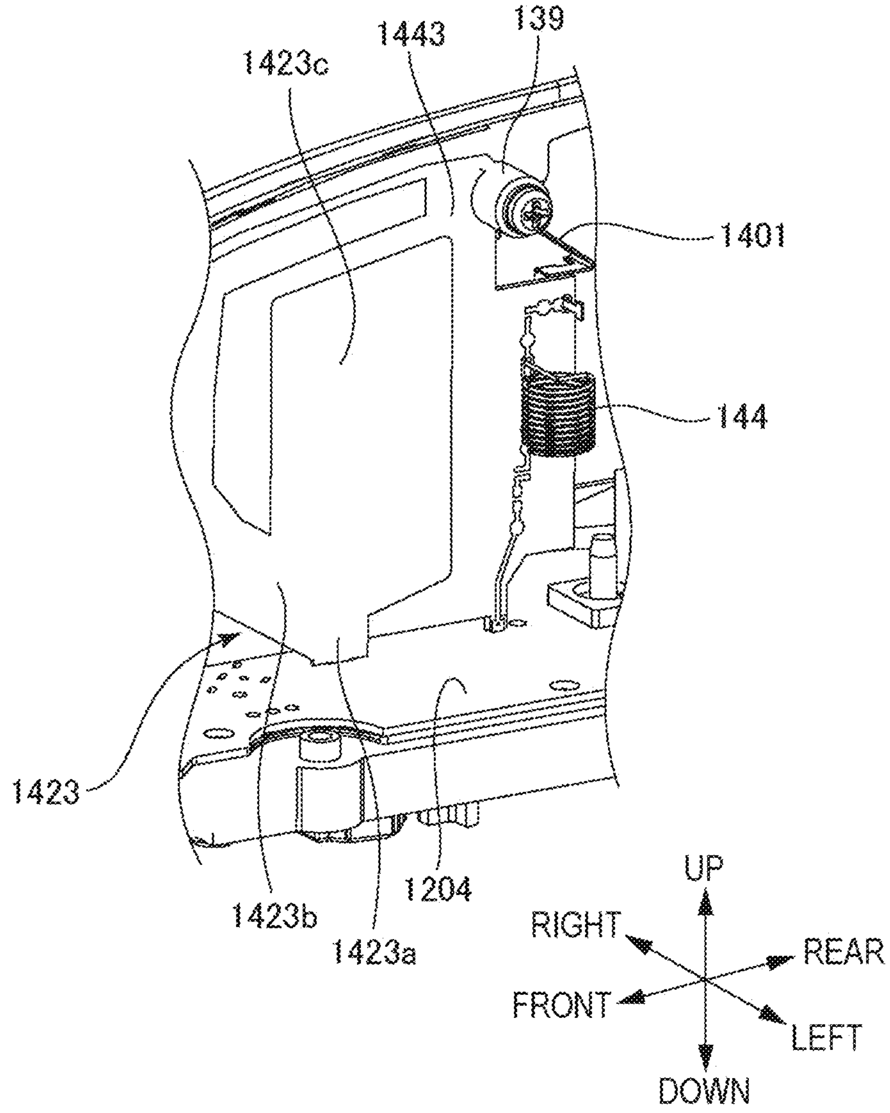
FIG. 56 is an enlarged perspective view of the vicinity of a second antenna element according to Modification Example 8.

FIG. 54 is a perspective view of the antenna device according to Modification Example 8 showing a state in which the antenna case is not attached. FIG. 55 is a left side view of the antenna device according to Modification Example 8 showing a state in which the antenna case is not attached. FIG. 56 is an enlarged perspective view of the vicinity of the second antenna element 1423 according to Modification Example 8.

The second circuit board 1443 corresponds to a circuit board formed by forwardly extending the second circuit board 143 according to the first embodiment and also functions as the first holder 142. That is, in the antenna device according to Modification Example 8, the first holder 142 may not be provided, and the second circuit board 1443 holds the first helical element 144. Further, the first helical element 144 is connected to the first connection conductor 139 via a conductor 1401.

The second antenna element 1423 is composed of a conductor pattern provided on the second circuit board 1443.

According to this modification example, the second antenna element 1423 can be integrally configured with the board 1443 holding the first helical element 144 of the AM/FM broadcast antenna. Thus, it is possible to prevent the change of characteristics due to positional deviation between the first helical element 144 and the second antenna element 1423, and to maintain stable performance.

Further, as shown in FIGS. 54 and 55, the second antenna element 1423 according to this modification example includes a base end portion 1423*a* extending in a direction pointing to the first circuit board 1204 (upward in this modification example), and two arm portions 1423*b* and 1423*c* that surround a space by bifurcating from the vicinity of the base end portion 1423*a* and extending in a band shape. The "space" represents a region surrounded by the two arm portions 1423*b* and 1423*c*.

In the two arm portions 1423*b* and 1423*c*, each of portions facing the first circuit board 1204 (a lower end portion inclined upward and forward in the arm portion 1423*b*, and a lower end portion inclined upward and rearward in the arm portion 1423*c*) forms an acute angle with the first circuit board 1204. That is, the formed angle is greater than 0 degrees and less than 90 degrees. In addition, by making the band shape wider than a linear shape, it is possible to widen two frequency bands of a low frequency band and a high frequency band.

Here, the "band shape" refers to a shape that has a uniform width and has a larger extension length relative to the width. In this example, the width is assumed to be approximately 3 mm or more due to constraints such as a use frequency band of LTE and an installation space for the two arm portions 1423*b* and 1423*c* being unable to be increased due to the antenna device for a vehicle. However, if it is not necessary to consider the above constraints, the width is preferably 5 mm or more, and more preferably 7 mm or more.

Further, the arm portions 1423*b* and 1423*c* may have a width that increases continuously or stepwise from the base end portion 1423*a* toward a tip or may have a uniform width from the base end portion 1423*a* toward a tip. Further, when viewed with an imaginary line in the up-down direction from the base end portion 1423*a* as a boundary line, an area of one of the two arm portions 1423*b* and 1423*c* may be larger than the other.

Each tip of the arm portions 1423*b* and 1423*c* is an open end portion. The "open end portion" refers to a portion (open end) where there is no other conductor or the like beyond the end portion.

The open end portion of the front arm portion 1423*b* protrudes rearward, and a distance between the open end and the ground increases rearward along an inner surface of the inner case 1221. The open end portion of the rear arm portion 1423*c* includes a portion substantially parallel to the first circuit board 1204 for loading a ground capacitance while ensuring radiation resistance. By the open end portions of the two arm portions 1423*b* and 1423*c* in close proximity to each other, a rearwardly oriented space opening is formed on the upper side.

The base end portion 1423*a* also serves as a feeder for the two arm portions 1423*b* and 1423*c* by being electrically connected to the first circuit board 1204. Therefore, the two arm portions 1423*b* and 1423*c* each including the open end portion can be operated as antennas. Specifically, the arm portion 1423*b* with a long element length operates as a low-band antenna, and the arm portion 1423*c* with a short element length operates as a high-band antenna. Each of the arm portions 1423*b* and 1423*c* may be operated as one antenna.

In a case where the second antenna element 1423 having such a shape is formed by, for example, sheet metal working for hollowing out or cutting out one metal sheet, the strength may be decreased.

According to this modification example, the second antenna element 1423 is formed by providing the conductor pattern on the second circuit board 1443. Therefore, even though the second antenna element 1423 has a shape that decreases in strength in sheet metal working, the second antenna element 1423 can be provided without decreasing the strength, and a degree of freedom in design can be improved. It becomes easy to widen the band and improve the gain of the second antenna element 1423.

Such a configuration in which the antenna is provided by the conductor pattern on the board may be adopted in a DAB helical element and a V2X antenna. Alternatively, elements arranged close to each other may be formed on a common board.

Further, one or a plurality of antennas, one or a plurality of helical elements, and the like provided in the antenna device may be divided and provided on a plurality of boards. Such an example can include an aspect in which the antenna device includes a board on which helical elements for telephone and AM/FM broadcast antennas are provided, and a board on which a helical element for DAB and an antenna for V2X are provided.

In general, positioning of elements in close proximity is important because the elements in close proximity are most susceptible to each other. However, in a case where the elements in close proximity are configured separately, the design may be difficult because the elements may be too close or too far from each other from when they are designed. In addition, a positional deviation of the elements may occur due to a manufacturing error or the like. As a result, the characteristics of the antennas may change and mutual interference may occur.

By forming the elements in close proximity on a common board with conductor patterns, positional deviation does not occur, and it is possible to prevent changes in characteristics and reduce the interference. In addition, in a case where a plurality of boards are used, warpage of the boards, which may occur with a large board, is less likely to occur, so that it is possible to improve assemblability and optimize costs.

Furthermore, since the elements are formed on the board, it is easy to provide filters on the board using chip components, conductor patterns, and the like. As a result, it is possible to easily ensure the isolation between the plurality of antenna elements. In addition, it is possible to easily obtain the effect of reducing the inflow and outflow of unnecessary signals outside a desired band.

Although the embodiments and modification examples according to the present invention have been described so far, the present invention is not limited thereto. The present invention includes modified forms of each embodiment, further modified forms of each modification example, combined forms of each embodiment and each modification example, and further modified forms of the combined forms.

According to this specification, the following aspects are provided.

(Aspect 1)

Aspect 1 is an antenna device for a vehicle including:

a case; a base forming an accommodation space together with the case; a first antenna element that is accommodated in the accommodation space and at least transmits or receives radio waves in a first frequency band; and a second antenna element that is accommodated in the accommodation space and at least transmits or receives radio waves in a second frequency band different from that of the first antenna element, wherein the first antenna element at least partially has a meandering shape in a first direction that intersects polarization of the second antenna element.

According to Aspect 1, the first antenna element and the second antenna element receive radio waves in different frequency bands, and the first antenna element at least partially has a meandering shape in a first direction that intersects polarization of the second antenna element. Thus, mutual interference can be suppressed even though the first antenna element and the second antenna element are arranged close to each other. Therefore, it is possible to ensure isolation between a plurality of antenna elements arranged in a narrow space while reducing a size of the antenna device for a vehicle.

(Aspect 2)

Aspect 2 is the antenna device for a vehicle according to Aspect 1, further including a third antenna element that is accommodated in the accommodation space and at least transmits or receives radio waves in a third frequency band different from the first frequency band and the second frequency band.

According to Aspect 2, radio waves of at least three types of media can be received. In general, when elements for receiving radio waves of media are arranged on the glass, back door, or the like of a vehicle, the price of those parts increase. According to Aspect 2, the antenna device 100 can receive radio waves of four types of media while suppressing an increase in cost of parts of the vehicle. Therefore, it is possible to reduce the price of the vehicle to which the antenna device 100 is installed and reduce the overall costs.

(Aspect 3)

Aspect 3 is the antenna device for a vehicle according to Aspect 2, wherein the third antenna element at least partially has a meandering shape.

According to aspect 3, the third antenna element can function as a capacitance loading plate that adds (loads) a ground capacitance to the helical element connected to the third antenna element. Therefore, it is possible to improve the antenna gain of the first antenna element 122.

(Aspect 4)

Aspect 4 is the antenna device for a vehicle according to Aspect 3, wherein the meandering shape of the third antenna element is a meandering shape in a second direction different from the first direction of the meandering shape of the first antenna element.

According to Aspect 4, a distance between the closest positions of the first capacitance loading element and the second capacitance loading element can be increased to reduce mutual interference between the first capacitance loading element and the second capacitance loading element. Therefore, it is possible to improve the antenna gain of each of the first antenna element and the third antenna element.

(Aspect 5)

Aspect 5 is the antenna device for a vehicle according to any one of Aspects 2 to 4, wherein the first antenna element includes a first capacitance loading element, and a distance between a first voltage point which is the maximum voltage of the first antenna element and a second voltage point which is the maximum voltage of the third antenna element is larger than a distance between an end portion of the first capacitance loading element on the third antenna element side and an end portion of the second capacitance loading element on the first antenna element side.

According to Aspect 5, mutual interference between the first antenna element 122 and the third antenna element 124 can be suppressed. Therefore, it is possible to improve the antenna gains of the first antenna element 122 and the third antenna element 124.

(Aspect 6)

Aspect 6 is the antenna device for a vehicle according to Aspect 3 or 4, wherein the meandering shape of the third antenna element is a meandering shape in a second direction that is substantially the same as a direction of the polarization of the second antenna element.

According to Aspect 6, the distance between the closest positions of the first capacitance loading element and the second capacitance loading element can be increased to reduce mutual interference between the first capacitance loading element and the second capacitance loading element. Therefore, it is possible to improve the antenna gain of each of the first antenna element and the third antenna element.

(Aspect 7)

Aspect 7 is the antenna device for a vehicle according to any one of Aspects 2 to 6, wherein the first antenna element includes a first capacitance loading element and a first helical element, in a case where a front side of a vehicle is assumed as a front side, the third antenna element is positioned at a rear side of the first antenna element, and at least a part of the first helical element is positioned between the first capacitance loading element and the third antenna element.

According to Aspect 7, deterioration of the isolation between the third antenna element and the circuit of the first frequency band can be suppressed, and deterioration of the isolation between the circuits of the first frequency band and the second frequency band can be suppressed. Therefore, it is possible to improve the antenna gains of the first antenna element, the second antenna element, and the third antenna element.

(Aspect 8)

Aspect 8 is the antenna device for a vehicle according to Aspect 7, wherein the third antenna element includes a second capacitance loading element and a second helical element, and a direction of a winding axis of the first helical element and a direction of a winding axis of the second helical element are directions that intersect each other.

According to Aspect 8, since magnetic fluxes of the first helical element and the second helical element intersect, mutual interference can be suppressed, and mutual interference between the first antenna element and the third antenna element can be suppressed. Therefore, it is possible to further improve the antenna gains of the first antenna element and the third antenna element.

(Aspect 9)

Aspect 9 is the antenna device for a vehicle according to Aspect 7 or 8, further including at least one filter circuit provided between the first capacitance loading element and the base, wherein the at least one filter circuit is a (BEF) circuit that blocks passage of signals in the second frequency band, a circuit that shifts a frequency band of harmonics in the first frequency band, or a circuit that reduces signals of the harmonics in the first frequency band.

According to Aspect 9, since the filter circuit is provided, it is possible to reduce noise of signals in the first antenna element or an influence thereof. Therefore, it is possible to further improve reception sensitivity of the first antenna element.

(Aspect 10)

Aspect 10 is the antenna device for a vehicle according to Aspect 9, wherein the at least one filter circuit includes a first filter circuit that reduces an influence of harmonics in the first frequency band on the second frequency band, and the first filter circuit is connected in series between the first capacitance loading element and the first helical element.

According to Aspect 10, by inserting the filter circuit, the isolation in the second frequency band between the first antenna element and the second antenna element is improved, and the decrease in the gain of the second antenna element is suppressed. Here, the configuration of the filter circuit inserted is a parallel resonance circuit, and an impedance is maximized in the second frequency band.

In addition, since flow of signals in the second frequency band into the first antenna element can be suppressed, it is possible to improve the reception sensitivity of the first frequency band.

(Aspect 11)

Aspect 11 is the antenna device for a vehicle according to Aspect 9 or 10, wherein the at least one filter circuit includes a second filter circuit that shifts the frequency band of the harmonics in the first frequency band to a frequency band different from the second frequency band, or reduces the signals of the harmonics in the first frequency band, and the second filter circuit is connected in series between the capacitance loading element and the first helical element or between the first helical element and a circuit provided on the base.

According to Aspect 11, it is possible to effectively reduce the noise itself of the signals in the first antenna element or the influence of the noise. Therefore, it is possible to further improve reception sensitivity of the first antenna element.

(Aspect 12)

Aspect 12 is the antenna device for a vehicle according to any one of Aspects 2 to 11, wherein the second antenna element is at least partially positioned between the first capacitance loading element and the base.

According to Aspect 12, the second antenna element and the first capacitance loading element can be arranged close to each other while suppressing mutual interference. Therefore, it is possible to reduce the size of the antenna device for a vehicle while ensuring isolation between the first antenna element and the second antenna element.

This application claims priority based on Japanese Patent Application No. 2020-196868 filed on Nov. 27, 2020, and the entire disclosure thereof is incorporated herein.

REFERENCE SIGNS LIST

100, 200, 300, 400, 500, 600, 700, 800, 900, 1000, 1100, 1200 antenna device
101 antenna case
102 antenna base
P pad
103 capture unit
104, 1204 first circuit board
105 connector
106 O-ring
107 base
107*a* conductive base
108 constricted portion
109 first through-hole
110 second through-hole
111 third through-hole
112 fourth through-hole
113 fifth through-hole
114 front protrusion portion
115 rear protrusion portion
117 pre-lock holder
118 bolt
119 vehicle fixing claw member
120 sealing member
121, 1221 inner case
122, 222, 422, 622, 822, 1022, 1122, 1222 first antenna element
123, 1223, 1423 second antenna element
124, 524, 924, 1024, 1124, 1224 third antenna element
125, 1125 fourth antenna element
126 streamline-shaped portion
127 connection wall portion
128 base attachment portion
129 first element attachment portion
130 first conductor insertion portion
131 locking groove portion
132 second element attachment portion
133 second conductor insertion hole
134*a*, 134*b* first engagement piece fitting portion
135 first stepped portion
136*a*, 136*b* second engagement piece fitting portion
137 second stepped portion
138 base attachment screw
139 first connection conductor
140, 640, 840, 1040, 1140, 1240 first capacitance loading element
141 first fastener
142, 1142, 1242 first holder
143, 1043, 1143, 1243, 1443 second circuit board
144, 444 first helical element
145, 1245 first spring contact metal member
147 inclined portion
148*a*, 148*b* first engagement piece
149 locking protrusion portion
150 first fastening hole
151 extension portion
152, 1252 flat plate portion
153, 1253 projection pair portion
154, 1254 first metal member attachment portion
155, 1255 first protrusion portion
156, 1256 co-fastening boss portion
157 board protrusion portion
158*a*, 158*b* region
159, 1259 first held portion
159*a* first flat plate portion
159*b* second flat plate portion
159*c* third flat plate portion
160, 1260 first connection portion
161, 261*a*, 261*b*, 1261 first contact portion
162, 1262 first contact point
163, 1263 flat plate portion
164, 1264 attachment projection portion
165 rib
166 tapered slit
167 second connection conductor
168, 568, 968, 1168 second capacitance loading element
169 second fastener
170, 1170, 1270 second holder
171 second helical element
172, 1272 second spring contact metal member
173, 173*a*, 173*b* second engagement piece
174 second fastening hole
175,675,975 first voltage point
176, 276, 576, 976 second voltage point
178 element attachment portion
179, 1279 second metal member attachment portion
180 base locking claw
180*a* first base engagement leg portion
180*b*, 1280*b* second base engagement leg portion
180*a*_1 elastic portion
180*a*_2 claw
181 fixing leg portion
181*a*, 181*b* tip portion
182, 1282 second held portion
183, 1283 second connection portion
184, 1284 second contact portion
185, 1285 second contact point

187, 1287 lower terminal
286*a*, 286*b* first connection point
987 second connection point
1088 fifth antenna element
1089 third connection point
1090 trap coil
1191 element holder
1193 feeder element
1194 third circuit board
1280*b*_1 elastic portion
1280*b*_2 claw
1295 locking claw
1296 third engagement piece fitting portion
1297 fourth engagement piece attachment portion
1298 locking recessed portion
1299 third engagement piece
1300 fourth engagement piece
1301 first cutout portion
1302 second cutout portion
1303 reinforcing structural portion
1304 lower terminal attachment portion
1305 first terminal wall portion
1306 second terminal wall portion
1307 third terminal wall portion
1308 protrusion portion
1309 co-fastening screw
1310*a*, 1310*b* fifth antenna element
1401 conductor

The invention claimed is:

1. An antenna device for a vehicle comprising:

a case;

a base forming an accommodation space together with the case;

a first antenna element that is accommodated in the accommodation space and at least transmits or receives radio waves in a first frequency band;

a second antenna element that is accommodated in the accommodation space and at least transmits or receives radio waves in a second frequency band different from that of the first antenna element; and a third antenna element that is accommodated in the accommodation space and at least transmits or receives radio waves in a third frequency band different from the first frequency band and the second frequency band, wherein the first antenna element includes a first capacitance loading element and a first helical element and at least partially has a meandering shape in a first direction that intersects a polarization of the second antenna element, in a case where a front side of a vehicle is assumed as a front side, the third antenna element is positioned at a rear side of the first antenna element, and at least a part of the first helical element is positioned between the first capacitance loading element and the third antenna element.

2. The antenna device for a vehicle according to claim 1, wherein the third antenna element at least partially has a meandering shape.

3. The antenna device for a vehicle according to claim 2, wherein the meandering shape of the third antenna element is a meandering shape in a second direction different from the first direction of the meandering shape of the first antenna element.

4. The antenna device for a vehicle according to claim 2, wherein the meandering shape of the third antenna element is a meandering shape in a second direction that is substantially the same as a direction of the polarization of the second antenna element.

5. The antenna device for a vehicle according to claim 1, wherein the third antenna element includes a second capacitance loading element and a second helical element, and a direction of a winding axis of the first helical element and a direction of a winding axis of the second helical element are directions that intersect each other.

6. The antenna device for a vehicle according to claim 1, further comprising:

at least one filter circuit provided between the first capacitance loading element and the base, wherein the at least one filter circuit is a circuit that blocks passage of signals in the second frequency band, a circuit that shifts a frequency band of harmonics in the first frequency band, or a circuit that reduces signals of the harmonics in the first frequency band.

7. The antenna device for a vehicle according to claim 6, wherein the at least one filter circuit includes a first filter circuit that reduces an influence of harmonics in the first frequency band on the second frequency band, and the first filter circuit is connected in series between the first capacitance loading element and the first helical element.

8. The antenna device for a vehicle according to claim 6, wherein the at least one filter circuit includes a second filter circuit that shifts the frequency band of the harmonics in the first frequency band to a frequency band different from the second frequency band, or reduces the signals of the harmonics in the first frequency band, and the second filter circuit is connected in series between the first helical element and a circuit provided on the base.

9. The antenna device for a vehicle according to claim 1, wherein the second antenna element is at least partially positioned between the first capacitance loading element and the base.

10. An antenna device for a vehicle comprising:

a case;

a base forming an accommodation space together with the case;

a first antenna element that is accommodated in the accommodation space and at least transmits or receives radio waves in a first frequency band;

a second antenna element that is accommodated in the accommodation space and at least transmits or receives radio waves in a second frequency band different from that of the first antenna element, and a third antenna element that is accommodated in the accommodation space and at least transmits or receives radio waves in a third frequency band different from the first frequency band and the second frequency band, wherein the first antenna element includes a first capacitance loading element and a first helical element and at least partially has a meandering shape in a first direction that intersects polarization of the second antenna element, in a case where a front side of a vehicle is assumed as a front side, the third antenna element is positioned at a rear side of the first antenna element, and the first helical element is positioned between the first capacitance loading element and the third antenna element.

11. The antenna device for a vehicle according to claim 10, wherein the third antenna element at least partially has a meandering shape.

12. The antenna device for a vehicle according to claim 11, wherein the meandering shape of the third antenna element is a meandering shape in a second direction different from the first direction of the meandering shape of the first antenna element.

13. The antenna device for a vehicle according to claim 11, wherein the meandering shape of the third antenna element is a meandering shape in a second direction that is substantially the same as a direction of the polarization of the second antenna element.

14. The antenna device for a vehicle according to claim 10, wherein the third antenna element includes a second capacitance loading element and a second helical element, and a direction of a winding axis of the first helical element and a direction of a winding axis of the second helical element are directions that intersect each other.

15. The antenna device for a vehicle according to claim 10, further comprising:

at least one filter circuit provided between the first capacitance loading element and the base, wherein the at least one filter circuit is a circuit that blocks passage of signals in the second frequency band, a circuit that shifts a frequency band of harmonics in the first frequency band, or a circuit that reduces signals of the harmonics in the first frequency band.

16. The antenna device for a vehicle according to claim 15, wherein the at least one filter circuit includes a first filter circuit that reduces an influence of harmonics in the first frequency band on the second frequency band, and the first filter circuit is connected in series between the first capacitance loading element and the first helical element.

17. The antenna device for a vehicle according to claim 15, wherein the at least one filter circuit includes a second filter circuit that shifts the frequency band of the harmonics in the first frequency band to a frequency band different from the second frequency band, or reduces the signals of the harmonics in the first frequency band, and the second filter circuit is connected in series between the first helical element and a circuit provided on the base.

18. The antenna device for a vehicle according to claim 10, wherein the second antenna element is at least partially positioned between the first capacitance loading element and the base.

* * * * *